US008023804B2

(12) United States Patent
Toma et al.

(10) Patent No.: US 8,023,804 B2
(45) Date of Patent: Sep. 20, 2011

(54) MOVING IMAGE CODING METHOD, MOVING IMAGE CODING DEVICE, MOVING IMAGE RECORDING METHOD, RECORDING MEDIUM, MOVING IMAGE PLAYBACK METHOD, MOVING IMAGE PLAYBACK DEVICE, AND MOVING IMAGE PLAYBACK SYSTEM

(75) Inventors: Tadamasa Toma, Osaka (JP); Hiroshi Yahata, Osaka (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 21 days.

(21) Appl. No.: 12/515,124

(22) PCT Filed: Dec. 12, 2007

(86) PCT No.: PCT/JP2007/073965
§ 371 (c)(1),
(2), (4) Date: May 15, 2009

(87) PCT Pub. No.: WO2008/072669
PCT Pub. Date: Jun. 19, 2008

(65) Prior Publication Data
US 2010/0054710 A1 Mar. 4, 2010

(30) Foreign Application Priority Data
Dec. 14, 2006 (JP) .................................. 2006-337426

(51) Int. Cl.
*H04N 5/76* (2006.01)
*H04N 5/78* (2006.01)
(52) U.S. Cl. ........................................ 386/341; 386/324
(58) Field of Classification Search .................... 386/95, 386/109, 111, 112, 124, 46, 125, 341, 324, 386/300, 334, 278
See application file for complete search history.

(56) References Cited

U.S. PATENT DOCUMENTS
7,187,785 B2 * 3/2007 Ikeda et al. .................... 382/115
(Continued)

FOREIGN PATENT DOCUMENTS
EP 1 791 358 5/2007
(Continued)

OTHER PUBLICATIONS

International Search Report issued Mar. 25, 2008 in the International (PCT) Application of which the present application is the U.S. National Stage.

(Continued)

*Primary Examiner* — Robert Chevalier
(74) *Attorney, Agent, or Firm* — Wenderoth, Lind & Ponack, L.L.P.

(57) ABSTRACT

A moving image coding method that can prevent playback discontinuity without an increase in processing load during playback is provided.
The moving image coding method codes a video stream that includes a first moving image and a second moving image to be overlaid on the first moving image. The moving image coding method includes: a step of determining a continuous playback section that is a group of partial sections and is subject to continuous playback, in the video stream (S5301 to S5303); a step of coding the first and second moving images in the partial sections constituting the continuous playback section, under a constraint that prevents a threshold from being changed in the continuous playback section, the threshold being used for a transparency process by a luminance key in the overlaying (S5304); and a step of generating management information including flag information which indicates that the threshold is fixed in the continuous playback section (S5305).

3 Claims, 55 Drawing Sheets

U.S. PATENT DOCUMENTS

2007/0003221 A1  1/2007  Hamada et al.

FOREIGN PATENT DOCUMENTS

| JP | 2000-228656 | 8/2000 |
|---|---|---|
| JP | 2002-108325 | 4/2002 |
| JP | 2002-312787 | 10/2002 |
| JP | 2003-111094 | 4/2003 |
| JP | 2004-172862 | 6/2004 |
| JP | 2005-123775 | 5/2005 |
| WO | 2006/025388 | 3/2006 |

OTHER PUBLICATIONS

Proposed SMPTE Standard for Television: VC-1 Compressed Video Bitstream Format and Decoding Process, Final Committee Draft 1 Revision 6, Jul. 13, 2005.

* cited by examiner

FIG. 37

Player variable (system parameter)

| 0 | Language Code | 11 | Player audio mixing mode for Karaoke | 22 | reserved |
|---|---|---|---|---|---|
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

(a)    (b)

FIG. 42
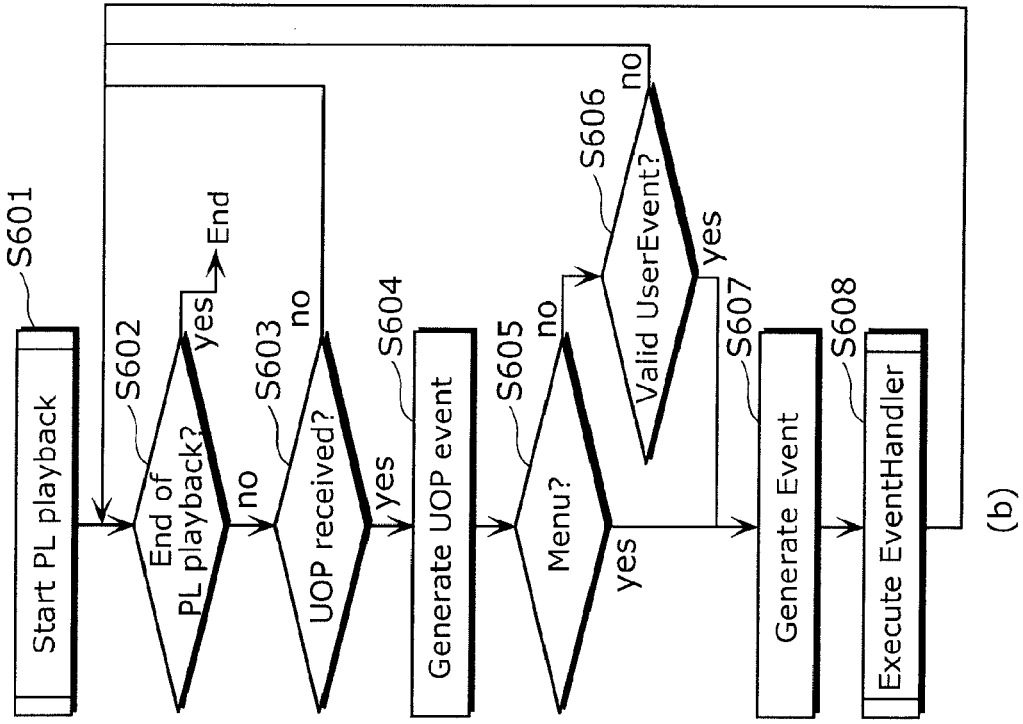
(b)
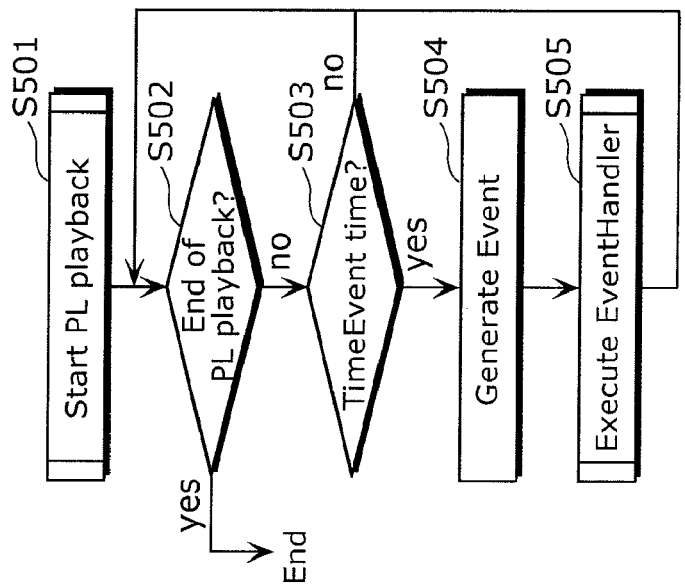
(a)

FIG. 46
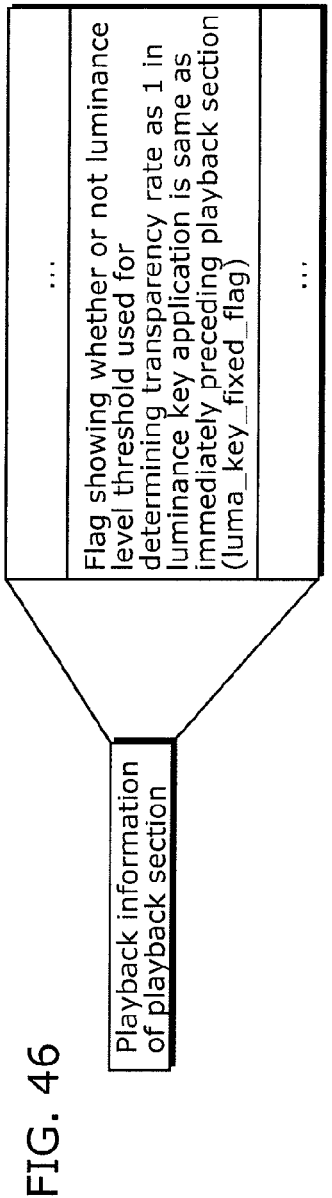
(a) luma_key_fixed_flag=1
Seamlessly connected playback section
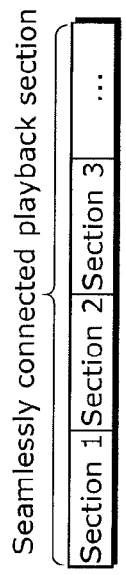
Luminance key threshold is fixed in sections 1, 2, and 3
(b) luma_key_fixed_flag=0
Not seamlessly connected playback section
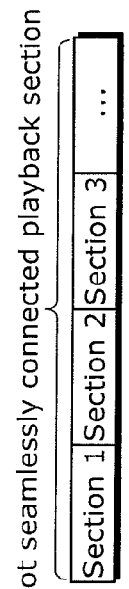
Luminance key threshold is variable in sections 1, 2, and 3

FIG. 48
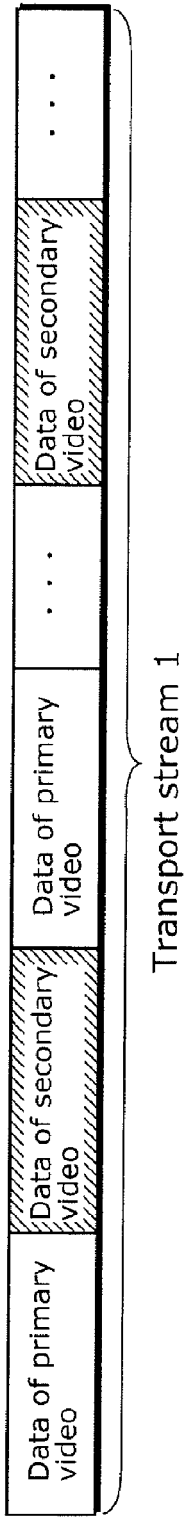
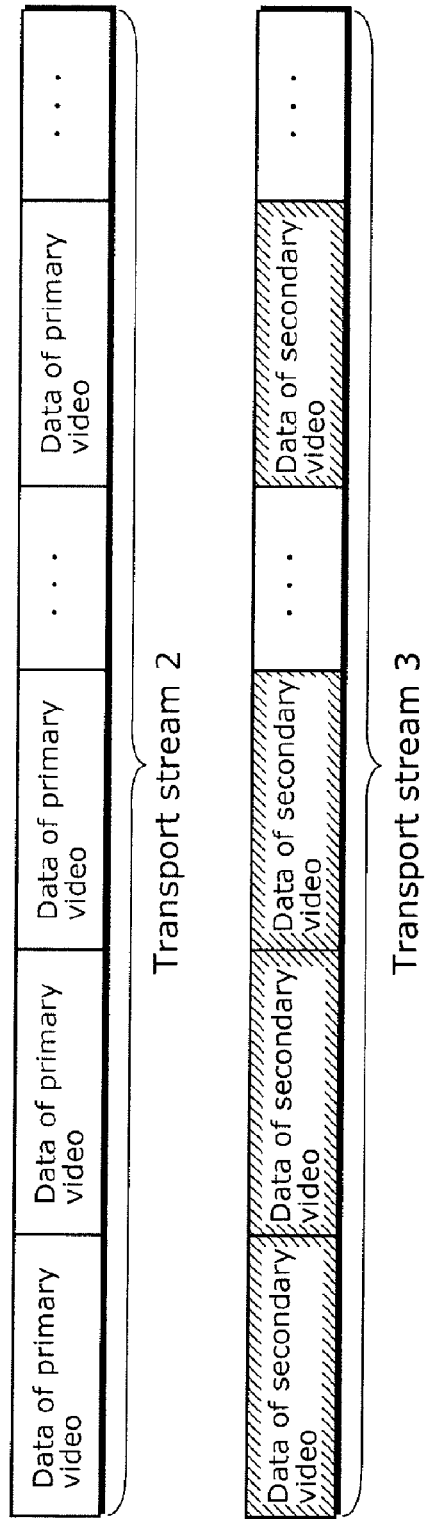

MOVING IMAGE CODING METHOD, MOVING IMAGE CODING DEVICE, MOVING IMAGE RECORDING METHOD, RECORDING MEDIUM, MOVING IMAGE PLAYBACK METHOD, MOVING IMAGE PLAYBACK DEVICE, AND MOVING IMAGE PLAYBACK SYSTEM

TECHNICAL FIELD

The present invention relates to a moving image coding method for coding, when generating a coded stream including a moving image whose foreground and background are separable according to a luminance level threshold, the moving image while changing the luminance level threshold. The present invention also relates to a moving image recording method, a moving image playback method, a recording medium on which the coded stream is recorded, and the like.

BACKGROUND ART

The following describes a DVD-Video disc (hereafter simply referred to as a "DVD") as a conventional technique.

FIG. 1 shows a structure of a DVD. As shown in the lower part of FIG. 1, a logical address space is provided between a lead-in area and a lead-out area on a DVD disc. Volume information of a file system is stored at the start of the logical address space, followed by application data such as video and audio.

The file system is defined by ISO 9660 or Universal Disc Format (UDF), and is a mechanism for representing data on a disc in units called a directory and a file. A personal computer (PC) for daily use, too, can present data stored on a hard disk in the form of directories and files, through a file system such as FAT or NTFS. This enhances usability.

DVDs use both UDF and ISO 9660 (a combination of which is known as "UDF Bridge"), so that data can be read by a file system driver of any of UDF and ISO 9660. In the case of DVD-RAM/R/RW which are rewritable DVD discs, data can be physically read, written, and deleted through these file systems.

Data recorded on the DVD can be viewed, through UDF Bridge, as directories and files as shown in the upper left part of FIG. 1. A directory called "VIDEO_TS" is placed immediately below a root directory ("ROOT" in FIG. 1). The application data of the DVD is stored in this VIDEO_TS directory. The application data is stored as a plurality of files. The plurality of files mainly include the following:

VIDEO_TS.IFO disc playback control information file
VTS_01_0.IFO video title set#1 playback control information file
VTS_01_0.VOB video title set#1 stream file
...

Two types of extensions are specified. "IFO" indicates a file storing playback control information, and "VOB" indicates a file storing an MPEG stream that is AV data. Playback control information includes information for realizing interactivity (a technique of dynamically changing playback in accordance with a user operation) employed for DVDs, information such as metadata that is attached to a title or an AV stream, and the like. In DVDs, playback control information is also referred to as navigation information.

Playback control information files include "VIDEO_TS.IFO" for managing the entire disc, and "VTS_01_0.IFO" that is playback control information for an individual video title set (in DVDs, a plurality of titles, e.g., different movies or different versions of a movie, can be recorded on a single disc). "01" in the body of the file name "VTS_01_0.IFO" indicates a number of the video title set. For example, a playback control information file for video title set#2 is "VTS_02_0.IFO".

The upper right part of FIG. 1 shows a DVD navigation space in an application layer of the DVD. This is a logical structure space where the aforementioned playback control information is developed. In the DVD navigation space, the information stored in "VIDEO_TS.IFO" is developed as video manager information (VMGI), and the playback control information that exists for each individual video title set, such as "VTS_01_0.IFO", is developed as video title set information (VTSI).

The VTSI includes program chain information (PGCI). The PGCI is information about a playback sequence called a program chain (PGC). The PGCI is mainly composed of a group of cells and a kind of programming information called commands. A cell itself corresponds to all or part of a video object (which is an MPEG stream and is abbreviated as VOB). Playing a cell is an equivalent of playing a section, in a VOB, that is designated by the cell.

Commands are processed by a DVD virtual machine, and are similar to, for example, Java (registered trademark) Script executed on a browser. However, DVD commands differ from Java (registered trademark) Script in the following point. Java (registered trademark) Script controls windows and browsers (e.g. open a window of a new browser), in addition to performing logical operations. On the other hand, DVD commands only control playback of AV titles, such as by designating a chapter to be played, in addition to performing logical operations.

A cell includes start and end addresses of a corresponding section in a VOB recorded on the disc (logical storage addresses on the disc), as its internal information. A player reads data using the start and end addresses written in the cell with regard to the VOB, and plays the read data.

FIG. 2 is a schematic view for explaining navigation information that is embedded in an AV stream. Interactivity, which is featured by DVDs, is realized not only by navigation information stored in the aforementioned "VIDEO_TS.IFO" and "VTS_01_0.IFO". Other important navigation information is multiplexed in a VOB together with video and audio data, by using a dedicated carrier called a navigation pack (hereafter referred to as a navi pack or NV_PCK).

A menu is explained below as a simple example of interactivity. A menu screen has several buttons. For each of the buttons, a process to be performed when the button is selected and executed is defined. One button is in a selected state on the menu (the selected button is highlighted by being overlaid with a semitransparent color, to indicate the selected state of the button to a user). The user can move the highlight to any of buttons located above, below, right, and left of the currently selected button, by using Up/Down/Right/Left keys on a remote control. When the user moves the highlight to a button which the user wants to select for execution using the Up/Down/Right/Left keys on the remote control and determines the selection (e.g. by pressing an Enter key), a program of a command corresponding to the selected button is executed. Typically, playback of a title or a chapter corresponding to the selected button is executed by the command.

The upper left part of FIG. 2 roughly shows control information stored in the NV_PCK.

The NV_PCK includes highlight color information, button information for each individual button, and the like. The highlight color information includes color palette information, which specifies the semitransparent highlight color to be overlay-displayed. The button information for each individual button includes rectangular area information showing a position of the button, highlight movement information about movements from the button to other buttons (designating move destination buttons corresponding to the user's operations of the Up/Down/Right/Left keys), and button command information (a command to be executed when the selection of the button is determined).

The highlight on the menu is generated as an overlay image, as shown in the upper middle right part of FIG. 2. This overlay image is obtained by giving the color specified by the color palette information to the area shown by the rectangular area information of the button information. The overlay image is superimposed on a background image shown in the right part of FIG. 2, and the resulting image is displayed on the screen.

In this way, menus in DVDs are realized. A main reason why part of navigation data is embedded in the stream using the NV_PCK is to allow menu information to be dynamically updated in synchronization with the stream (e.g. displaying a menu only for five to ten minutes during movie playback), so that even an application that has a difficult synchronization timing can be appropriately realized. Another main reason is to improve user operability by, for example, storing information for supporting special playback in the NV_PCK so as to enable AV data to be smoothly decoded and played even when a DVD is played in a special mode such as fast-forward or rewind.

FIG. 3 is a conceptual view showing a VOB that is a stream on the DVD. As shown in FIG. 3, data such as video, audio, and subtitles (shown in the level A in FIG. 3) are packetized and packed (shown in the level B in FIG. 3) and multiplexed with each other to form one MPEG program stream (shown in the level C in FIG. 3), based on the MPEG system standard (International Organization for Standardization/International Electrotechnical Commission (ISO/IEC) 13818-1). A NV_PCK that carries a button command for realizing interactivity is multiplexed in the MPEG program stream too, as described above.

In the MPEG system, multiplexing has the following characteristic. While individual data to be multiplexed, i.e., video data, audio data, or subtitle data, is arranged in a bit string based on a decoding order, these different types of data on the whole, i.e., video data, audio data, and subtitle data altogether, are not necessarily arranged in a bit string based on a playback order. This is because a decoder model for a multiplexed MPEG system stream (generally called a System Target Decoder or an STD (shown in the level D in FIG. 3)) has decoder buffers corresponding to individual elementary streams obtained by demultiplexing, and temporarily stores demultiplexed data in the corresponding decoder buffers until decoding. For instance, decoder buffers defined by DVD-Video have different sizes depending on individual elementary streams, such that a buffer size is 232 KB for video, 4 KB for audio, and 52 KB for subtitles.

In other words, subtitle data multiplexed adjacent to video data is not necessarily decoded and played at a same timing as the video data.

There is also a next-generation DVD standard called a blu-ray disc (BD).

While DVDs are intended for package distribution of video (DVD-Video format) of a standard image quality (Standard Definition quality) and recording of analog broadcasting (DVD Video Recording format), BDs are capable of recording digital broadcasting of a high definition image quality (High Definition quality) as it is (Blu-ray Disc Rewritable format, hereafter referred to as BD-RE).

However, since BD-RE is widely intended for recording of digital broadcasting, special playback supporting information and the like have not been optimized. For future package distribution of high-resolution video at a higher rate than digital broadcasting (BD-ROM format), a mechanism that does not cause any stress on the user even during special playback is needed.

MPEG-4 Advanced Video Coding (AVC) has been employed as one of the moving image coding methods in BDs. MPEG-4 AVC is a next-generation coding standard with a high compression rate, which was jointly developed by ISO/IEC JTC1/SC29/WG11 and International Telecommunication Union—Telecommunication Standardization Sector (ITU-T).

In general, when coding a moving image, information is compressed by reducing redundancies in a temporal direction and a spatial direction. In inter-picture prediction coding that aims to reduce temporal redundancies, motion detection and generation of a predictive image are performed in units of blocks with reference to a picture which precedes and/or follows a coding target picture, and a difference between the coding target picture and the generated predictive image is coded. The term "picture" used here denotes an image of one screen. In detail, a picture denotes a frame in a progressive format, and a frame or a field in an interlaced format. In the interlaced format, one frame is made up of two fields of different times. An interlaced image can be coded and decoded by processing one frame as the frame itself, processing one frame as two fields, or processing each block of a frame as a frame structure or a field structure.

An I picture is an intra-picture prediction coded picture that has no reference image. A P picture is an inter-picture prediction coded picture that references only one picture. A B picture is an inter-picture prediction coded picture that references two pictures simultaneously. A B picture can reference any combination of two pictures that precede and/or follow the B picture in terms of display time. A reference image (reference picture) can be designated for each block that is a basic unit of coding/decoding. Here, a reference picture that is written first in a coded bit stream and a reference picture that is written later in the coded bit stream are distinguished from each other as a first reference picture and a second reference picture, respectively. Note here that, to code/decode a P picture or a B picture, its reference picture needs to have been already coded/decoded.

A residual signal that is obtained by subtracting a predictive signal generated by intra-picture prediction or inter-picture prediction from a coding target image is frequency-transformed and quantized, and then variable length coded and outputted as a coded stream. MPEG-4 AVC has two variable length coding methods, namely, context-adaptive variable length coding (CAVLC) and context-adaptive binary arithmetic coding (CABAC), that can be switched in units of pictures. The context adaptive referred to here denotes a mode of adaptively selecting an efficient coding method in accordance with circumstances.

The following describes a stream in which different coding methods (or a moving image with different attributes) can exist, and a decoding process by a decoding device that receives such a stream. Two examples are used in this specification. A first example is a case where different variable length coding methods (CAVLC/CABAC) can exist. A second example is a case where a luminance level threshold which is used when performing a transparency process by a luminance key on a picture-in-picture can take different values.

Firstly, the first example of stream in which different coding methods (or a moving image with different attributes) can exist, that is, the example where different variable length coding methods (CAVLC/CABAC) can exist, is described below. FIG. 4 shows an example of variable length coding that is applied to pictures which constitute a randomly accessible unit in an MPEG-4 AVC stream. In MPEG-4 AVC, there is no concept corresponding to a group of pictures (GOP) of MPEG-2 Video. However, by dividing data by a special unit of pictures that is able to be decoded independently of other pictures, a randomly accessible unit corresponding to a GOP can be obtained. Such a randomly accessible unit is hereafter called a random access unit (RAU). As shown in FIG. 4, whether CABAC or CAVLC is used for variable length coding is determined on a picture basis.

A variable length decoding process is different between CABAC and CAVLC. The variable length decoding process for each of CABAC and CAVLC is described below, with reference to FIGS. 5A to 5C. FIG. 5A is a block diagram of an image decoding device that performs context-adaptive binary arithmetic decoding (CABAD) as a process of decoding data which is variable length coded according to CABAC, and context-adaptive variable length decoding (CAVLD) as a process of decoding data which is variable length coded according to CAVLC.

An image decoding process according to CABAD is carried out in the following manner. Firstly, coded data Vin generated according to CABAC is inputted to a stream buffer 5001. An arithmetic decoding unit 5002 reads coded data Vr from the stream buffer 5001, performs arithmetic decoding on coded data Vr, and inputs binary data Bin1 to a binary data buffer 5003. A binary data decoding unit 5004 acquires binary data Bin2 from the binary data buffer 5003, decodes binary data Bin2, and inputs binary data Din1 obtained as a result of the decoding to a pixel reconstruction unit 5005. The pixel reconstruction unit 5005 performs processes such as inverse quantization, inverse transformation, and motion compensation on binary decoded data Din1 to reconstruct pixels, and outputs decoded data Vout. FIG. 5B is a flowchart showing an operation from the start of decoding CABAC coded data to the pixel reconstruction process. Firstly, in Step S5001, CABAC coded data Vin is arithmetic-decoded to generate binary data. Next, in Step S5002, a judgment is performed as to whether or not a predetermined unit of binary data, such as one or more pictures, has been obtained. When the predetermined unit of binary data has been obtained, the operation proceeds to Step S5003. When the predetermined unit of binary data has not been obtained, Step S5001 is repeated. This binary data buffering is performed for the following reason. In CABAC, an amount of code of binary data per picture or per macroblock may increase greatly, which can cause a significant increase in processing load for arithmetic decoding. Therefore, to realize seamless playback even in a worst case, it is necessary to conduct a certain amount of arithmetic decoding in advance. In Step S5003, the binary data is decoded. In Step S5004, the pixel reconstruction process is performed on the decoded binary data. Thus, in CABAD, the pixel reconstruction process cannot be started until the predetermined unit of binary data is obtained in Steps S5001 and S5002. This causes a delay in decoding start.

An image decoding process according to CAVLD is carried out in the following manner. Firstly, coded data Vin generated according to CAVLC is inputted to the stream buffer 5001. Next, a CAVLD unit 5006 performs variable length decoding on coded data Vr, and outputs VLD decoded data Din2 to the pixel reconstruction unit 5005. The pixel reconstruction unit 5005 performs processes such as inverse quantization, inverse transformation, and motion compensation on VLD decoded data Din2 to reconstruct pixels, and outputs decoded data Vout. FIG. 5C is a flowchart showing an operation from the start of decoding CAVLC coded data to the pixel reconstruction process. Firstly, in Step S5005, CAVLD is performed. Next, in Step S5004, the pixel reconstruction process is performed. Thus, CAVLD differs from CABAD in that there is no need to wait until the predetermined unit of data is obtained before starting the pixel reconstruction process, and there is no need to have an intermediate buffer in the variable length decoding process such as the binary data buffer 5003.

FIG. 6 is a flowchart showing an operation of a conventional decoding device that decodes a stream in which the variable length coding method is switched as in the example of FIG. 4. It should be noted that, in this specification, a decoding device and a decoding method are examples of a moving image playback device and a moving image playback method, respectively.

Firstly, in Step S5101, the decoding device acquires information showing a variable length coding method applied to a picture, and proceeds to Step S5102. In Step S5102, the decoding device judges whether or not the variable length coding method of the current picture is different from a variable length coding method of a picture immediately preceding the current picture in a decoding order. Since CABAD and CAVLD use different buffer management methods in variable length decoding, when the variable length coding method is different, the decoding device proceeds to Step S5103 to switch the buffer management. When the variable length coding method is not different, the decoding device proceeds to Step S5104. In Step S5104, the decoding device judges whether or not the variable length coding method of the current picture is CAVLC. When the variable length coding method of the current picture is CAVLC, the decoding device proceeds to Step S5105 to perform CAVLD. When the variable length coding method of the current picture is CABAC, the decoding device proceeds to Step S5106. In Step S5106, the decoding device judges whether or not the variable length coding method of the current picture is different from the variable length coding method of the immediately preceding picture in the decoding order. When the variable length coding method of the current picture is different, the decoding device proceeds to Step S5107. In Step S5107, the decoding device performs arithmetic decoding until the predetermined unit of binary data is obtained as shown in Steps S5001 and S5002 in FIG. 5, and then decodes the binary data. When the variable length coding method of the current picture is not different in Step S5106, the decoding device proceeds to Step S5108 to perform a normal CABAD process. The normal CABAD process mentioned here is a CABAD process that omits the binary data buffering which is necessary when CAVLC is switched to CABAC or when decoding of a CABAC coded stream begins. Lastly, in Step S5109, the decoding device performs the pixel reconstruction process.

The second example of stream in which different coding methods (or a moving image with different attributes) can exist, that is, the example where a luminance level threshold (i.e. a moving image attribute) which is used when performing a transparency process by a luminance key on a picture-in-picture can take different values, is described next. Package media such as a BD-ROM provide an application for displaying video other than main video, e.g. the director's commentary video, by overlaying it on the main video. Such an application is referred to as picture-in-picture. FIG. 7 is a diagram for explaining this picture-in-picture. FIG. 7(a) shows image display planes, where plane 2 is to be overlaid on plane 1. FIGS. 7(b) and 7(c) show images displayed on plane 1 and plane 2, respectively. The display image of plane 2 is overlay-displayed on the display image of plane 1 (FIG. 7(d)). In such a picture-in-picture, the image displayed on plane 1 is the main video, and the image displayed on plane 2 is the video other than the main video. Simply overlaying the display video of plane 2 on plane 1 causes the image of plane 1 to be completely hidden. To prevent this, a transparency process by a luminance key is applied to the image of plane 2. The following describes the transparency process by the luminance key. In the transparency process, each pixel in an image is displayed transparent or nontransparent depending on a luminance level of the pixel. In detail, the transparency process is as follows.

(1) When the luminance level is in a range of 0 to predetermined threshold YL inclusive, the pixel is displayed completely transparent (with a transparency rate of 1).

(2) When the luminance level exceeds predetermined threshold YL, the pixel is displayed nontransparent, at the luminance level (with a transparency rate of 0).

In FIG. 7(c), suppose the luminance level is equal to or smaller than predetermined threshold YL in the diagonally shaded area and exceeds predetermined threshold YL in the other area. In such a case, when overlaying the image of plane 2 on plane 1, the diagonally shaded area is displayed transparent while the other area is displayed nontransparent, as shown in FIG. 7(d). Which is to say, in the image of plane 2, only an area (pixel) whose luminance level exceeds threshold YL is overlay-displayed on the image of plane 1. Thus, plane 2 is separated into a foreground and a background according to the luminance level threshold and only the foreground is overlay-displayed on plane 1, thereby realizing a picture-in-picture.

Patent Reference 1: Japanese Unexamined Patent Application No. 2000-228656 Publication Non Patent Reference 1: Proposed SMPTE Standard for Television: VC-1 Compressed Video Bitstream Format and Decoding Process, Final Committee Draft 1 Revision 6, 2005.7.13.

DISCLOSURE OF INVENTION

Problems that Invention is to Solve

However, a decoding device that receives a stream in which different coding methods (or a moving image with different attributes) can exist as described above has the following problem: a processing load increases due to the need for a switching process during decoding. FIG. 8 is a diagram for explaining a problem that can arise when the transparency process by the luminance key is applied to a conventional recording medium generated by a conventional multiplexing device. FIG. 8 shows sections during which video that is subject to the transparency process by the luminance key is continuously played. In detail, section 1, section 2, and section 3 are to be continuously played in this order. A luminance level threshold for a pixel that is displayed transparent with a transparency rate of 1 is 20 in section 1, 40 in section 2, and 30 in section 3. This makes it necessary to change the luminance level threshold for a transparent pixel when one section ends and another begins. When the luminance level threshold is changed, an operation for plane overlaying needs to be changed, too. A delay occurs due to this operation change. This causes playback to become discontinuous between sections that need to be played seamlessly.

Thus, when playing a conventional recording medium on which a multiplexed stream generated by a conventional image coding method is recorded, a luminance key threshold is changed in units of playback sections, which incurs a problem of a delay in luminance level threshold processing at the time of playback.

The present invention aims to provide a recording medium, a moving image coding method, a moving image coding device, a moving image recording method, a moving image playback method, a moving image playback device, and a moving image playback system that can suppress playback discontinuity without an increase in processing load during playback.

Means to Solve the Problems

The present invention was conceived to solve the above problem.

The moving image coding method according to the present invention is characterized by coding, in a section that is subject to continuous playback (a continuous playback section), a moving image without switching a coding method (or a moving image attribute), and generating management information which includes flag information indicating that the coding method is fixed in the section.

In more detail, for addressing the picture-in-picture case, the moving image coding method according to the present invention is a moving image coding method for coding a video stream that includes a first moving image and a second moving image to be overlaid on the first moving image, the overlaying being performed by overlaying only an image area whose luminance level exceeds a threshold in the second moving image, on the first moving image, the moving image coding method including: determining a continuous playback section that is a group of partial sections and is subject to continuous playback, in the video stream; coding the first moving image and the second moving image in the partial sections which constitute the continuous playback section determined in the determining, under a constraint that prevents the threshold from being changed in the continuous playback section; generating management information including flag information which indicates that the threshold is fixed in the continuous playback section; and combining the first moving image and the second moving image coded in the coding, with the management information generated in the generating, and outputting the combination.

Furthermore, the moving image coding device according to the present invention is a moving image coding device for coding a video stream that includes a first moving image and a second moving image to be overlaid on the first moving image, the overlaying being performed by overlaying only an image area whose luminance level exceeds a threshold in the second moving image, on the first moving image, the moving image coding device including: a continuous playback section determination unit which determines a continuous playback section that is a group of partial sections and is subject to continuous playback, in the video stream; a coding unit which codes the first moving image and the second moving image in the partial sections which constitute the continuous playback section determined by the continuous playback section determination unit, under a constraint that prevents the threshold from being changed in the continuous playback section; a management information generation unit which generates management information including flag information which indicates that the threshold is fixed in the continuous playback section; and a combination unit which combines the first moving image and the second moving image coded by the coding unit, with the management information generated by the management information generation unit, and outputs the combination.

Furthermore, the moving image recording method according to the present invention is a moving image recording method for coding a video stream and recording the coded video stream onto a recording medium, the video stream including a first moving image and a second moving image to be overlaid on the first moving image, the overlaying being performed by overlaying only an image area whose luminance level exceeds a threshold in the second moving image, on the first moving image, the moving image recording method including: determining a continuous playback section that is a group of partial sections and is subject to continuous playback, in the video stream; coding the first moving image and the second moving image in the partial sections which constitute the continuous playback section determined in the determining, under a constraint that prevents the threshold from being changed in the continuous playback section; generating management information including flag information which indicates that the threshold is fixed in the continuous playback section; and combining the first moving image and the second moving image coded in the coding, with the management information generated in the generating, and recording the combination onto the recording medium.

Furthermore, the recording medium according to the present invention is a recording medium on which computer-readable data is recorded, the computer-readable data including: a video stream including a first moving image and a second moving image to be overlaid on the first moving image, the overlaying being performed by overlaying only an image area whose luminance level exceeds a threshold in the second moving image, on the first moving image; and management information used for managing the video stream, wherein under a constraint that prevents the threshold from being changed in a continuous playback section that is a group of partial sections and is subject to continuous playback in the video stream, the first moving image and the second moving image in the partial sections which constitute the continuous playback section have been coded, and the management information includes flag information which indicates that the threshold is fixed in the continuous playback section.

Furthermore, the moving image playback method according to the present invention is a moving image playback method for decoding a coded video stream including a first moving image and a second moving image and overlay-displaying the second moving image on the first moving image, the moving image playback method including: obtaining management information corresponding to the video stream and analyzing the obtained management information; decoding the first moving image and the second moving image in accordance with the analysis in the analyzing; and overlay-displaying only an image area whose luminance level exceeds a threshold in the decoded second moving image, on the decoded first moving image, wherein the analyzing includes judging whether or not the management information includes flag information indicating that the threshold is fixed, and the overlay-displaying includes overlay-displaying the image area in a current partial section by using a same threshold as an immediately preceding partial section, when the judgment in the analyzing is that the management information includes the flag information.

Furthermore, the moving image playback device according to the present invention is a moving image playback device for decoding a coded video stream including a first moving image and a second moving image and overlay-displaying the second moving image on the first moving image, the moving image playback device including: a management information processing unit which obtains management information corresponding to the video stream and analyzes the obtained management information; a decoding unit which decodes the first moving image and the second moving image in accordance with the analysis by the management information processing unit; and a display unit which overlay-displays only an image area whose luminance level exceeds a threshold in the decoded second moving image, on the decoded first moving image, wherein the management information processing unit judges whether or not the management information includes flag information indicating that the threshold is fixed, and the display unit overlay-displays the image area in a current partial section by using a same threshold as an immediately preceding partial section, when the management information processing unit judges that the management information includes the flag information.

Furthermore, the moving image playback system according to the present invention is a moving image playback system including the above recording medium and a moving image playback device for reading data recorded on the recording medium and playing the read data, the moving image playback device including: a management information processing unit which reads the management information from the recording medium and analyzes the read management information; a decoding unit which reads the first moving image and the second moving image from the recording medium and decodes the first moving image and the second moving image, in accordance with the analysis by the management information processing unit; and a display unit which overlay-displays only an image area whose luminance level exceeds a threshold in the decoded second moving image, on the decoded first moving image, wherein the management information processing unit judges whether or not the management information includes flag information indicating that the threshold is fixed, and the display unit overlay-displays the image area in a current partial section by using a same threshold as an immediately preceding partial section, when the management information processing unit judges that the management information includes the flag information.

It should be noted that the present invention can be realized not only as the above moving image coding method, moving image coding device, moving image recording method, recording medium, moving image playback method, moving image playback device, and moving image playback system. The present invention can also be realized as a program for having a computer execute the steps included in each of the above methods, a computer readable recording medium such as a DVD on which the program is recorded, or a semiconductor integrated circuit such as a LSI that includes the structural units of each of the above devices.

Effects of the Invention

As described above, according to the moving image coding method and the like of the present invention, in a section that is subject to continuous playback, a moving image is coded without switching a coding method (or a moving image attribute), and management information which includes flag information indicating that the coding method is fixed in the section is generated. A playback device that receives (or reads from a recording medium) a moving image and management information of such a data structure does not need to perform a process for monitoring the switching of the coding method or the moving image attribute. Accordingly, a processing load can be alleviated.

Which is to say, regarding a picture-in-picture, a luminance level threshold used for judging whether or not to display each pixel transparent is fixed in coded data of a moving image in a continuous playback section. As a result, a delay in playback caused by switching the threshold is suppressed, with it being possible to achieve seamless playback. This contributes to an improved playback quality of package media, distribution applications, and the like for overlay-displaying a moving image on a moving image, graphics, a static image, or the like. Moreover, a processing load of a playback device that realizes such an application can be reduced. Hence the present invention has a high practical value.

BRIEF DESCRIPTION OF DRAWINGS

FIG. 37 shows a player variable table.
FIG. 42 is a flowchart showing event processing.
FIG. 46 is a diagram for explaining a flag ensuring that the luminance key threshold is fixed.
FIG. 48 is a diagram for explaining multiplexing of primary video and secondary video.

NUMERICAL REFERENCES

Figure 1:
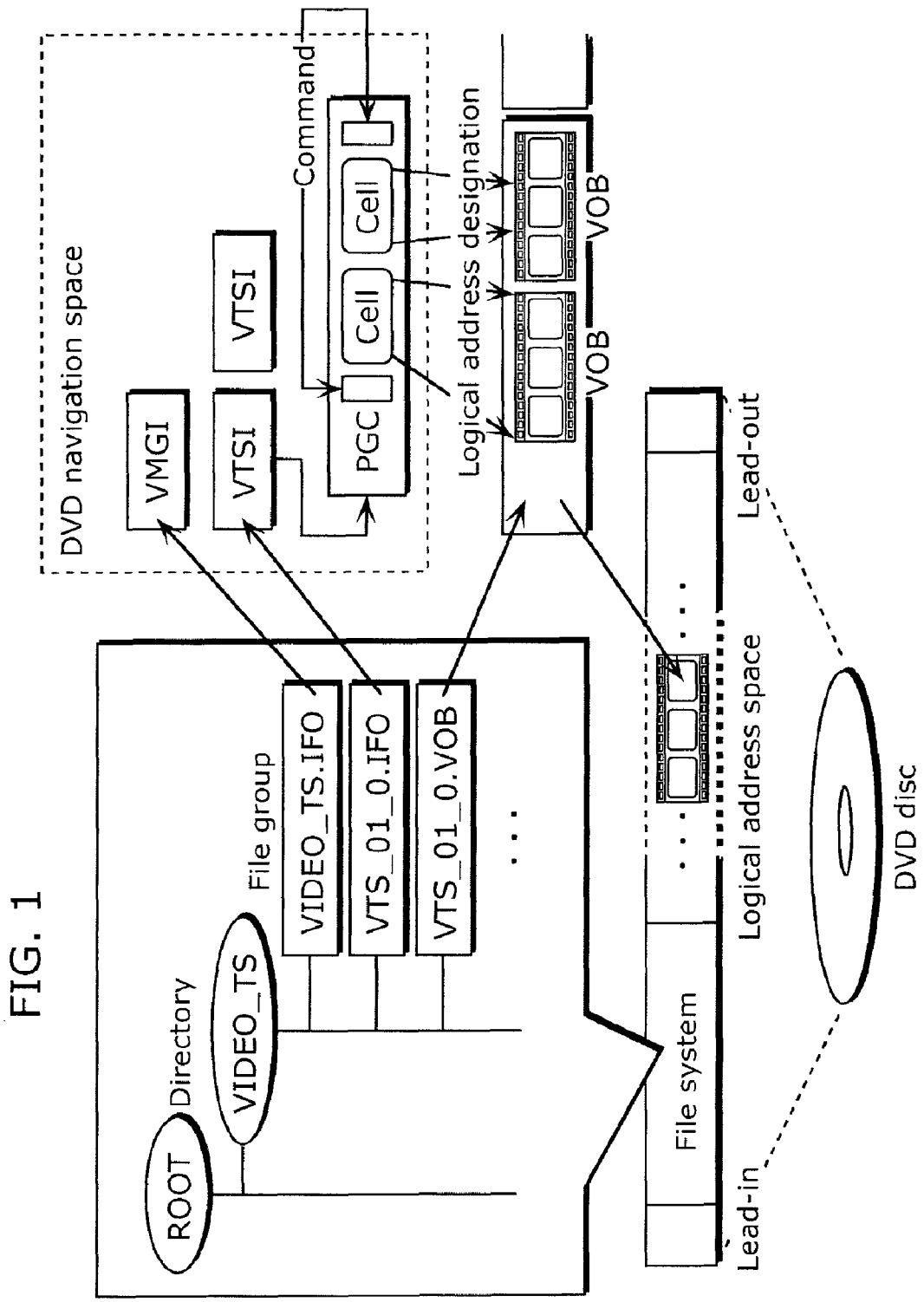
FIG. 1 shows a structure of a DVD.
Figure 2:
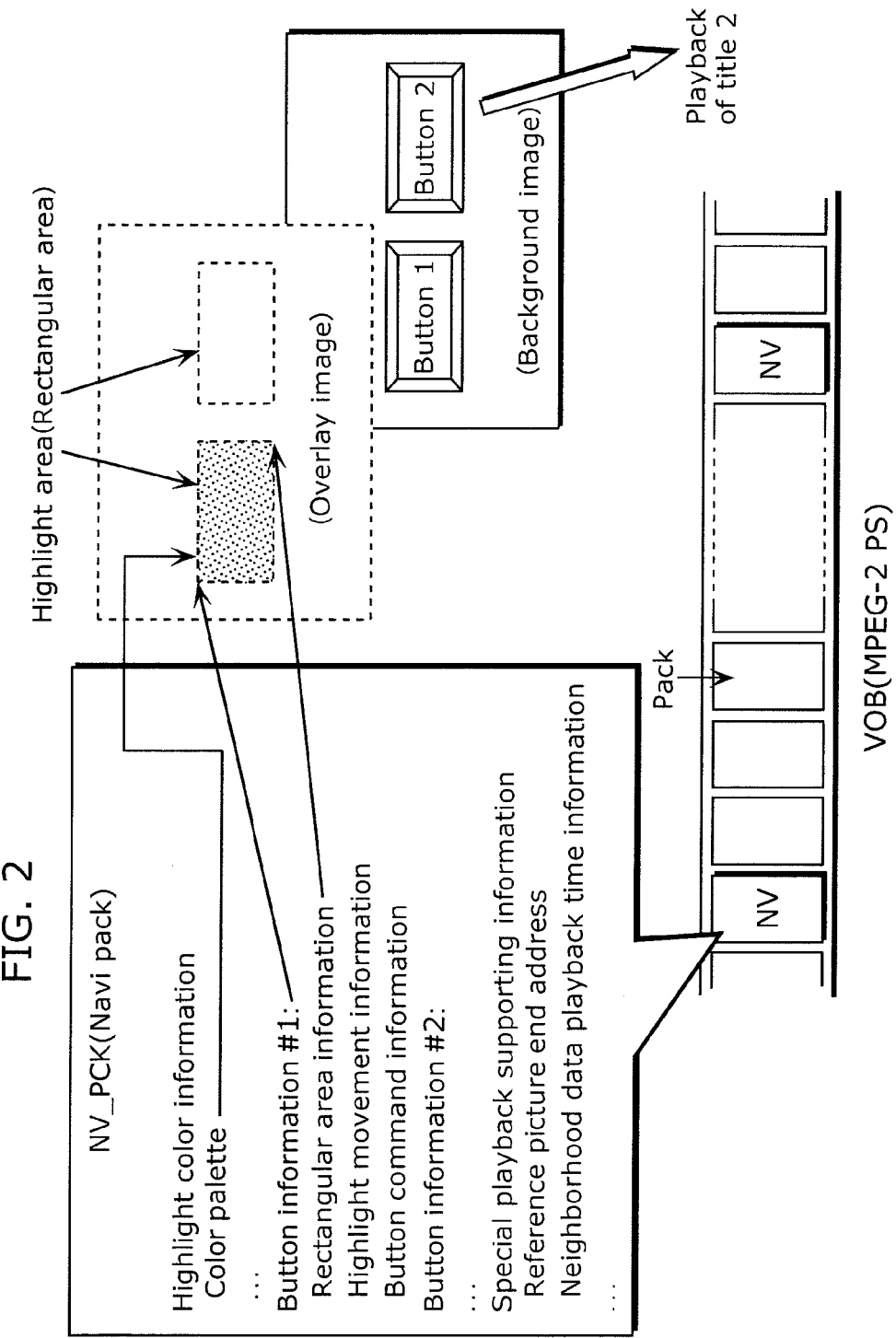
FIG. 2 shows a structure of a highlight.
Figure 3:
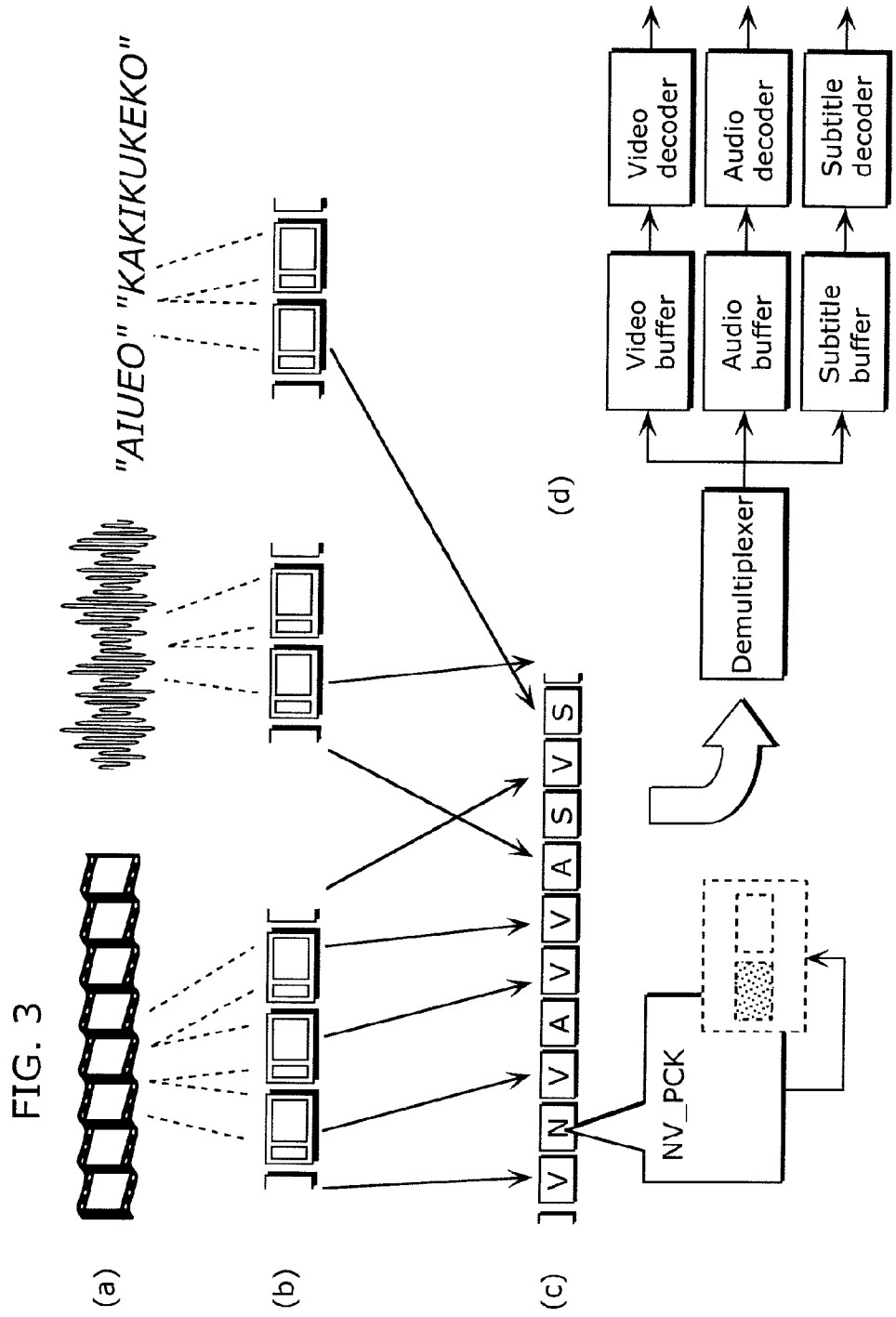
FIG. 3 shows an example of multiplexing in a DVD.
Figure 4:
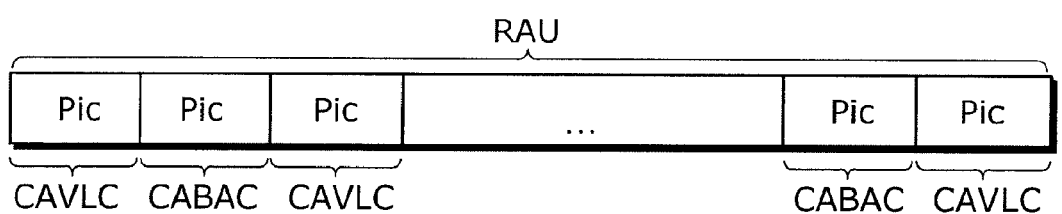
FIG. 4 shows an example of variable length coding adopted on a picture basis in a conventional MPEG-4 AVC stream.
Figure 5:
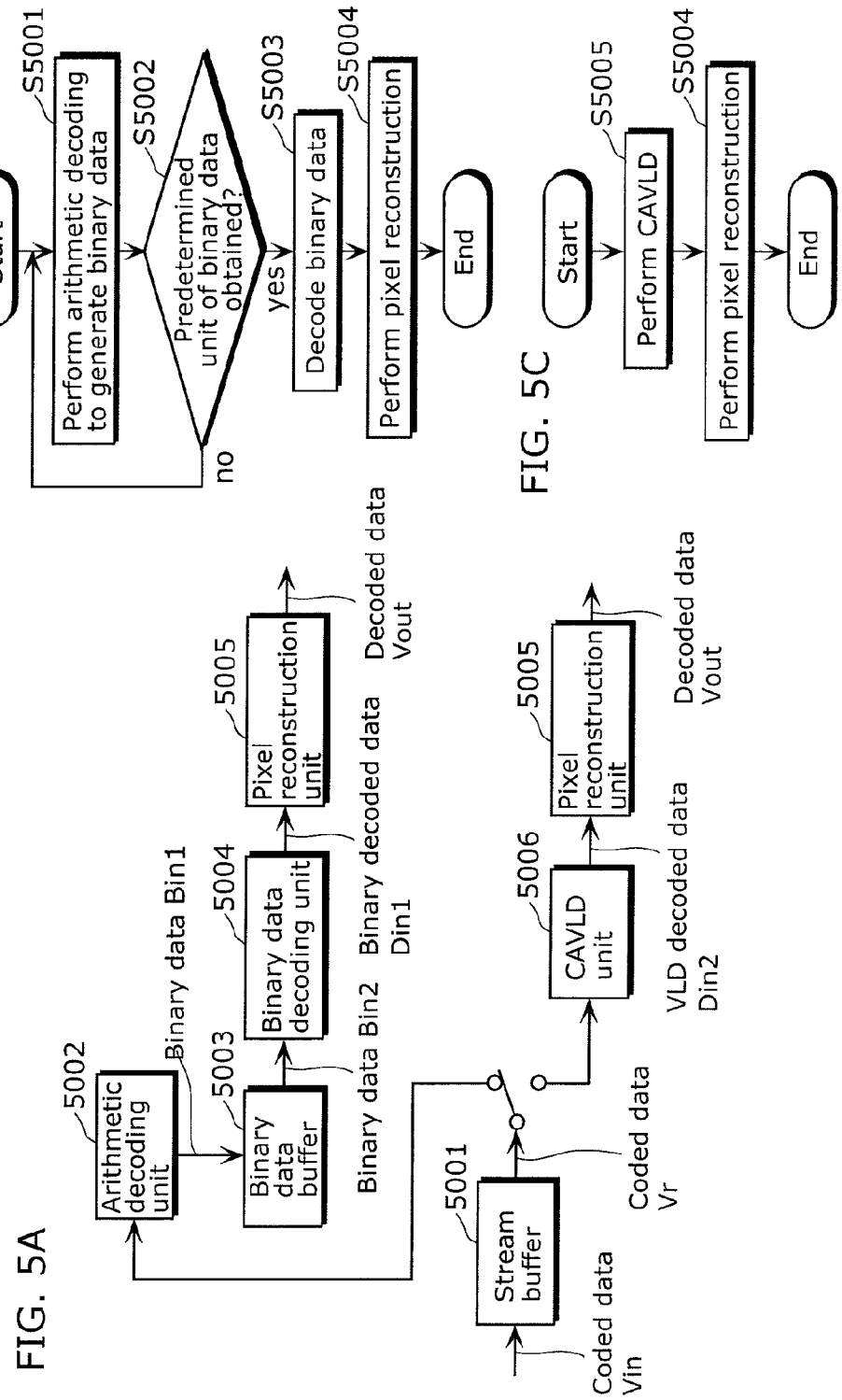
FIG. 5A is a block diagram showing a structure of a decoding device for decoding a stream which has been coded according to CABAC and CAVLC.
FIG. 5B is a flowchart showing an operation of decoding a CABAC coded stream.
FIG. 5C is a flowchart showing an operation of decoding a CAVLC coded stream.

104, 201 BD disc
202 Optical pickup
203 Program storage memory
204 Management information storage memory
205 AV storage memory
206 Program processing unit
207 Management information processing unit 208 Presentation processing unit
209 Image plane
210 Video plane
211 Composition processing unit
301 Program storage memory
302 Program processor
303 UOP manager
304 Management information storage memory
305 Scenario processor
306 Presentation controller
307 Clock
308 Image memory
309 Track buffer
310 Demultiplexer
311 Image processor
312 Video processor
313 Sound processor
314 Image plane
315 Video plane
316 Composition processing unit
317 Drive controller
S101 Disc insertion step
S102 BD.INFO reading step
S103 BD.PROG reading step
S104 First event generation step
S105 Event handler execution step
S201 UOP reception judgment step
S202 UOP event generation step
S203 Menu call judgment step
S204 Event generation step
S205 Event handler execution step
S301 Playlist playback start step
S302 Playlist information (XXX.PL) reading step
S303 Playlist program (XXX.PROG) reading step
S304 Cell playback start step
S305 AV playback start step
S401 AV playback start step
S402 VOB information (YYY.VOBI) reading step
S403 VOB (YYY.VOB) reading step
S404 VOB playback start step
S405 VOB playback end judgment step
S406 Next cell judgment step
S501 Playlist playback start step
S502 Playlist playback end judgment step
S503 Time event time judgment step
S504 Event generation step
S505 Event handler execution step
S601 Playlist playback start step
S602 Playlist playback end judgment step
S603 UOP reception judgment step
S604 UOP event generation step
S605 Menu call judgment step
S606 User event valid period judgment step
S607 Event generation step
S608 Event handler execution step
S701 Playlist playback start step
S702 Playlist playback end judgment step
S703 Subtitle drawing start judgment step
S704 Subtitle drawing step
S705 Subtitle display end judgment step
S706 Subtitle deletion step

BEST MODE FOR CARRYING OUT THE INVENTION

A moving image coding method to which the present invention relates is characterized by coding a moving image without switching a coding method (or a moving image attribute) in a section that is subject to continuous playback (a continuous playback section), and generating management information which includes flag information indicating that the coding method is fixed in the continuous playback section.

The following describes embodiments of the present invention with reference to drawings.

First Embodiment

The first example of stream in which different coding methods (or a moving image with different attributes) can exist, that is, the example where different variable length coding methods (CAVLC/CABAC) can exist, is described below as a first embodiment of the present invention.

The first embodiment describes a recording medium and a playback device for the recording medium that can suppress, when decoding coded data of a moving image on a package medium such as a BD-ROM, a delay in decoding operation caused by switching a variable length coding method and an increase in processing load caused by switching a buffer management method, where the buffer management method switching accompanies the variable length coding method switching. Though this embodiment describes the use of MPEG-4 AVC as an example moving image coding method, other moving image coding methods that allow for switching between different variable length coding methods in a stream are equally applicable.

In an MPEG-4 AVC stream recorded on the recording medium of this embodiment, a constraint is imposed on a unit per which a variable length coding method is switchable (hereafter referred to as a "variable length coding method switchable unit"), and information indicating that the variable length coding method switchable unit is constrained (i.e. restricted) and/or information showing the constrained variable length coding method switchable unit is included in management information.

Figure 9:
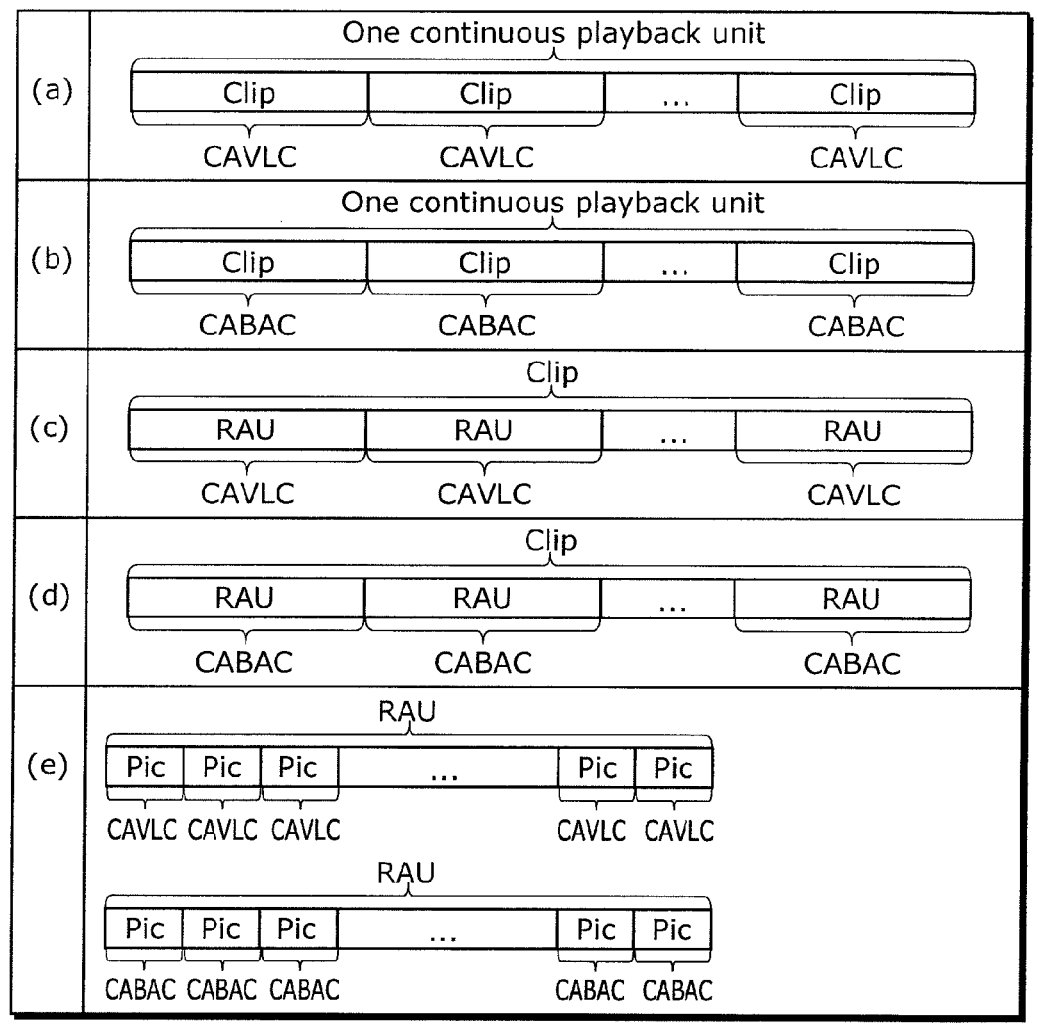
FIG. 9 shows an example of variable length coding adopted on a picture basis in an MPEG-4 AVC stream recorded on a recording medium in a first embodiment of the present invention.

FIG. 9 shows examples of constraining the variable length coding method switchable unit in the MPEG-4 AVC stream. In a package medium such as a BD-ROM, a unit per which coded data of a moving image is continuously played (hereafter referred to as a "continuous playback unit") is shown by a playlist and the like. When a variable length coding method is fixed in this continuous playback unit, neither the delay in decoding operation caused by the variable length coding method switching nor the increase in processing load caused by the buffer management method switching occurs in a section that is continuously played. Accordingly, in this embodiment, the variable length coding method is fixed in the continuous playback unit. FIGS. 9(a) and 9(b) show examples of constraining the variable length coding method in one continuous playback unit to CAVLC and CABAC, respectively. Here, there are two types of connection condition for clips that are played continuously, namely, seamless connection and non-seamless connection. The connection mentioned here includes a case of connecting a plurality of sections within a same clip. In non-seamless connection, a gap may occur in decoding operation as in a case of connecting to an open GOP. In view of this, the variable length coding method may be fixed only in a continuous playback unit of seamless connection, while permitting the variable length coding method switching in a continuous playback unit of non-seamless connection.

Alternatively, the variable length coding method may be fixed in a unit, such as a clip or a random access unit (RAU), other than the continuous playback unit. FIGS. 9(c) and 9(d) show examples of fixing the variable length coding method per clip, whereas FIG. 9(e) shows examples of fixing the variable length coding method per random access unit.

Figure 10:
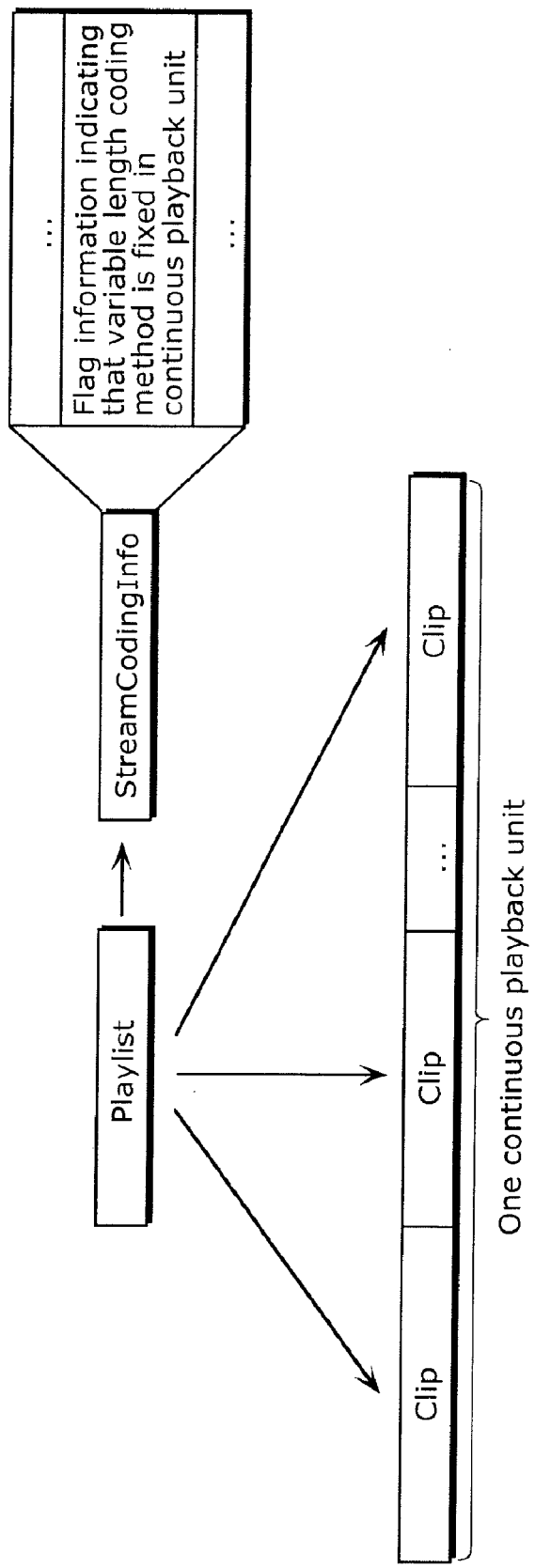
FIG. 10 shows a storage example of flag information showing a unit per which a variable length coding method is fixed, in the recording medium.

Also, flag information indicating that the variable length coding method switchable unit is constrained in the MPEG-4 AVC stream is included in the management information. Here, identification information of a coding method is used as a flag. FIG. 10 shows a storage example of the flag on a BD-ROM. In BD-ROMs, a coding method of each clip referenced by a playlist is stored in an area called StreamCodingInfo in management information. This StreamCodingInfo can be used such that, when MPEG-4 AVC is specified as the coding method in the StreamCodingInfo, it means the variable length coding method is fixed in a continuous playback unit. Moreover, information showing whether the variable length coding method is CABAC or CAVLC may be provided, too.

As an alternative, a flag indicating that the variable length coding method switchable unit is constrained may be separately defined and included in the management information. Information showing the variable length coding method switchable unit may further be included. Moreover, these information may be included within the MPEG-4 AVC stream. For instance, information indicating that the variable length coding method is fixed in pictures which constitute a random access unit can be stored in a network abstraction layer (NAL) unit of supplemental enhancement information (SEI) or Unspecified type in a beginning picture of the random access unit.

In MPEG-4 AVC, an entropy_coding_mode_flag in a picture parameter set (PPS) which shows initialization information on a picture basis indicates whether the variable length coding method is CAVLC or CABAC. Therefore, when the variable length coding method is fixed in a predetermined section, a field value of the entropy_coding_mode_flag is fixed in all PPSs referenced by pictures in that section. In MPEG-4 AVC, a PPS not referenced by any picture existing in one section in a decoding order can be stored in that section. In such a case, it is not necessary to limit a field value of the entropy_coding_mode_flag in the PPS not referenced by any picture in the section. For example, while PPSs referenced by pictures in a random access unit are all included in that random access unit, a PPS not referenced by any picture in the random access unit may also exist in the random access unit. In this case, since the non-referenced PPS has no influence on decoding, a field value of the entropy_coding_mode_flag in the non-referenced PPS need not be limited. However, given that processing is easier if the entropy_coding_mode_flag in each PPS included in the section has a same field value, the field value of the entropy_coding_mode_flag may be fixed including the non-referenced PPS.

Figure 6:
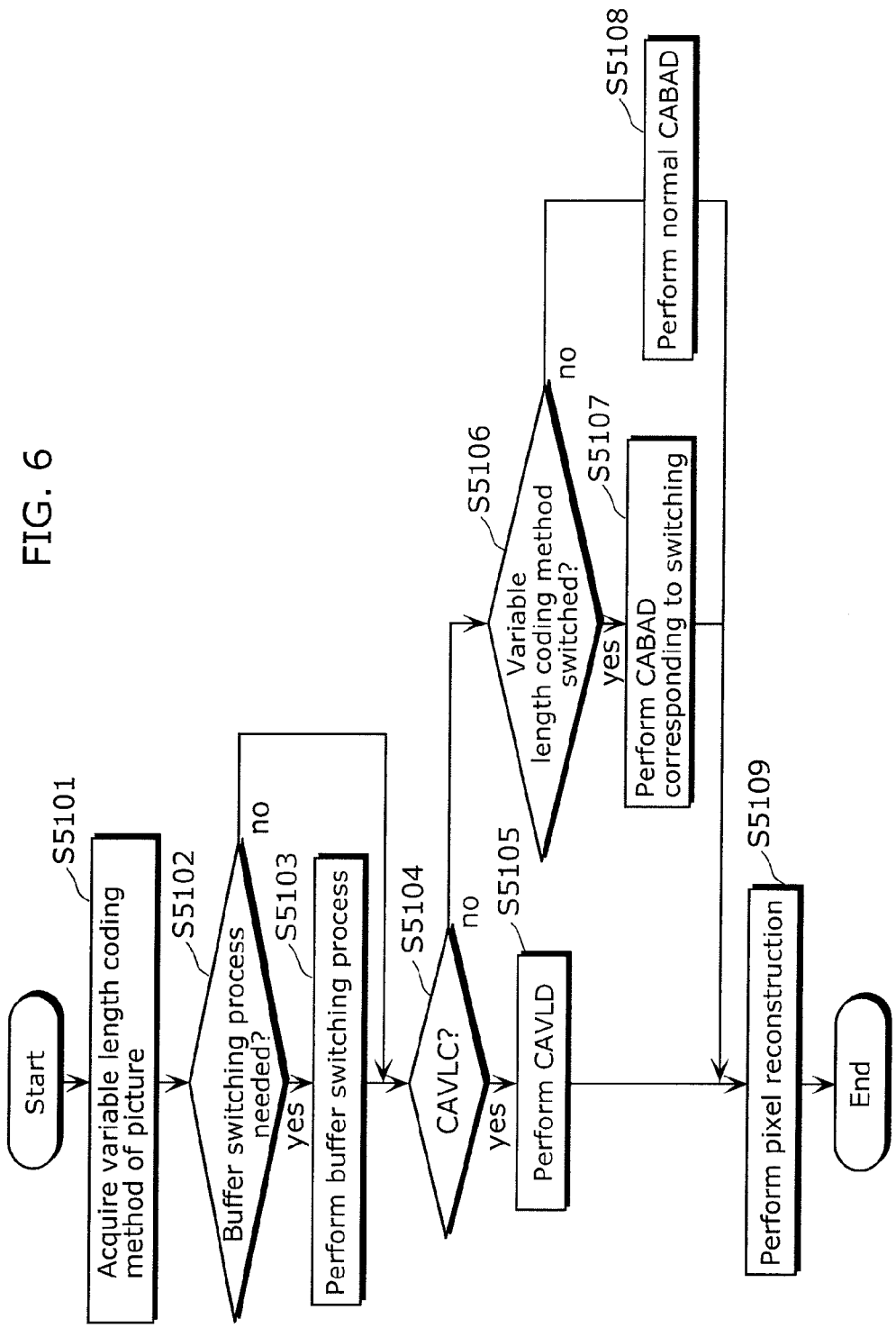
FIG. 6 is a flowchart showing an operation of a conventional decoding device.
Figure 7:
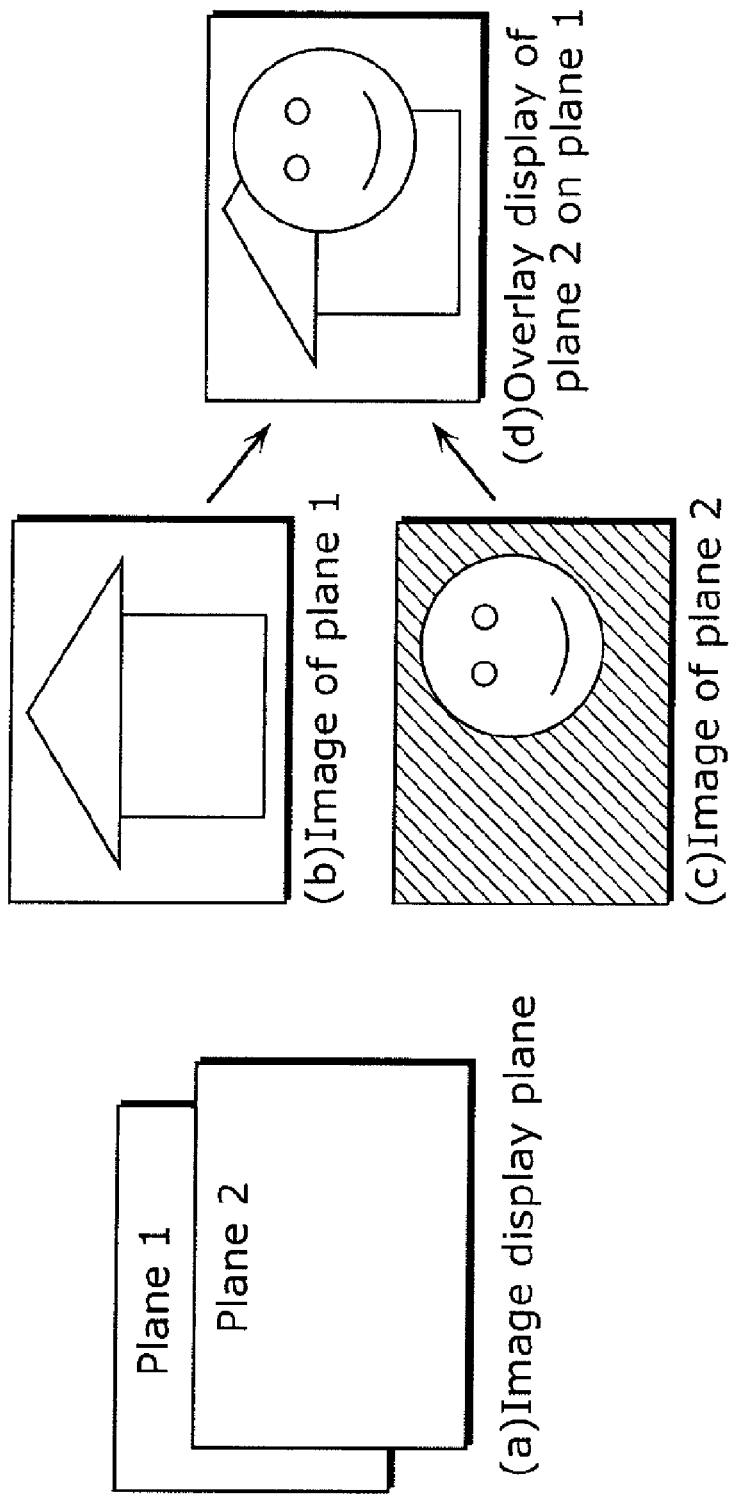
FIG. 7 shows a display example of a picture-in-picture.
Figure 8:
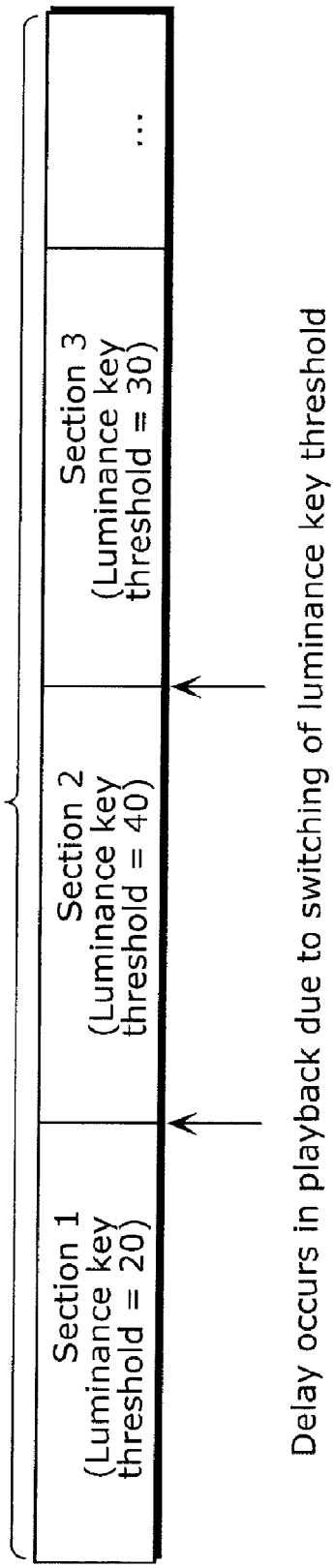
FIG. 8 is a diagram for explaining a problem caused by switching a luminance key threshold in a continuous playback section.
Figure 11:
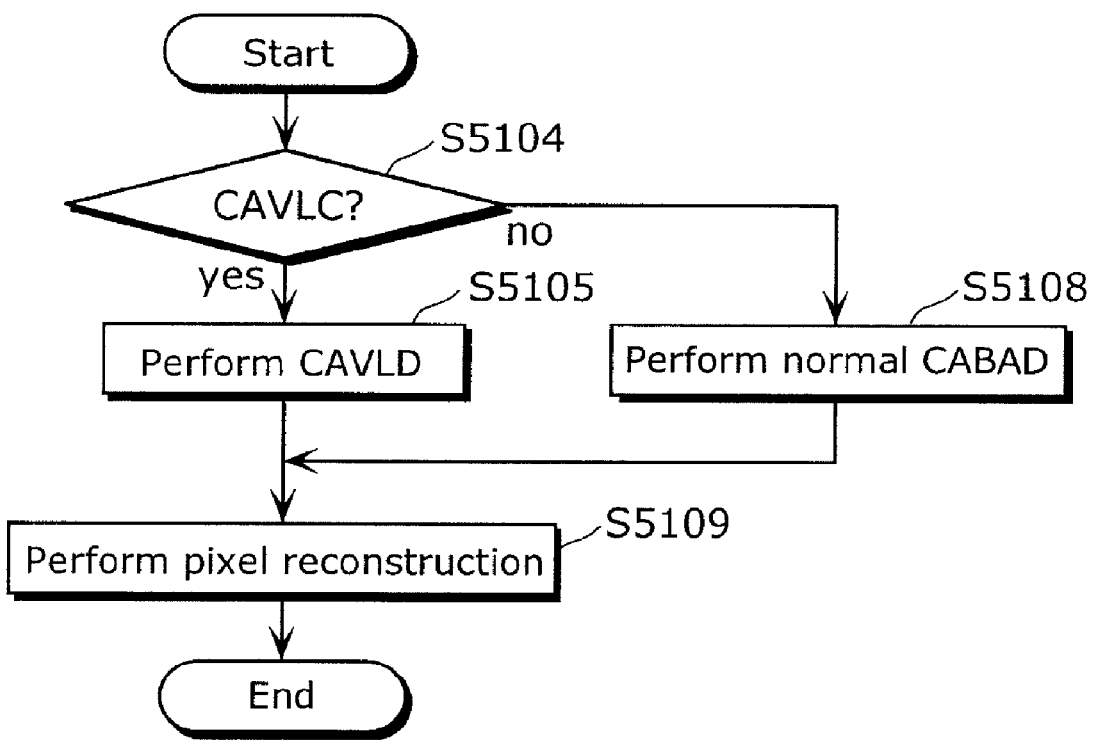
FIG. 11 is a flowchart showing an operation of a decoding device for playing the recording medium.

FIG. 11 is a flowchart showing an operation of decoding a continuous playback unit on the recording medium of this embodiment. In this embodiment, the variable length coding method is fixed per continuous playback unit. Accordingly, the binary data buffering and the buffer management method switching during decoding are unnecessary, unlike the conventional decoding operation shown in FIG. 6. An operation performed in each step in FIG. 11 is the same as the step having the same reference numeral in FIG. 6, and so its explanation has been omitted here.

A new coding method called VC-1 (see Non Patent Reference 1) is currently in a process of standardization by the Society of Motion Picture and Television Engineers (SMPTE). In VC-1, various flags showing coding methods of macroblocks (a unit having a size of 16×16 pixels) are defined. Examples of such flags include a flag showing whether or not a macroblock is a skip macroblock, a flag showing whether a macroblock is of a field mode or a frame mode, and a flag showing whether or not a macroblock is a direct mode macroblock.

Bitplane coding is one of the extended coding tools. Bitplane coding is used to show the above flags that indicate coding methods of macroblocks. Bitplane coding enables flags corresponding to one picture to be shown altogether in a picture header. In general, adjacent macroblocks have a high correlation, and so flags corresponding to the adjacent macroblocks have a high correlation, too. Therefore, by coding flags of adjacent macroblocks altogether, an amount of code representing such flags can be reduced.

Seven types of coding methods are defined in bitplane coding. One of them is a method of coding each flag in a macroblock header. This method is called a raw mode, and is similar to that of MPEG-2 Video or MPEG-4 Visual. The other six methods code flags corresponding to one picture altogether, and differ from each other depending on how flags of adjacent macroblocks are combined for coding. For instance, the six methods include a method of coding flags of two horizontally adjacent macroblocks together, and a method of expressing by one bit "0" when all flags of macroblocks in one horizontal row are "0", and coding each flag as it is when at least one of the flags is "1".

Which of the seven methods is used in bitplane coding can be changed in units of pictures, for each individual flag.

Suppose, in bitplane coding, mode 1 denotes the use of only the method of coding each flag in a macroblock header, and mode 2 denotes the use of only the method of coding flags corresponding to one picture altogether. Since mode 1 and mode 2 differ in decoding operation, a processing load increases when one mode is switched to the other, which can cause a delay. In view of this, a constraint may be imposed on a unit per which the mode is switchable between mode 1 and mode 2 in bitplane coding, in the same way as the above constraint on the variable length coding method switchable unit. As one example, the bitplane coding mode may be fixed in a continuous playback unit or in a continuous playback unit of seamless connection. Also, flag information indicating that the bitplane coding mode is fixed in a predetermined unit may be included in management information. For instance, the StreamCodingInfo can be used as such flag information. In this case, when VC-1 is specified as the coding method by the StreamCodingInfo, it means the bitplane coding mode is fixed in a predetermined unit.

Furthermore, suppose mode 3 denotes the use of both the method of coding each flag in a macroblock header and the method of coding flags corresponding to one picture altogether. There may be cases where mode 1 and mode 3 are selectively used depending on an environment in which VC-1 is applied. One example is to use mode 1 for a terminal with a low processing capacity, and mode 3 for a terminal with a high processing capacity. In such a case, it is effective to fix the bitplane coding mode to one of mode 1 and mode 3 in a predetermined playback unit. Also, flag information indicating that the bitplane coding mode is fixed to one of mode 1 and mode 3, or information showing which of mode 1 and mode 3 the bitplane coding mode is fixed to, may be included in management information or a coded stream. Here, mode 2 and mode 3 may be selectively used instead of mode 1 and mode 3.

Figure 12:
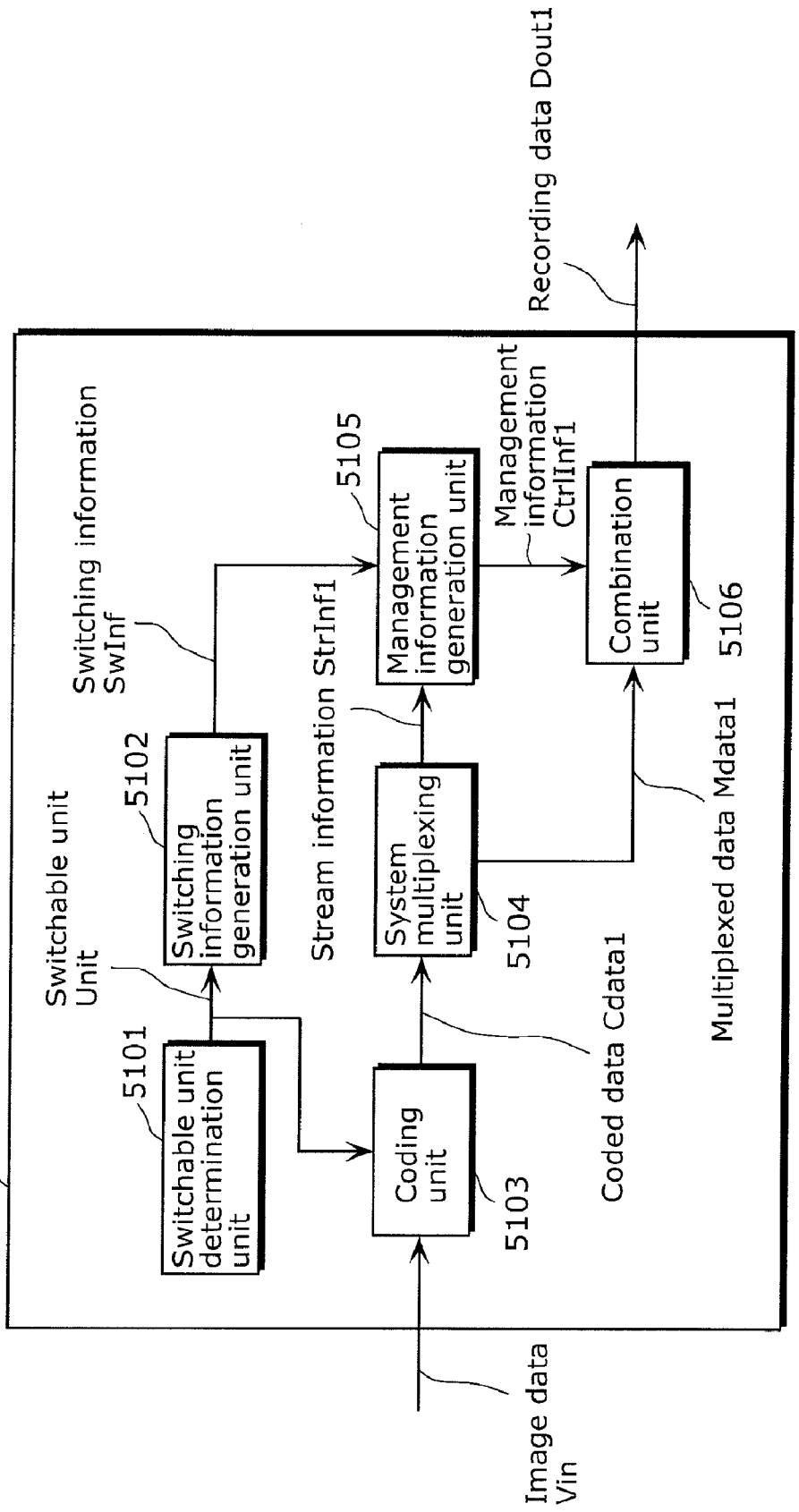
FIG. 12 is a block diagram showing a structure of a multiplexing device in the first embodiment of the present invention.

FIG. 12 is a block diagram showing a structure of a multiplexing device 5100 for realizing a multiplexing method of this embodiment. The multiplexing device 5100 includes a switchable unit determination unit 5101, a switching information generation unit 5102, a coding unit 5103, a system multiplexing unit 5104, a management information generation unit 5105, and a combination unit 5106. An operation of each of the structural units is described below.

The switchable unit determination unit 5101 determines the unit per which the variable length coding method is switchable, and inputs the determined unit to the switching information generation unit 5102 and the coding unit 5103 as switchable unit Unit. It is assumed here that the switchable unit has been set beforehand, though the switchable unit may instead be set from the outside. The switching information generation unit 5102 generates switching information SwInf showing the variable length coding method switchable unit based on switchable unit Unit, and inputs switching information SwInf to the management information generation unit 5105. The coding unit 5103 codes data of each clip so as to meet the constraint of switchable unit Unit, and inputs coded data Cdata1 to the system multiplexing unit 5104. The system multiplexing unit 5104 performs system multiplexing on coded data Cdata1, and inputs stream information StrInf1 to the management information generation unit 5105 and multiplexed data Mdata1 to the combination unit 5106. In BD-ROMs, a system multiplexing method called a source packet in which a 4-byte header is added to an MPEG-2 transport stream is employed. Also, stream information StrInf1 includes information for generating management information for multiplexed data Mdata1, such as a time map. The management information generation unit 5105 generates management information CtrlInf1 that includes switching information SwInf, the time map generated based on stream information StrInf1, and the like, and inputs management information CtrlInf1 to the combination unit 5106. The combination unit 5106 combines management information CtrlInf1 and multiplexed data Mdata1, and outputs the combination as recording data Dout1.

Note here that, when generating data by using an authoring tool or the like, there is a case where the generation of coded data and the system multiplexing or the generation of management information are conducted by separate devices. In such a case, the above multiplexing method can be achieved by these separate devices operating in the same way as the structural units in the multiplexing device 5100.

Figure 13:
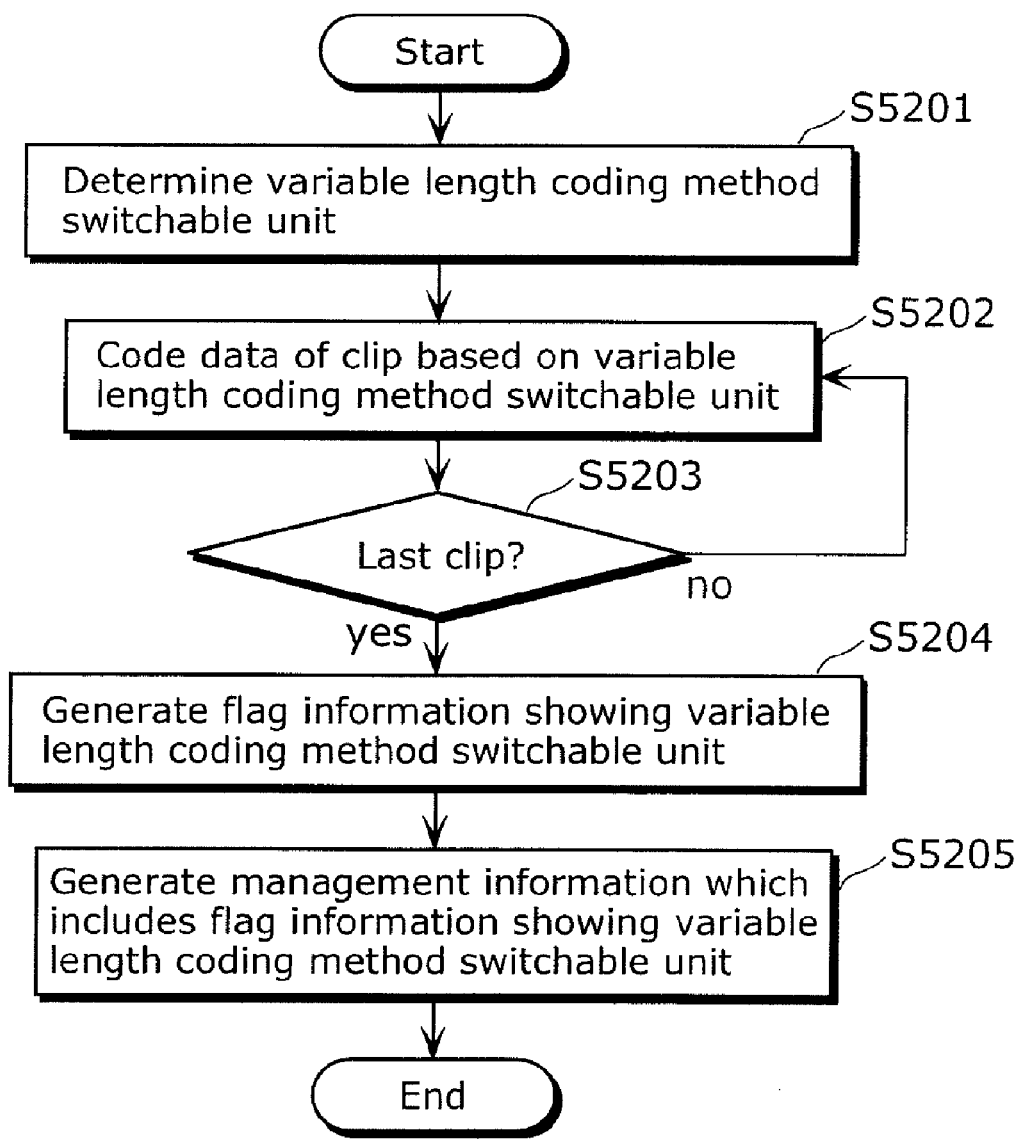
FIG. 13 is a flowchart showing an operation of the multiplexing device.

FIG. 13 is a flowchart showing an operation of a multiplexing method for generating multiplexed data recorded on the recording medium in this embodiment. The multiplexing is method of this embodiment differs from the conventional multiplexing method in that it includes a step of determining the unit per which the variable length coding method is switchable (Step S5201), a step of coding each clip based on the determined variable length coding method switchable unit (Step S5202), and a step of generating flag information showing the variable length coding method switchable unit (Step S5204).

Firstly, in Step S5201, the variable length coding method switchable unit is determined. In detail, one of a continuous playback unit, a clip, and a random access unit is determined as the variable length coding method switchable unit. In Step S5202 which follows, data of an MPEG-4 AVC clip is coded based on the variable length coding method switchable unit determined in Step S5201. In Step S5203, a judgment is performed as to whether or not coding of a last clip ends. When the coding of the last clip ends, the operation proceeds to Step S5204. When the coding of the last clip has not ended, the operation returns to Step S5202 to repeat clip coding. In Step S5204, flag information showing the variable length coding method switchable unit is generated, and the operation proceeds to Step S5205. In Step S5205, management information including the flag information generated in Step S5204 is generated, and the management information and the coded clip data are multiplexed with each other and outputted.

Figure 14:
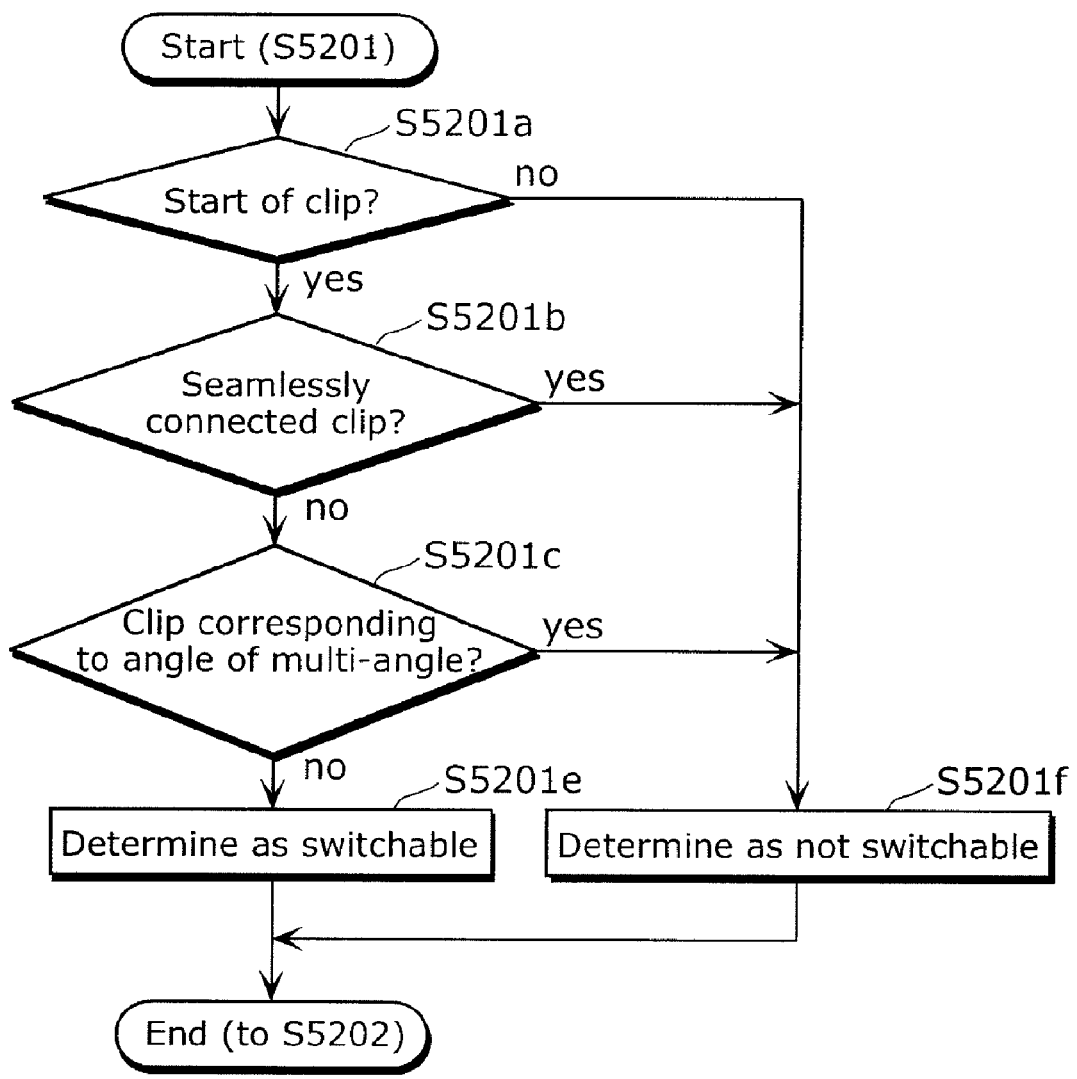
FIG. 14 is a flowchart showing a specific example of Step S5201 shown in FIG. 13.

FIG. 14 is a flowchart showing a specific example of the step (Step S5201) of determining the variable length coding method switchable unit in FIG. 13. In FIG. 14, a clip is a minimum unit per which the variable length coding method is switchable, as shown in FIGS. 9(c) and 9(d). A clip mentioned here is recorded on the recording medium as a file of AV data, and is a single file that stores, for example, one stream of MPEG-4 AVC or one stream of VC-1. In a transport stream, a clip is a stream specified by a TS packet identifier.

In FIG. 14, the switchable unit determination unit 5101 judges whether or not a coding target picture is a beginning picture of a clip (Step S5201a). When the coding target picture is not the beginning picture of the clip, that is, when the coding target picture is at some midpoint in the clip, the switchable unit determination unit 5101 determines that the variable length coding method is not switchable in the coding of the clip (Step S5201f).

When the coding target picture is the beginning picture of the clip, the switchable unit determination unit 5101 judges whether or not the clip is seamlessly connected to an immediately preceding clip that has already been coded (Step S5201b). When the clip is seamlessly connected, the switchable unit determination unit 5101 determines that the variable length coding method is not switchable in the coding of the clip (Step S5201f).

When the coding target picture is the beginning picture of the clip, the switchable unit determination unit 5101 judges whether or not the clip is seamlessly connected to an immediately preceding clip that has already been coded (Step S5201b). When the clip is seamlessly connected, the switchable unit determination unit 5101 determines that the variable length coding method is not switchable in the coding of the clip (Step S5201f).

When the clip is not seamlessly connected, the switchable unit determination unit 5101 judges whether or not the clip corresponds to an angle that belongs to a multi-angle (Step S5201c). When the clip corresponds to an angle that belongs to a multi-angle, the switchable unit determination unit 5101 determines that the variable length coding method is not switchable between angles of the multi-angle, in the coding of the clip (Step S5201f). Here, for a seamless multi-angle in which each angle can be connected seamlessly, the variable length coding method of each angle is determined to be the same as that of a clip immediately preceding the multi-angle section. For a non-seamless multi-angle in which each angle is not necessarily connected seamlessly, on the other hand, if the variable length coding method of each angle is the same, this variable length coding method may be different from that of the clip immediately preceding the multi-angle section.

When the coding target picture is the beginning picture of the clip and the judgments in Steps S5201b and S5201c are both negative (Steps S5201b and S5201c: no), the switchable unit determination unit 5101 determines that the variable length coding method of the clip is switchable from the immediately preceding clip that has already been coded (Step S5201e).

Thus, in the flowchart of FIG. 14, clips that are determined as not switchable by the switchable unit determination unit 5101 are: (a) clips specified by a packet identifier of a transport stream; (b) clips that are subject to seamless connection; and (c) clips corresponding to angles that constitute a multi-angle. Note here that Steps S5201a to S5201c may be performed in any order. Also, in the case of a multi-angle, the switchable unit determination unit 5101 may determine that the variable length coding method is not switchable only when the multi-angle is a seamless multi-angle. Furthermore, a clip may be identified by information other than a packet identifier, such as a file name. Though FIG. 14 uses the example where the minimum unit per which the variable length coding method is switchable is a clip as shown in FIGS. 9(c) and 9(d), a RAU may instead be used as the minimum unit as shown in FIG. 9(e). In such a case, the operation of the flowchart shown in FIG. 14 can be realized with the term "clip" in FIG. 14 being replaced with the term "RAU".

Figure 15:
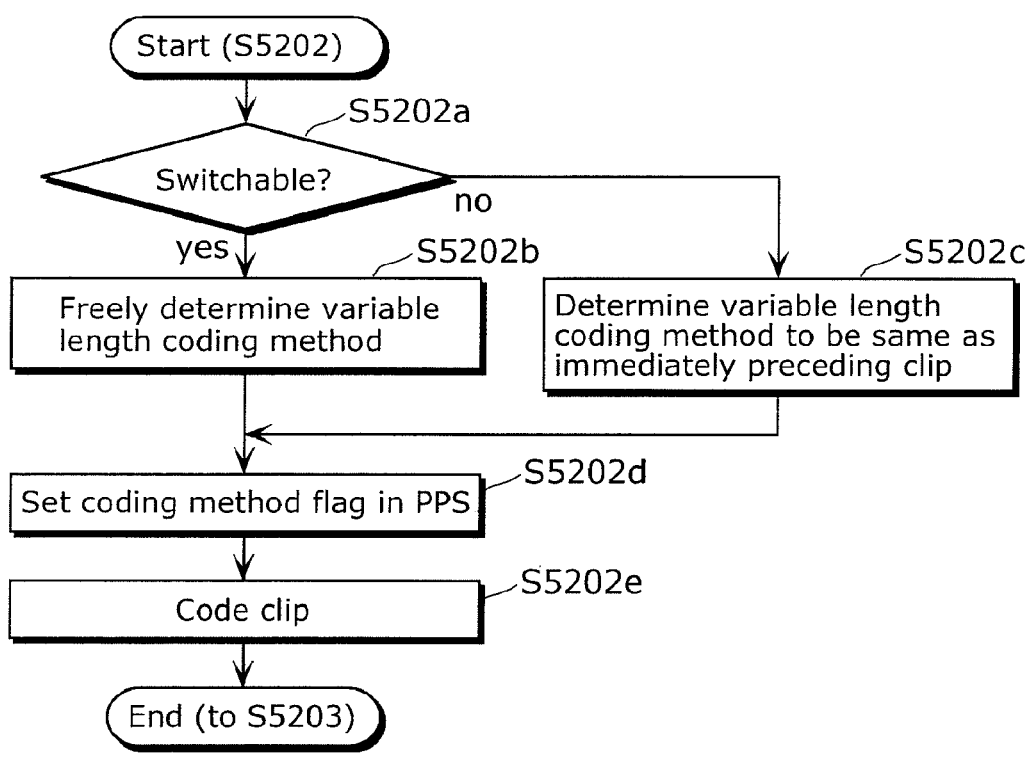
FIG. 15 is a flowchart showing a specific example of Step S5202 shown in FIG. 13.

FIG. 15 is a flowchart showing a specific example of the clip coding step (Step S5202) in FIG. 13. An example of coding an MPEG-4 AVC clip is shown in FIG. 15. In FIG. 15, the coding unit S103 judges, before starting coding of a clip, whether or not the variable length coding method of the clip is switchable (Step S5202a). This judgment is performed in accordance with the determination in FIG. 14. When the variable length coding method of the clip is judged as switchable, the coding unit 5103 freely determines the variable length coding method of the clip (Step S5202b). When the variable length coding method of the clip is judged as not switchable, the coding unit 5103 determines the variable length coding method of the clip to be the same as that of an immediately preceding clip to which the clip is seamlessly connected or another clip which constitutes a same multi-angle as the clip (Step S5202c). The coding unit 5103 then sets a flag showing the determined variable length coding method, in a picture parameter set PPS (Step S5202d), and codes the clip in accordance with the determined variable length coding method (Step S5202e). This flag is called an entropy_coding_mode_flag in MPEG-4 AVC.

Thus, the coding unit 5103 generates coded data Cdata1 by coding a moving image, without switching a variable length coding method of a clip which is a continuous playback section judged as not switchable.

Figure 16:
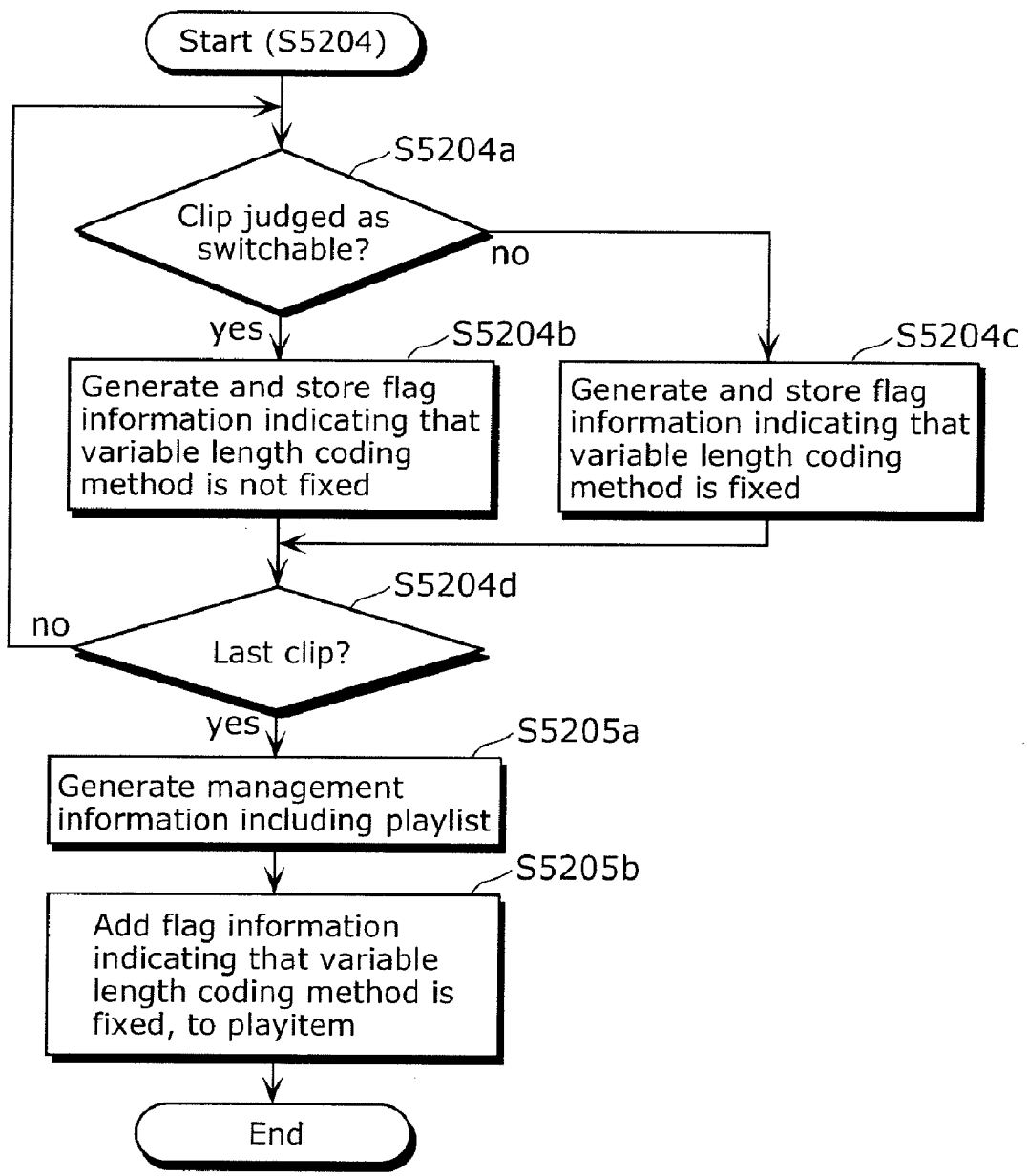
FIG. 16 is a flowchart showing a specific example of Steps S5204 and S5205 shown in FIG. 13.

FIG. 16 is a flowchart showing a specific example of the flag information generation step (Step S5204) and the management information generation step (Step S5205) in FIG. 13.

In FIG. 16, the switching information generation unit 5102 judges whether or not a clip coded by the coding unit 5103 is a clip whose variable length coding method is judged as switchable (Step S5204a). When the clip is a switchable clip, the switching information generation unit 5102 generates flag information indicating that the variable length coding method is not fixed, and stores the flag information in a work area of a memory in correspondence with the clip (Step S5204b). When the clip is not a switchable clip, the switching information generation unit 5102 generates flag information indicating that the variable length coding method is fixed, and stores the flag information in the work area of the memory in correspondence with the clip (Step S5204c). The switching information generation unit 5102 further judges whether or not the clip is a last clip coded by the coding unit 5103 (Step S5204d). When the clip is not the last clip, Steps S5204a to S5204c are repeated. When the clip is the last clip, the switching information generation unit 5102 outputs all flag information stored in the work area of the memory to the management information generation unit 5105 as switching information SwInf.

The management information generation unit 5105 generates management information including a playlist (Step S5205a). The management information generation unit 5105 references switching information SwInf, and adds the flag information indicating that the variable length coding method is fixed, to a playitem included in the playlist (Step S5205b). Note here that the flag information may indicate whether or not the variable length coding method is the same as that of a playback section referenced by an immediately preceding playitem. A playlist defines a playback order of one or more playitems. A playitem is information showing a clip to be played, and designates all or part of one clip as a playback section. Here, another parameter added to the playitem may be used as the flag information. For example, a parameter indicating that a clip is seamlessly connected (e.g. "connection_condition=5") may be used as the flag information. This is because the continuous playback section determined as not switchable (i.e. the section in which the variable length coding method is fixed) in FIG. 14 is: (a) clips specified by a packet identifier of a transport stream; (b) clips that are subject to seamless connection; and (c) clips corresponding to angles that constitute a multi-angle, where the above (b) is predicated on seamless connection. Also, since a flag called "is_multi_angle" can be used to show whether or not a playback section is a multi-angle section, this flag may be used as the flag indicating that the variable length coding method is fixed. In this way, an amount of data of management information can be reduced.

Figure 17:
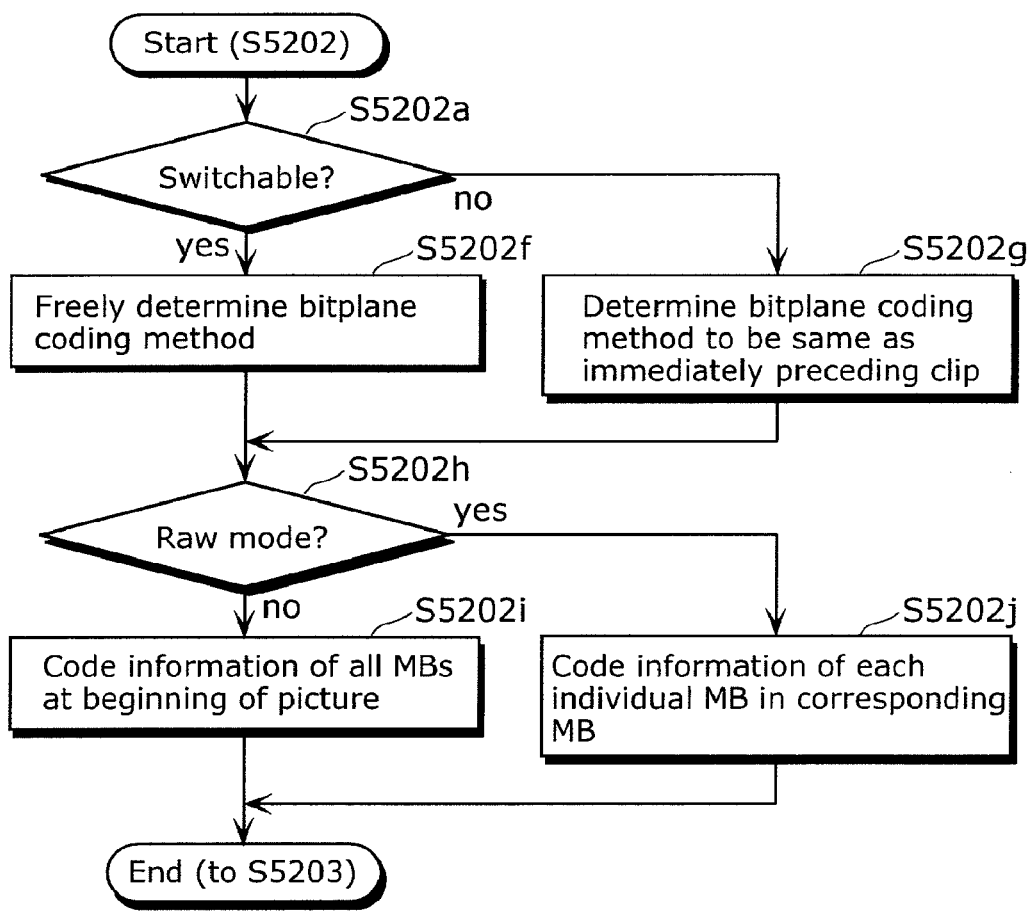
FIG. 17 is a flowchart showing another specific example of Step S5202 shown in FIG. 13.

FIG. 17 is a flowchart showing another specific example of the clip coding step (Step S5202) in FIG. 13. FIG. 17 shows a case of coding a VC-1 clip. In FIG. 17, the coding unit 5103 judges, before starting coding of a clip, whether or not the variable length coding method of the clip is switchable between the raw mode and the other modes (Step S5202a). This judgment is performed in accordance with the determination in FIG. 14. When the variable length coding method of the clip is judged as switchable between the raw mode and the other modes, the coding unit 5103 freely determines the bitplane coding method of the clip (Step S5202f). When the variable length coding method of the clip is judged as not switchable between the raw mode and the other modes, the coding unit 5103 determines the bitplane coding method of the clip to be the same as that of an immediately preceding clip (Step S5202g). The coding unit 5103 then judges whether the determined bitplane coding method is the raw mode or the other modes (Step S5202h). The coding unit 5103 adds information indicating the judged mode in units of pictures. When the bitplane coding method is judged as the raw mode, the coding unit 5103 codes predetermined information of each macroblock MB, in the corresponding macroblock (Step S5202i). When the bitplane coding method is judged as not the raw mode, the coding unit 5103 sets the predetermined information of each macroblock MB collectively at the beginning of a picture, and codes the clip (Step S5202j). Note here that, in VC-1, the above information indicating the mode is shown by a field called IMODE.

Thus, the coding unit 5103 generates coded data Cdata1 by coding a moving image, without switching a bitplane coding method of a clip which is a continuous playback section judged as not switchable.

It should be noted that the aforedescribed playlist is not limited to the use in an optical disc. For example, the playlist can also be used in the following manner. When receiving a stream via a network, firstly a playlist is received and analyzed. Having determined the stream to be received based on the playlist, the actual stream reception is launched. Also, in a case of transmitting a stream via an Internet Protocol (IP) network after packetizing the stream into Real-time Transport Protocol (RTP) packets, TS packets, or the like, playback control information indicating whether or not a variable length coding method is fixed in a playback section may be shown according to, for example, the Session Description Protocol (SDP).

The following describes a data structure of a BD-ROM disc on which data generated according to a moving image coding method of this embodiment is recorded, and a structure of a player for playing the BD-ROM disc.

<Logical Data Structure on the Disc>

Figure 18:
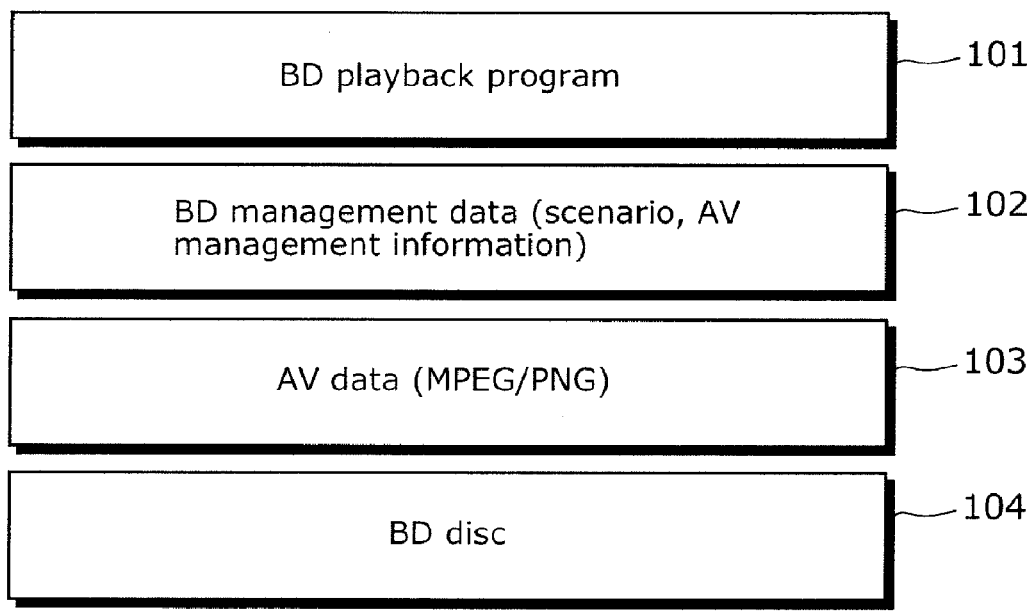
FIG. 18 shows a hierarchical data structure of a BD.

FIG. 18 shows a structure of the BD-ROM. In particular, FIG. 18 shows a structure of a BD disc 104 that is a disc medium and data (101, 102, and 103) recorded on the BD disc 104. The data recorded on the BD disc 104 includes AV data 103, BD management information 102 including an AV playback sequence, management information relating to AV data, and the like, and a BD playback program 101 for realizing interactivity. Though this embodiment describes the BD disc with a focus on its AV application of playing AV content of a movie for the ease of explanation, the BD disc can be equally used for other purposes.

Figure 19:
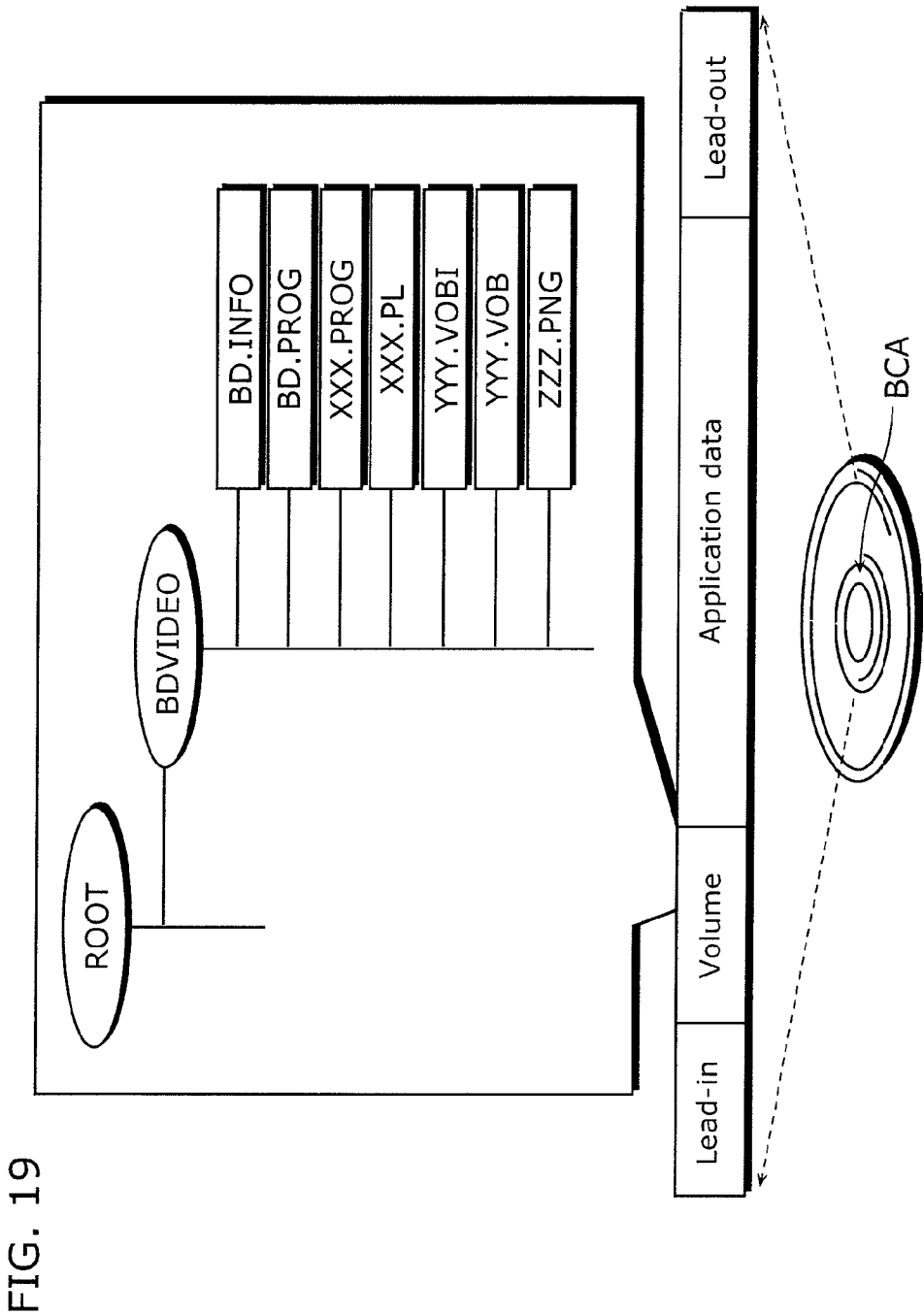
FIG. 19 shows a structure of a logical space on the BD.

FIG. 19 shows a directory file structure of logical data recorded on the above BD disc. As with other optical discs such as a DVD and a CD, the BD disc has a recording area that is spirally formed in a direction from its inner radius to outer radius, where a logical address space for storing logical data is formed between a lead-in area at the inner radius and a lead-out area at the outer radius. Also, a special area called a burst cutting area (BCA) that can only be read by a drive is located at an innermost part of the lead-in area. Since the BCA cannot be read by an application, the BCA often aids in techniques such as copyright protection.

In the logical address space, file system information (volume) is stored at the beginning, which is followed by application data such as video data. A file system is UDF, ISO 9660, and the like as explained in the Description of the Related Art, and enables stored logical data to be read using a directory file structure in the same way as typical PCs.

In this embodiment, the BD disc has the following directory file structure. A BDVIDEO directory is placed immediately below a root directory (ROOT). The BDVIDEO directory stores data (101, 102, and 103 in FIG. 18) such as AV content and management information that are handled in the BD.

The following seven types of files are provided under the BDVIDEO directory.

BD.INFO (The File Name is Fixed)

This file belongs to the "BD management information", and stores information relating to the entire BD disc. A BD player reads this file first.

BD.PROG (The File Name is Fixed)

This file belongs to the "BD playback program", and stores playback control information relating to the entire BD disc.

XXX.PL ("XXX" is Variable and the Extension "PL" is Fixed)

This file belongs to the "BD management information", and stores playlist information that is a scenario (playback sequence). This file is provided for each playlist.

XXX.PROG ("XXX" is Variable and the Extension "PROG" is Fixed)

This file belongs to the "BD playback program", and stores playback control information for an individual playlist mentioned above. The corresponding playlist is identified by the body ("XXX") of the file name.

YYY.VOB ("YYY" is Variable and the Extension "VOB" is Fixed)

This file belongs to the "AV data", and stores a VOB (as explained in the Description of the Related Art). This file is provided for each VOB.

YYY.VOBI ("YYY" is Variable and the Extension "VOBI" is Fixed)

This file belongs to the "BD management information", and stores stream management information relating to a VOB that is AV data. The corresponding VOB is identified by the body ("YYY") of the file name.

ZZZ.PNG ("ZZZ" is Variable and the Extension "PNG" is Fixed)

This file belongs to the "AV data", and stores image data PNG (an image format standardized by W3C, pronounced "ping") for forming a subtitle or a menu. This file is provided for each PNG image.

<Player Structure>

The structure of the player for playing the aforedescribed BD disc is described below, with reference to FIGS. 20 and 21.

Figure 20:
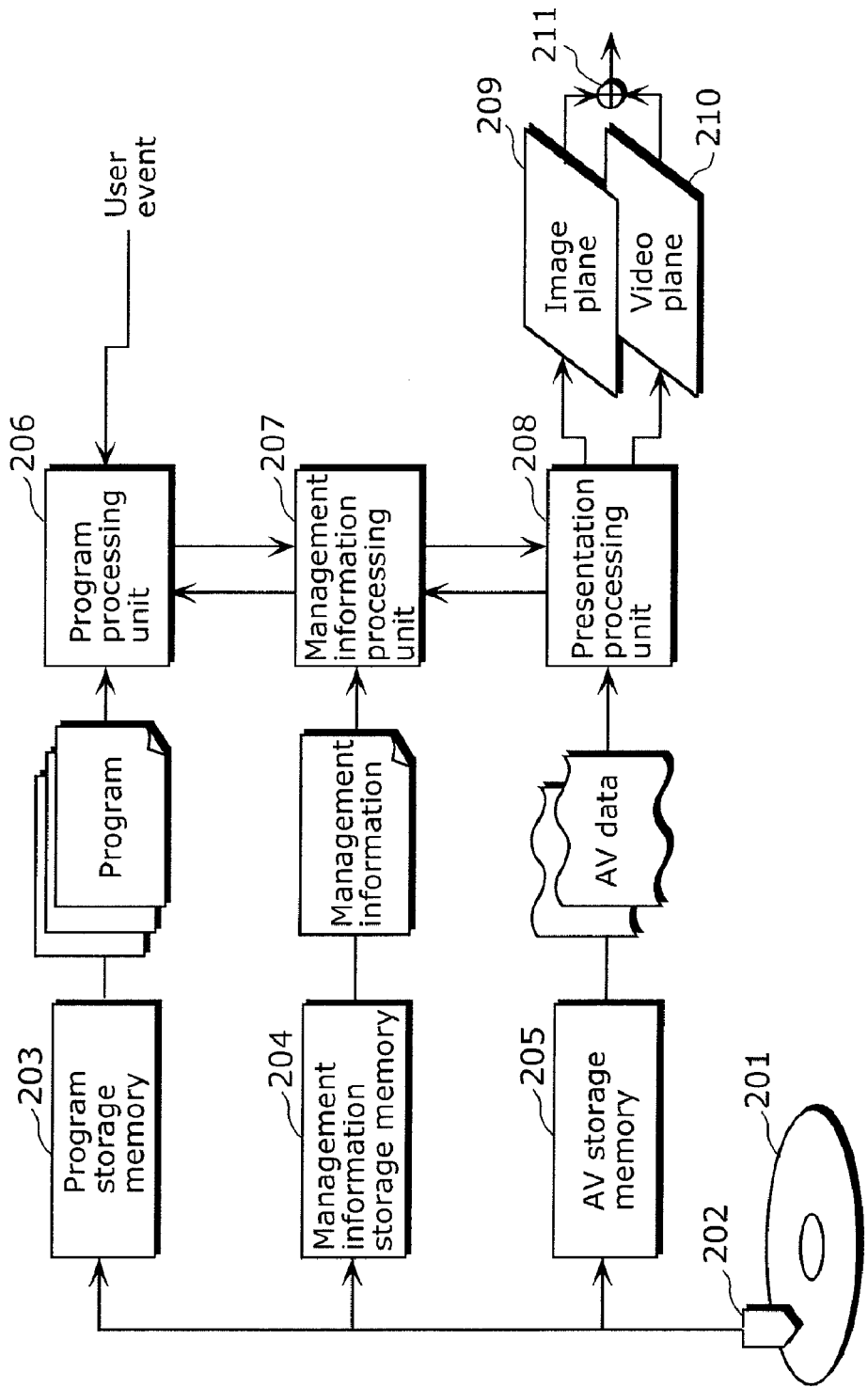
FIG. 20 is a block diagram roughly showing a BD player.

FIG. 20 is a block diagram showing a rough functional structure of the player.

Data on a BD disc 201 is read through an optical pickup 202. The read data is transferred to a dedicated memory depending on a type of the data. In detail, a BD playback program (the contents of the "BD.PROG" or "XXX.PROG" file) is transferred to a program storage memory 203, BD management information (the contents of the "BD.INFO", "XXX.PL", or "YYY.VOBI" file) is transferred to a management information storage memory 204, and AV data (the contents of the "YYY.VOB" or "ZZZ.PNG" file) is transferred to an AV storage memory 205.

The BD playback program stored in the program storage memory 203 is processed by a program processing unit 206. The BD management information stored in the management information storage memory 204 is processed by a management information processing unit 207. The AV data stored in the AV storage memory 205 is processed by a presentation processing unit 208.

The program processing unit 206 receives, from the management information processing unit 207, information about a playlist to be played and event information about a program execution timing and the like, and performs program execution. Here, a program can dynamically change playback from one playlist to another. This is achieved by the program processing unit 206 sending an instruction to play a playlist to the management information processing unit 207. The program processing unit 206 also receives an event from a user, i.e., a request made via a remote control key, and, if a program corresponding to the user event exists, executes the program.

The management information processing unit 207 receives an instruction from the program processing unit 206, analyzes a playlist corresponding to the instruction and management information of a VOB corresponding to the playlist, and instructs the presentation processing unit 208 to play target AV data. The management information processing unit 207 also receives reference time information from the presentation processing unit 208, and instructs the presentation processing unit 208 to stop the playback of the AV data based on the reference time information. Further, the management information processing unit 207 generates an event indicating a program execution timing, for the program processing unit 206.

The presentation processing unit 208 has decoders corresponding to video, audio, and subtitles/images (still images). The presentation processing unit 208 decodes and outputs AV data in accordance with an instruction from the management information processing unit 207. Here, video data and subtitles/images are, having been decoded, drawn onto corresponding dedicated planes, namely, a video plane 210 and an image plane 209, and undergo an image composition process by a composition processing unit 211, before being outputted to a display device such as a television.

Thus, the structure of the BD player is based on the data structure on the BD disc shown in FIG. 18, as can be seen from FIG. 20.

Figure 21:
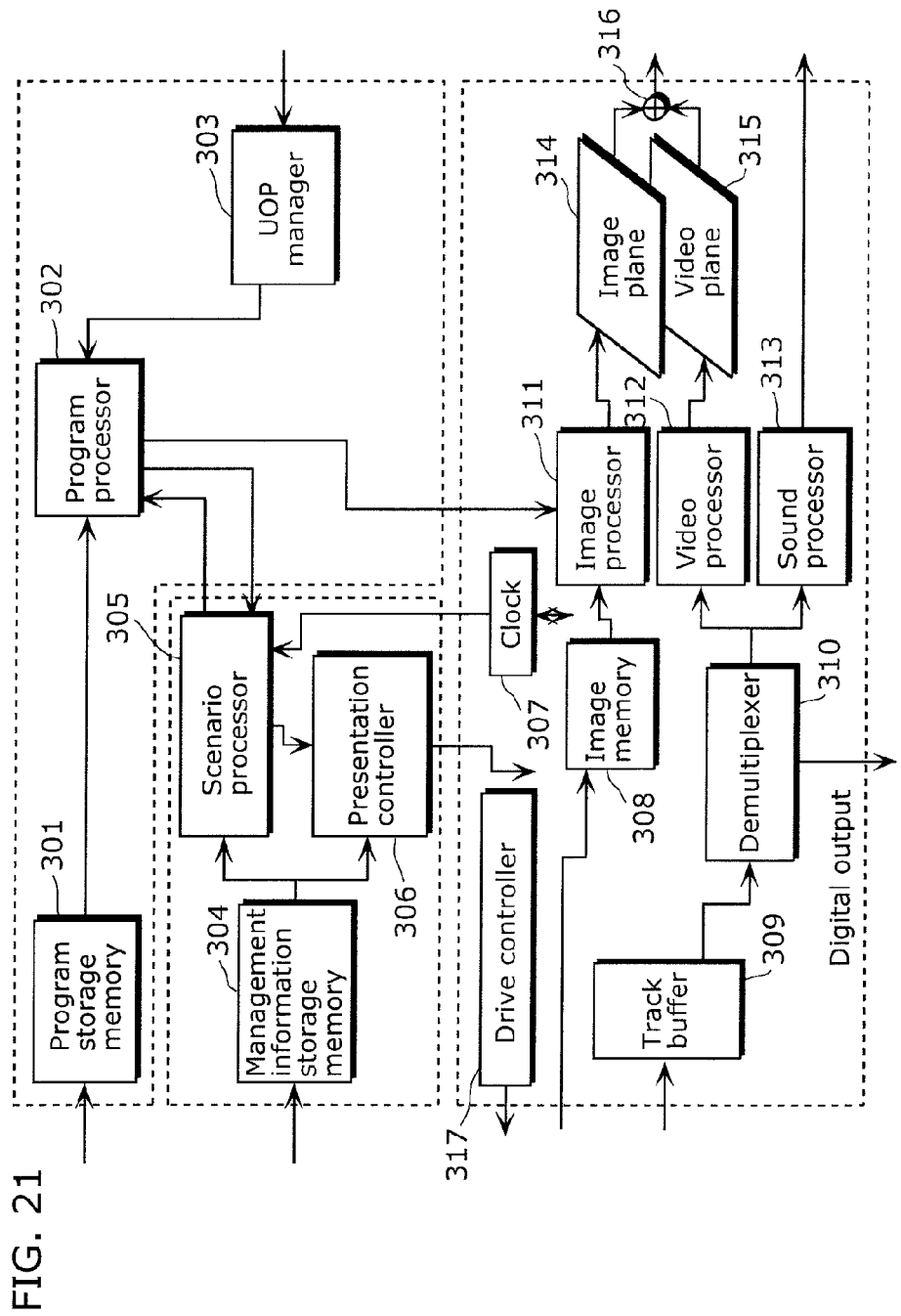
FIG. 21 is a block diagram showing a structure of the BD player.

FIG. 21 is a block diagram showing the above player structure in greater detail. In FIG. 21, the AV storage memory 205 corresponds to an image memory 308 and a track buffer 309, the program processing unit 206 corresponds to a program processor 302 and a UOP manager 303, the management information processing unit 207 corresponds to a scenario processor 305 and a presentation controller 306, and the presentation processing unit 208 corresponds to a clock 307, a demultiplexer 310, an image processor 311, a video processor 312, and a sound processor 313.

VOB data (MPEG stream) and image data (PNG) read from the BD disc 201 are stored in the track buffer 309 and the image memory 308, respectively. The demultiplexer 310 extracts the VOB data stored in the track buffer 309 based on a time indicated by the clock 307, and outputs video data and audio data to the video processor 312 and the sound processor 313, respectively. The video processor 312 and the sound processor 313 are each made up of a decoder buffer and a decoder as defined by the MPEG system standard. The video data and audio data outputted from the demultiplexer 310 are temporarily stored in the corresponding decoder buffers, and decoded by the corresponding decoders in accordance with the clock 307.

Meanwhile, the PNG stored in the image memory 308 is processed in the following two manners.

When the image data is for a subtitle, its decoding timing is indicated by the presentation controller 306. Firstly, the scenario processor 305 receives time information from the clock 307. When the current time is a subtitle display time (start or end time), the scenario processor 305 instructs the presentation controller 306 to start or stop the display of the subtitle so that the subtitle can be displayed appropriately. Upon receiving a decoding/display instruction from the presentation controller 306, the image processor 311 extracts the corresponding PNG data from the image memory 308, decodes the extracted PNG data, and draws the decoded PNG data on an image plane 314.

When the image data is for a menu, on the other hand, its decoding timing is indicated by the program processor 302. The timing at which the program processor 302 instructs to decode the image data is not fixed but depends on a BD program executed by the program processor 302.

The image data and the video data are, having been decoded, outputted to the image plane 314 and the video plane 315 respectively, composited by a composition processing unit 316, and then outputted to the display device, as described earlier with reference to FIG. 20.

Meanwhile, management information (scenario and AV management information) read from the BD disc 201 is stored in a management information storage memory 304. Of these information, the scenario information ("BD.INFO" or "XXX.PL") is read and processed by the scenario processor 305, whereas the AV management information ("YYY.VOBI") is read and processed by the presentation controller 306.

The scenario processor 305 analyzes information of a playlist, and notifies the presentation controller 306 of a VOB referenced by the playlist and a playback position of the VOB. The presentation controller 306 analyzes management information ("YYY.VOBI") of this target VOB, and instructs a drive controller 317 to read the target VOB.

The drive controller 317 moves the optical pickup and reads the target AV data, according to the instruction from the presentation controller 306. The read AV data is transferred to the image memory 308 or the track buffer 309, as mentioned earlier.

Also, the scenario processor 305 monitors the time indicated by the clock 307, and outputs an event to the program processor 302 at a timing specified in management information.

A BD program ("BD.PROG" or "XXX.PROG") stored in a program storage memory 301 is executed/processed by the program processor 302. The program processor 302 processes the BD program in a case where an event is sent from the scenario processor 305 or an event is sent from the UOP manager 303. The UOP manager 303 generates an event for the program processor 302, upon receiving a request from the user via a remote control key.

<Application Space>

Figure 22:
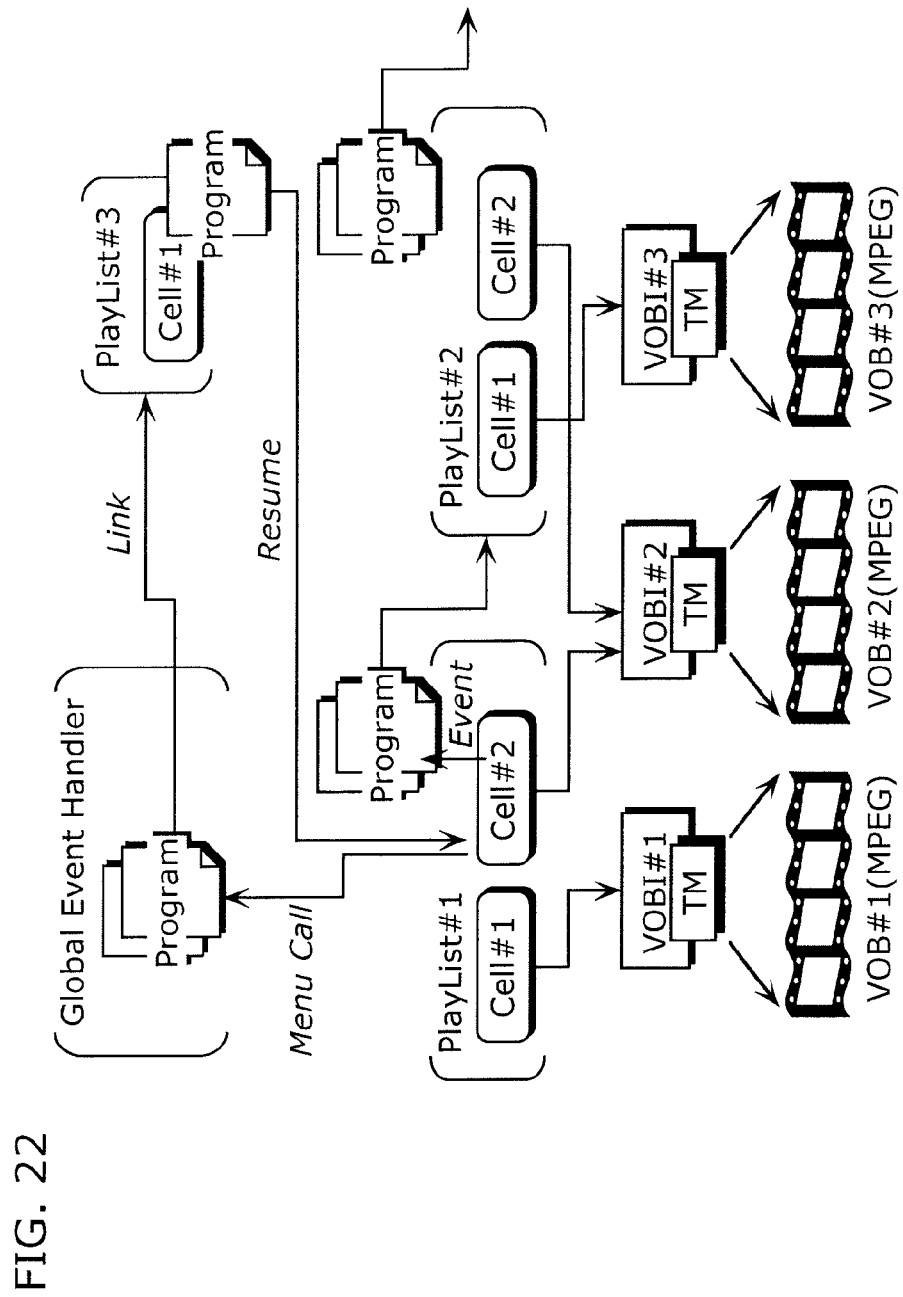
FIG. 22 is a diagram for explaining an application space of the BD.

FIG. 22 shows an application space on the BD.

In the application space on the BD, a playlist (PlayList) serves as one playback unit. The playlist is a connection of cells (Cells), and has a static scenario which is a playback sequence determined by an order of connection, and a dynamic scenario described by a program. Without a dynamic scenario by a program, the playlist merely plays the individual cells in sequence, and ends when the playback of all of the cells ends. On the other hand, a program is capable of describing playback that goes beyond playlists, and dynamically changing the playback target in accordance with a user selection or a player status. A typical example of this is a menu. In BDs, a menu can be defined as a scenario that is played in accordance with a user selection, enabling a playlist to be dynamically selected by a program.

The program referred to here is an event handler that is executed according to a time event or a user event.

A time event is an event that is generated based on time information embedded in a playlist. The event sent from the scenario processor 305 to the program processor 302, which has been described earlier with reference to FIG. 21, is a time event. When a time event is issued, the program processor 302 executes an event handler that is associated with the time event by an ID. As mentioned above, a program that is being executed can issue an instruction to play another playlist. In this case, a playlist that is currently being played is stopped and playback of a designated playlist is started.

A user event is an event that is generated by a remote control key operation by the user. The user event can be mainly classified into two types. A first type of user event is a menu selection event generated by an operation of the cursor keys (the Up/Down/Right/Left keys) or the Enter key. An event handler corresponding to the menu selection event is valid only during a limited period within a playlist (a valid period of each individual event handler has been set in playlist information). When the user presses any of the Up/Down/Right/Left keys or the Enter key on the remote control, a search is performed for a valid event handler corresponding to the user operation and, in a case where the valid event handler exists, that event handler is executed. In a case where the valid event handler does not exist, the menu selection event is ignored.

A second type of user event is a menu call event that is generated by operating a Menu key. When the menu call event is generated, a global event handler is called. The global event handler does not rely on an individual playlist, and is always valid. The use of this function enables a DVD menu call (e.g. a feature of calling an audio menu, a subtitle menu, and the like during title playback and, after the audio or subtitle is changed, resuming the title playback at a point when the title playback is suspended) to be implemented.

A cell (Cell), which is a constituent unit of a static scenario in a playlist, references all or part of a VOB (MPEG stream) as a playback section. The cell has information about start and end times of the playback section in the VOB. VOB management information (VOBI) corresponding to each individual VOB includes a time map (Time Map or TMAP) which is table information of storage addresses corresponding to playback times of data. With reference to this time map, a read start address and a read end address of data in the VOB (e.g. the target file "YYY.VOB") can be obtained from the above start and end times of the playback section in the VOB. The time map will be described in detail later.

<Details about a VOB>

Figure 23:
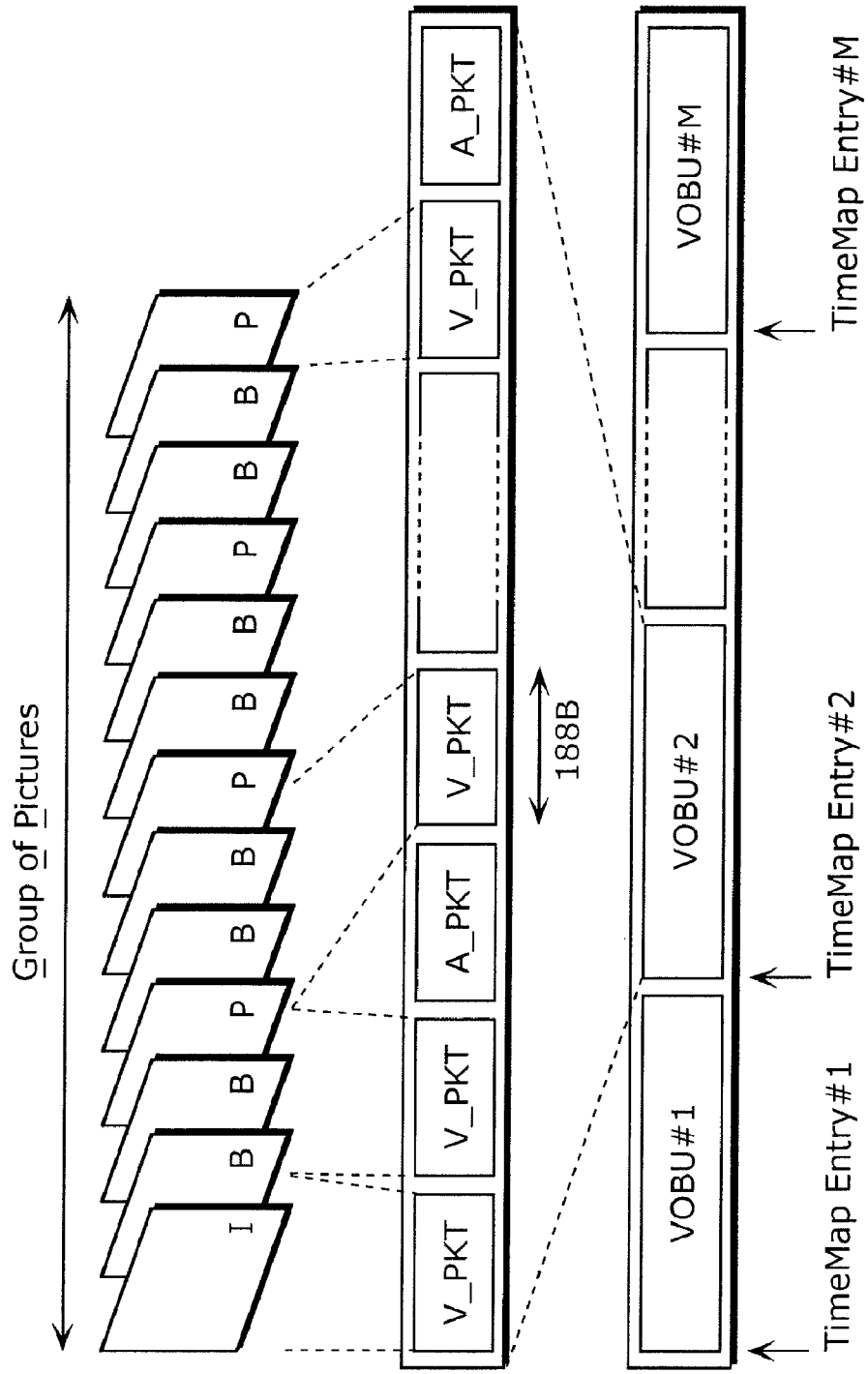
FIG. 23 shows a structure of an MPEG stream (VOB).

FIG. 23 shows a structure of an MPEG stream (VOB) used in this embodiment.

As shown in FIG. 23, the VOB is made up of a plurality of video object units (VOBUs). A VOBU is one playback unit as a multiplexed stream that is based on a group of pictures (GOP) of an MPEG video stream and also includes audio data. A playback period of each VOBU is 1.0 second or less, and usually about 0.5 second.

A TS packet (MPEG-2 Transport Stream Packet) at the beginning of a VOBU stores a sequence header, and a GOP header and an intra-coded (I) picture that follow the sequence header, so that decoding can be started from the I picture. Also, an address (start address) of a TS packet including the start of the I picture at the beginning of the VOBU, an address (end address) of a TS packet including the end of the I picture relative to the start address, and a playback start time (PTS) of the I picture are managed in the time map. Therefore, the time map has an entry corresponding to a TS packet at the beginning of each VOBU.

Each VOBU includes a video packet (V_PKT) and an audio packet (A_PKT). Each packet is 188 bytes. Though not shown in FIG. 23, an arrival time stamp (ATS) is provided immediately before each TS packet. The ATS indicates a relative decoder supply start time of the TS packet.

A reason for providing an ATS for each TS packet is that a system rate of the TS stream is not fixed but variable. In general, when using a fixed system rate, a dummy TS packet called a NULL packet is inserted. However, to achieve high-quality recording within a limited storage capacity, a variable system rate is more suitable. For this reason, a TS stream attached with an ATS is recorded in BDs.

Figure 24:
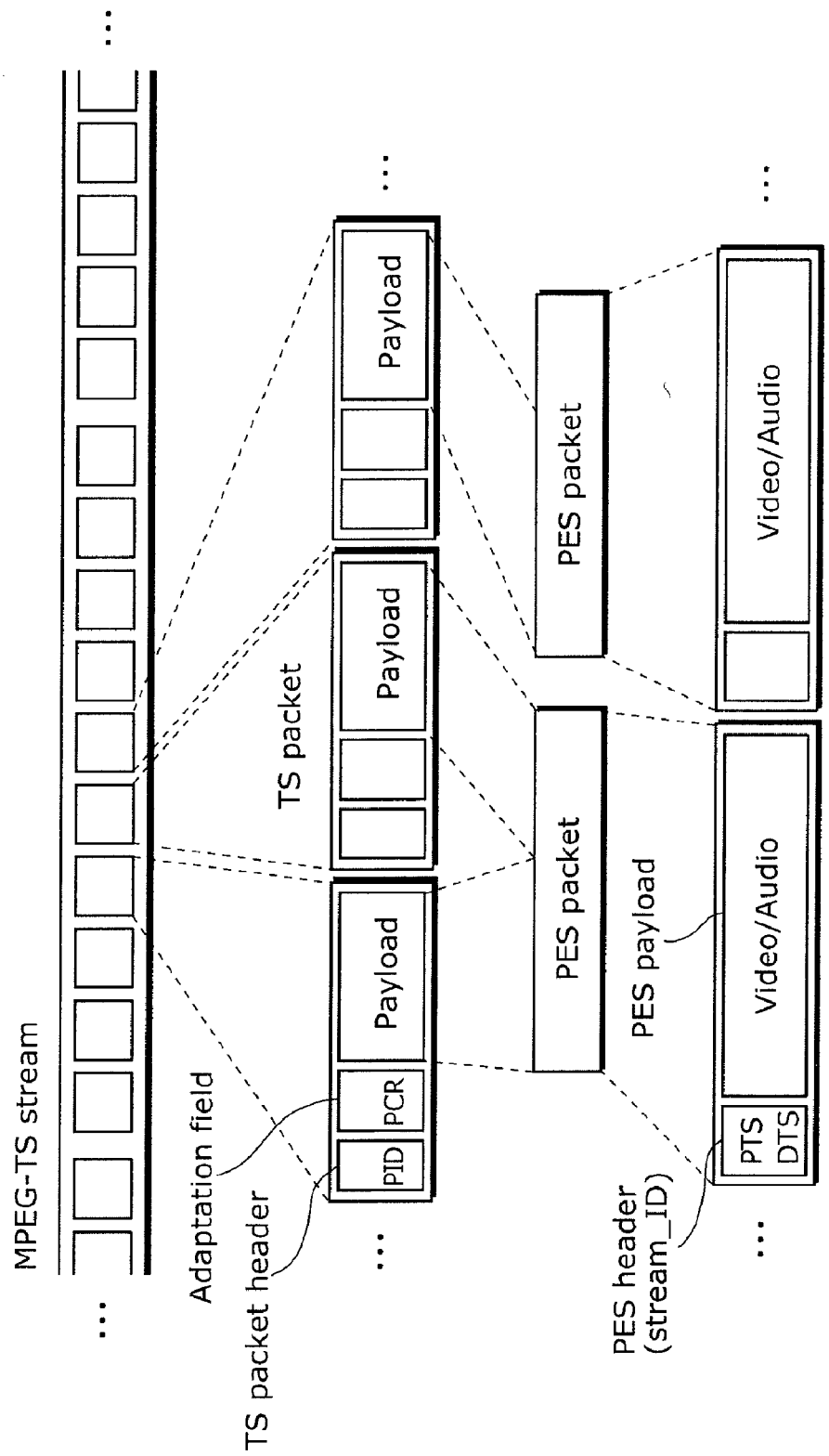
FIG. 24 shows a structure of a pack.

FIG. 24 shows a structure of a TS packet.

As shown in FIG. 24, a TS packet is mainly composed of a TS packet header, an adaptation field, and a payload. A packet identifier (PID) is stored in the TS packet header. This PID is used to identify what kind of information is stored in the TS packet. A program clock reference (PCR) is stored in the adaptation field. The PCR is a reference value for a reference clock (system time clock (STC)) of a device that decodes a stream. Typically, with a timing of the PCR, the device demultiplexes a system stream and reconstructs individual streams such as a video stream. A PES packet is stored in the payload.

A PES packet header stores a decoding time stamp (DTS) and a presentation time stamp (PTS). The DTS indicates a decoding timing of a picture/audio frame stored in the PES packet, and the PTS indicates a presentation timing of video/audio output or the like. Elementary data such as video data and audio data is sequentially stored in a data storage area of the PES packet called a PES packet payload from the beginning. The PES packet header also stores an ID (stream_id) for identifying which stream the data stored in the PES packet payload belongs to.

TS streams are defined in detail in ISO/IEC 13818-1. A characteristic feature of BDs is that an ATS is attached to each TS packet.

<Interleaved Recording of a VOB>

Figure 25:
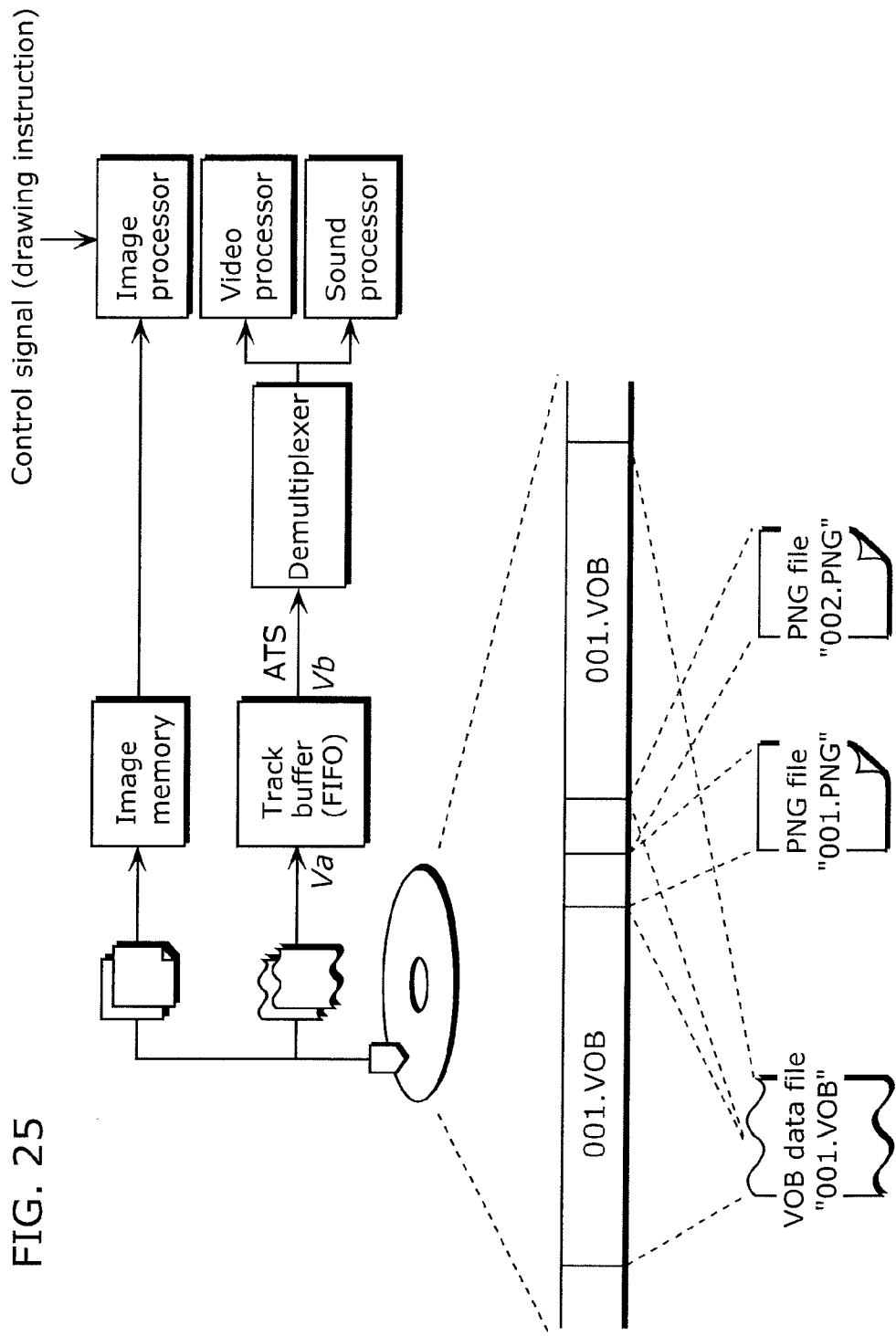
FIG. 25 is a diagram for explaining a relation between an AV stream and a player structure.
Figure 26:
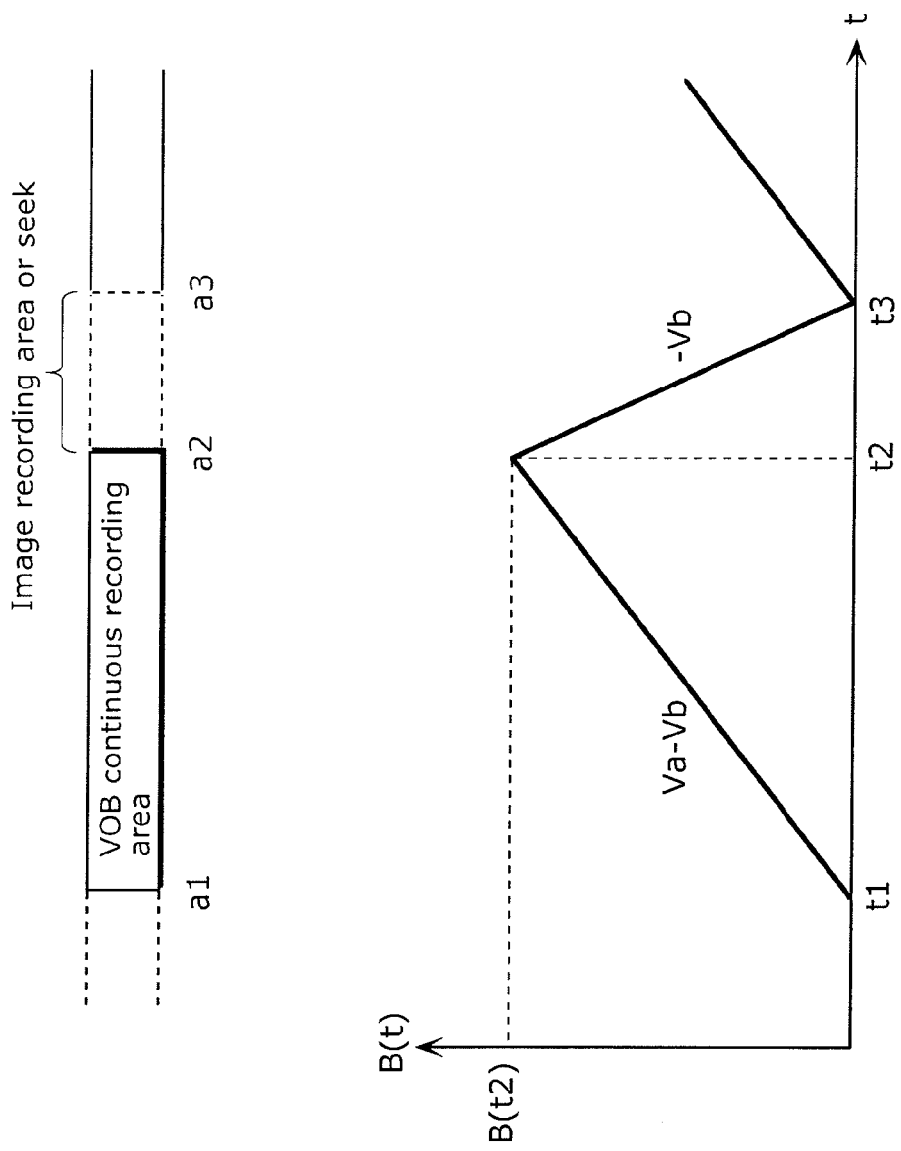
FIG. 26 is a model diagram of a continuous supply of AV data to a track buffer.

The following describes interleaved recording of a VOB file, with reference to FIGS. 25 and 26.

The upper part of FIG. 25 shows part of the player structure described above. As shown in the upper part of FIG. 25, data on the BD disc is inputted, via the optical pickup, to the track buffer in the case of a VOB, i.e., an MPEG stream, and to the image memory in the case of PNG, i.e., image data.

The track buffer is a FIFO buffer. Accordingly, the VOB data inputted in the track buffer is sent to the demultiplexer in the input order. Here, each individual TS packet is extracted from the track buffer in accordance with the aforementioned ATS, and data in the extracted TS packet is sent to the video processor or the sound processor via the demultiplexer. In the case of image data, on the other hand, the presentation controller designates which image is to be drawn. Also, when the image data used for drawing is subtitle image data, the image data is deleted from the image memory at the time of drawing. However, when the image data used for drawing is menu image data, the image data is retained in the image memory while menu drawing is taking place, for the following reason. Drawing of a menu relies on a user operation, and so a part of the menu may be redisplayed or replaced with a different image according to a user operation. In such a case, decoding of image data of the part that is to be redisplayed can be performed easily if the image data is retained in the image memory.

The lower part of FIG. 25 shows interleaved recording of a VOB file and a PNG file on the BD disc. On a ROM such as a CD-ROM or a DVD-ROM, usually AV data that forms one continuous playback unit is recorded continuously. So long as the data is continuously recorded, a drive can simply read the data sequentially and deliver the read data to a decoder. However, if the continuous data is divided and recorded on the disc in a discrete manner, a seek operation needs to be performed between individual continuous playback sections. Data reading is suspended during such a seek operation, which can cause data supply to stop. In the case of BDs too, it is preferable to record a VOB file in one continuous area. However, since there is also data, such as subtitle data, that is to be played synchronously with video data stored in a VOB file, such data needs to be read from the BD disc by some means as well as the VOB file.

One method of reading subtitle data is to read all image data (PNG file) of subtitles at once before playback of a VOB starts. However, this method is not realistic, as it requires a large memory for storing such image data.

In view of this, a method of dividing a VOB file into several blocks and interleaved-recording the VOB blocks with image data is employed. The lower part of FIG. 25 illustrates such interleaved recording.

By appropriately interleaving the VOB file and the image data, it is possible to store the image data in the image memory when necessary, with there being no need to use a large temporary memory mentioned above. In this case, however, the reading of the VOB data is stopped while the image data is being read.

FIG. 26 is a diagram for explaining a VOB data continuous supply model using a track buffer for solving this problem.

As described earlier, VOB data is temporarily accumulated in the track buffer. When a data input rate (Va) of the track buffer and a data output rate (Vb) of the track buffer has a difference (Va>Vb), the amount of data accumulated in the track buffer increases so long as data is being read from the BD disc.

As shown in the upper part of FIG. 26, suppose one VOB continuous recording area starts with logical address a1 and ends with logical address a2, whereas image data is recorded from logical address a2 to logical address a3, during which VOB data cannot be read.

The lower part of FIG. 26 shows an internal state of the track buffer. In FIG. 26, the horizontal axis represents time, and the vertical axis represents the amount of data accumulated in the track buffer. Time t1 is a time at which reading of data at a1, that is the start point of the VOB continuous recording area, begins. From t1 onward, data is accumulated in the track buffer at a rate of (Va−Vb). This rate is the difference between the data input and output rates of the track buffer. Time t2 is a time at which data at a2, that is the end point of the VOB continuous recording area, is read. Which is to say, the amount of data in the track buffer increases at the rate of (Va−Vb) from t1 to t2. When B(t2) denotes the amount of data in the track buffer at t2, B(t2) can be obtained from the following expression:

$$B(t2)=(Va-Vb)\times(t2-t1) \quad \text{(Expression 1)}.$$

After this, the image data continues until address a3 on the BD disc. Therefore, the input to the track buffer is 0 during this time. Hence the amount of data in the track buffer decreases at a rate of −Vb. This lasts until address a3, that is, time t3.

The significant point here is that, if the amount of data in the track buffer becomes 0 before t3, there is no VOB data to be supplied to the decoder, which causes the playback of the VOB to stop. However, when data remains in the track buffer at t3, the playback of the VOB can be continued without interruption.

This condition can be expressed by the following expression:

$$B(t2) \geq Vb \times (t3-t2) \quad \text{(Expression 2)}.$$

Therefore, it is necessary to position the image data (non-VOB data) on the BD disc so as to satisfy Expression 2.

<Structure of Navigation Data>

The following describes a structure of navigation data of the BD (BD management information), by referring to FIGS. 27 to 33.

Figure 27:
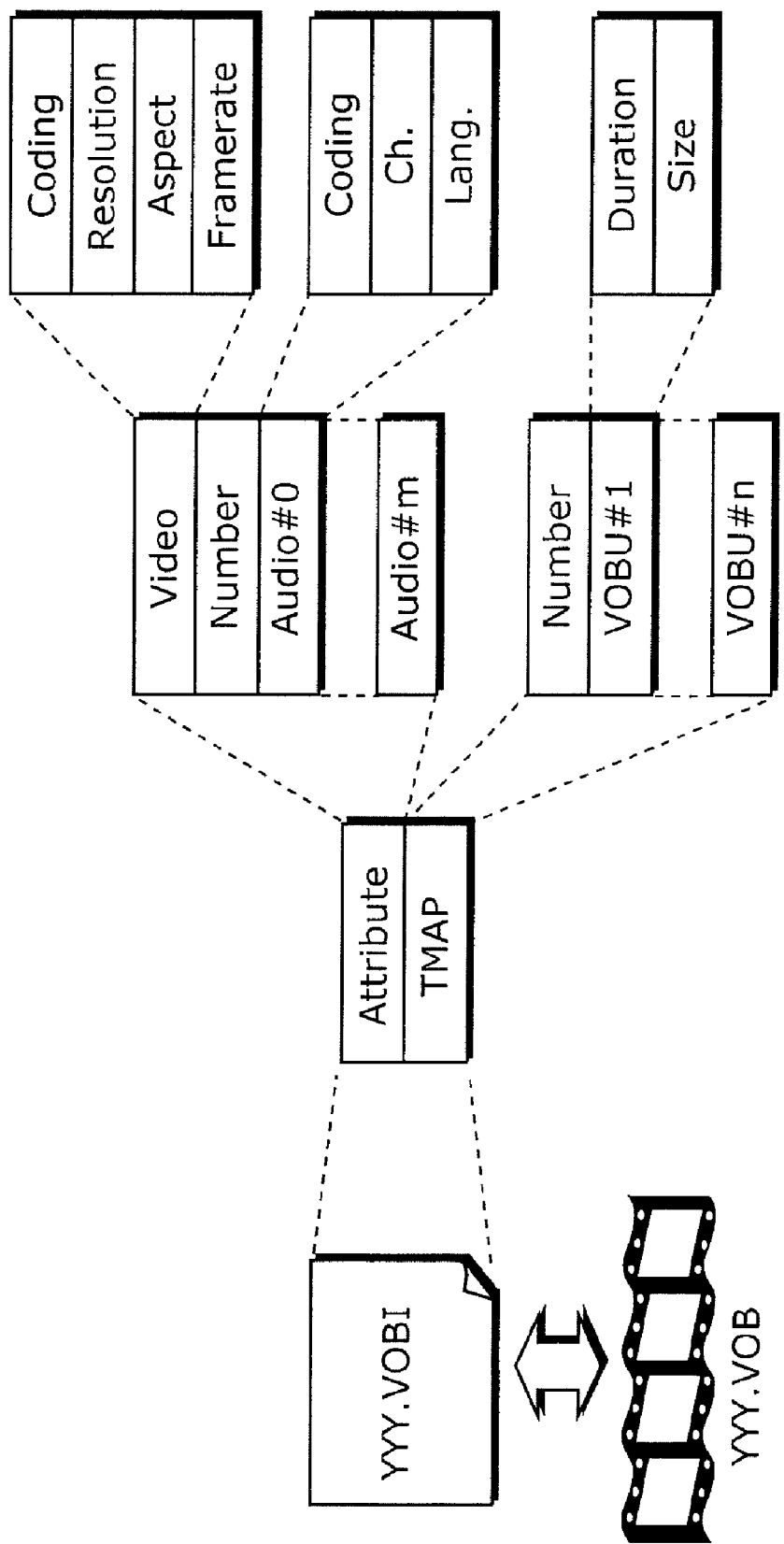
FIG. 27 shows a structure of a VOB information file.

FIG. 27 shows an internal structure of a VOB management information file ("YYY.VOBI").

The VOB management information includes stream attribute information (Attribute) and a time map for a VOB. The stream attribute information includes a video attribute (Video) and audio attributes (Audio#0 to Audio#m). Since one VOB can have a plurality of audio streams, the presence/absence of data fields is shown by a number of audio streams (Number).

The following are fields included in the video attribute (Video), and possible values of these fields.
Compression format (Coding):
MPEG1
MPEG2
MPEG4
MPEG4—Advanced Video Coding (AVC)
Resolution (Resolution):
1920×1080
1440×1080
1280×720
720×480
720×565
Aspect Ratio (Aspect):
4:3
16:9
Frame Rate (Framerate):
60
59.94 (60/1.001)
50
30
29.97 (30/1.001)
24
23.976 (24/1.001)

The following are fields included in each of the audio attributes (Audio), and possible values of these fields.
Compression Format (Coding):
AC3
MPEG1
MPEG2
LPCM
Number of Channels (Ch.):
1 to 8
Language Attribute (Language):

The time map (TMAP) is a table holding information for each VOBU. The time map includes a number of VOBUs (Number) in the VOB, and VOBU information for each VOBU (VOBU#1 to VOBU#n). The VOBU information of each VOBU includes an address (I_start) of a TS packet (the start of an I picture) at the beginning of the VOBU, an offset address (I_end) of the end of the I picture relative to I_start, and a playback start time (PTS) of the I picture.

Note here that the value of I_end is not limited to the offset value, i.e., a size of the I picture, and may instead be an actual end address of the I picture.

Figure 28:
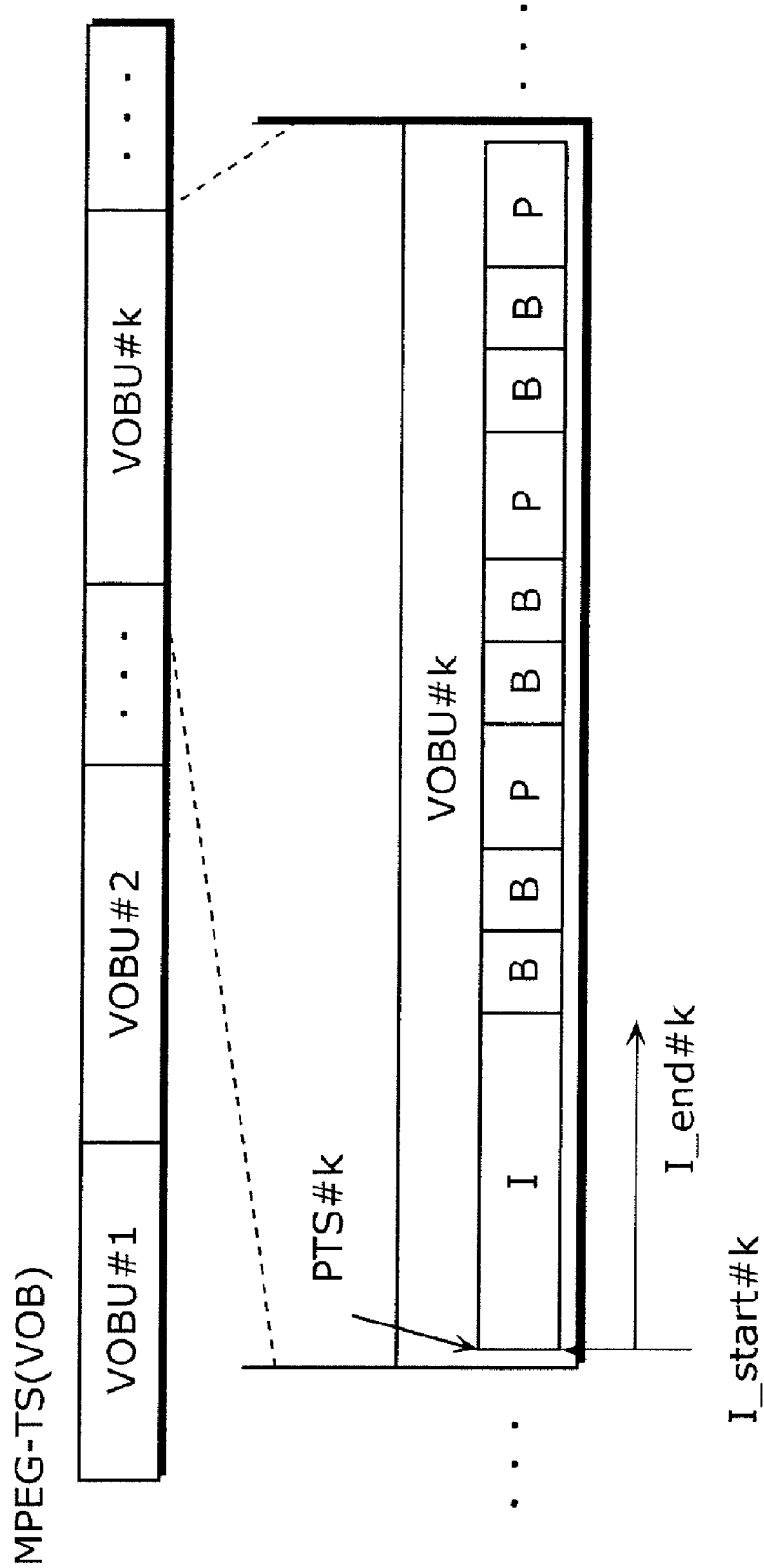
FIG. 28 is a diagram for explaining a time map.

FIG. 28 is a diagram for explaining the VOBU information in detail.

As is widely known, an MPEG video stream can be compressed at a variable bit rate for recording with a high image quality. Accordingly, there is no simple correlation between a playback time period and a data size in the case of an MPEG video stream. AC3, which is an audio compression standard, compresses data at a fixed bit rate, and therefore the time/address relationship can be represented by a linear expression. In the case of MPEG video data, on the other hand, individual frames have a fixed display time period. As one example, each frame has a display time period of 1/29.97 second in NTSC. However, a data size of each frame after compression differs greatly, depending on picture characteristics and a picture type used for compression, namely, I-picture, P-picture, or B-picture. For MPEG video, therefore, the time/address relationship cannot be represented by a linear expression.

Accordingly, for a VOB that is an MPEG system stream in which MPEG video data has been multiplexed, the relationship between time and data size cannot be represented by a linear expression, either. Instead, the time map (TMAP) serves to show the time/address relationship in the VOB.

When time information is given, firstly a search is performed for a VOBU to which a time shown by the time information belongs (by checking a PTS of each VOBU). A jump is made to the VOBU whose PTS immediately precedes the time shown by the time information in the TMAP (an address specified by I_start). Decoding is started from an I picture at the beginning of the VOBU, and display is started from a picture corresponding to the time shown by the time information.

Figure 29:
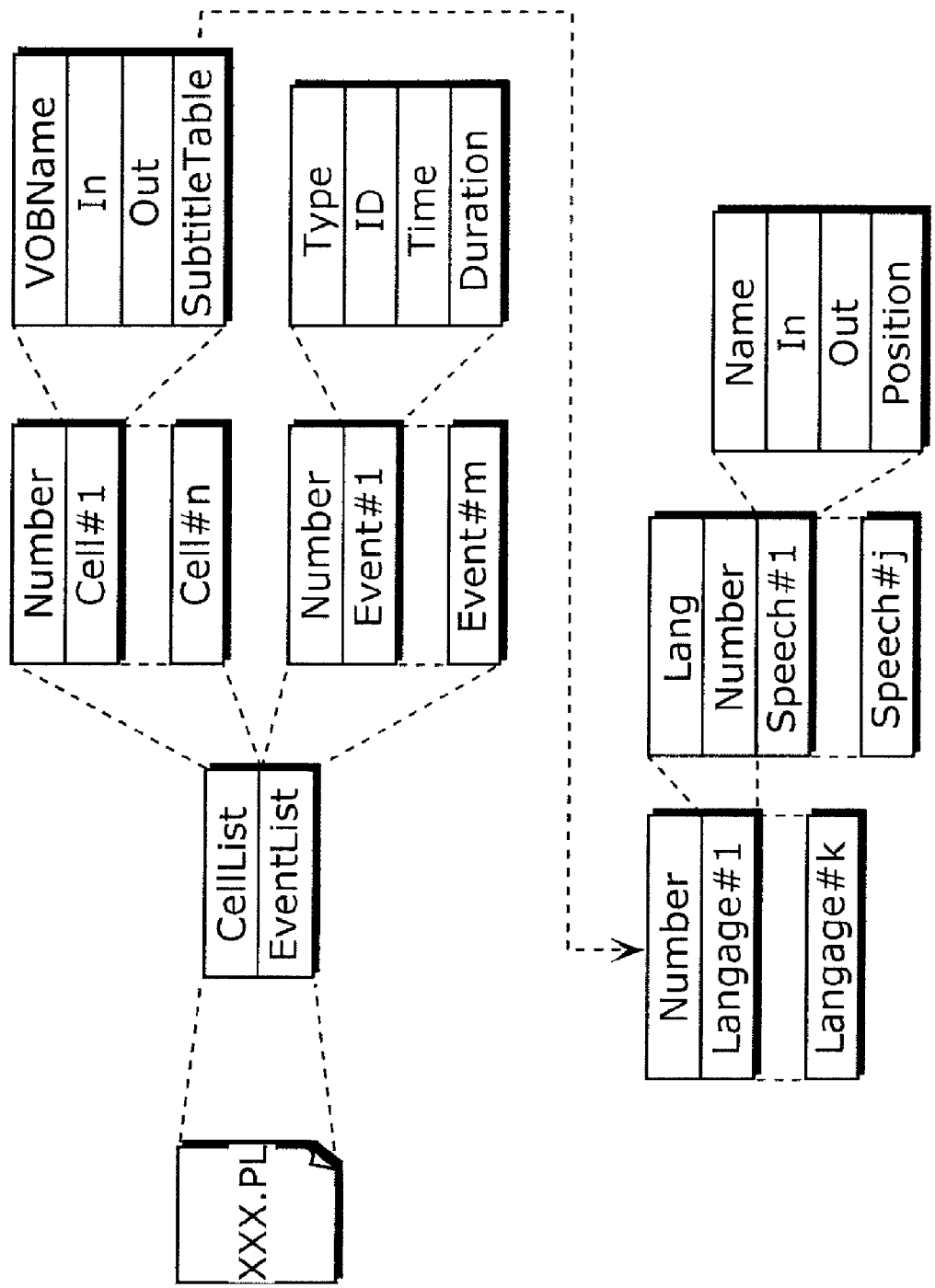
FIG. 29 shows a structure of a playlist file.

The following describes an internal structure of playlist information ("XXX.PL"), with reference to FIG. 29.

The playlist information is roughly made up of a cell list (CellList) and an event list (EventList).

The cell list (CellList) is a playback cell sequence in a playlist. Cells are played in an order shown by this cell list. The cell list (CellList) includes a number of cells (Number) and cell information for each cell (Cell#1 to Cell#n).

The cell information (Cell#) includes a file name of a VOB (VOBName), a start time (In) and an end time (Out) in the VOB, and a subtitle table (SubtitleTable). The start time (In) and the end time (Out) are each expressed by a frame number in the VOB. An address of VOB data necessary for playback can be obtained with reference to the aforementioned time map.

The subtitle table (SubtitleTable) is a table holding information about subtitles that are to be played synchronously with the VOB. As with audio, subtitles can be provided in a plurality of languages. Accordingly, the subtitle table (SubtitleTable) includes a number of languages (Number) and a table for each language (Language#1 to Language#k) that follows.

Each language table (Language#) includes language information (Lang), a number of sets of subtitle information for individually displayed subtitles (Number), and subtitle information for each individually displayed subtitle (Speech#1 to Speech#j). The subtitle information (Speech#) is roughly made up of a corresponding image data file name (Name), a subtitle display start time (In), a subtitle display end time (Out), and a subtitle display position (Position).

The event list (EventList) is a table defining events generated in the playlist. The event list is mainly made up of a number of events (Number) and the individual events (Event#1 to Event#m) that follow. Each event (Event#) includes an event type (Type), an event ID (ID), an event generation time (Time), and a valid period (Duration).

Figure 30:
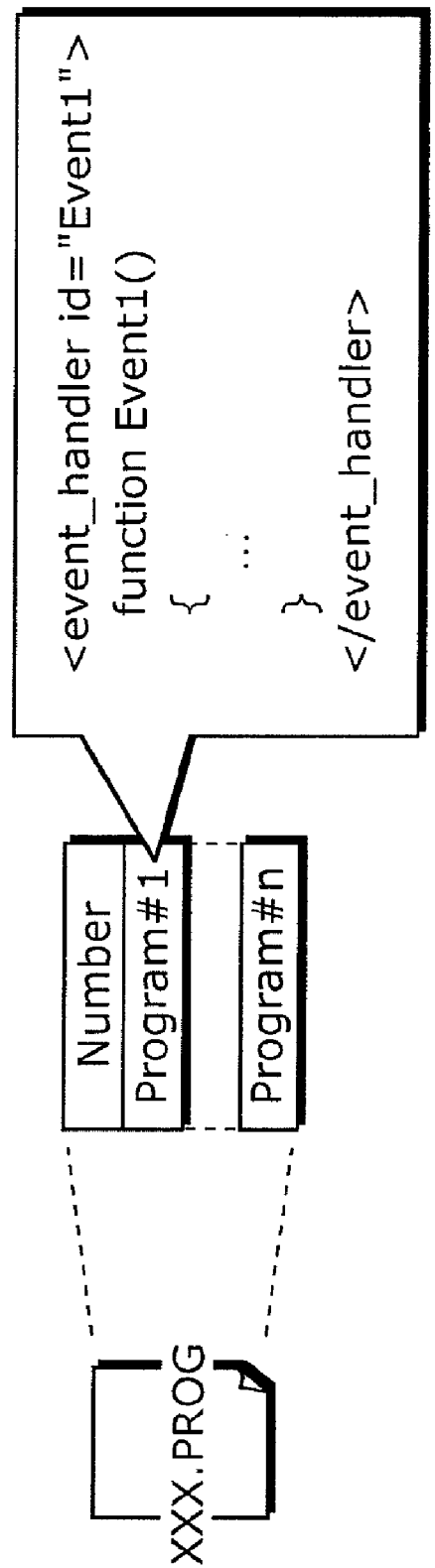
FIG. 30 shows a structure of a program file corresponding to a playlist.

FIG. 30 shows an event handler table ("XXX.PROG") which holds event handlers (for time events and menu selection user events) for an individual playlist.

The event handler table has a number of event handlers/programs defined (Number) and the individual event handlers/programs (Program#1 to Program#n). Each event handler/program (Program#) includes a definition of the start of the event handler (<event_handler> tag) and an event handler ID (ID) corresponding to an event ID mentioned above. Following this, the program is written in parentheses "{" and "}" after "Function". The events (Event#1 to Event#m) stored in the above event list (EventList) in "XXX.PL" are specified using the IDs (ID) of the event handlers in "XXX.PROG".

Figure 31:
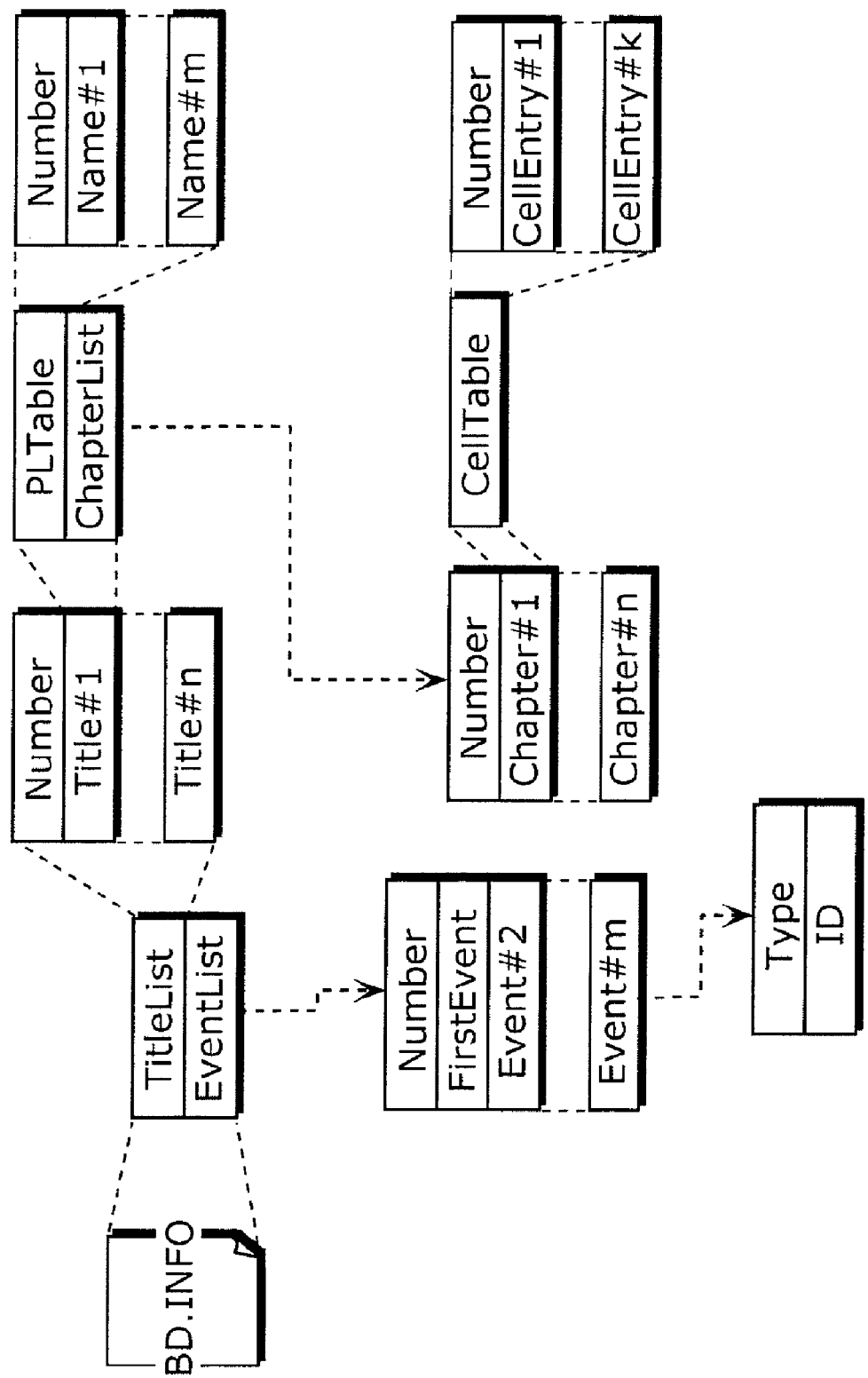
FIG. 31 shows a structure of an entire BD disc management information file.

The following describes an internal structure of information relating to the entire BD disc ("BD.INFO"), with reference to FIG. 31.

The entire BD disc information is mainly made up of a title list (TitleList) and an event table for global events (EventList).

The title list (TitleList) includes a number of titles in the disc (Number) and title information for each title (Title#1 to Title#n) that follows. The title information (Title#) includes a table of playlists included in the title (PLTable) and a list of chapters in the title (ChapterList). The playlist table (PL-Table) includes a number of playlists in the title (Number) and names of the playlists, i.e., file names of the playlists (Name#1 to Name#m).

The chapter list (ChapterList) includes a number of chapters included in the title (Number) and chapter information for each chapter (Chapter#1 to Chapter#n). The chapter information (Chapter#) includes a table of cells included in the chapter (CellTable). The cell table (CellTable) is roughly made up of a number of cells (Number) and entry information for each individual cell (CellEntry#1 to CellEntry#k). The entry information of each cell (CellEntry#) has a name of a playlist that includes the cell, and a cell number of the cell in the playlist.

The event list (EventList) includes a number of global events (Number) and information for each individual global event. It is to be noted here that a global event defined first in the event list (EventList) is called a first event (FirstEvent), which is called first when the BD disc is inserted in the player. The global event information is made up of an event type (Type) and an event ID (ID).

Figure 32:
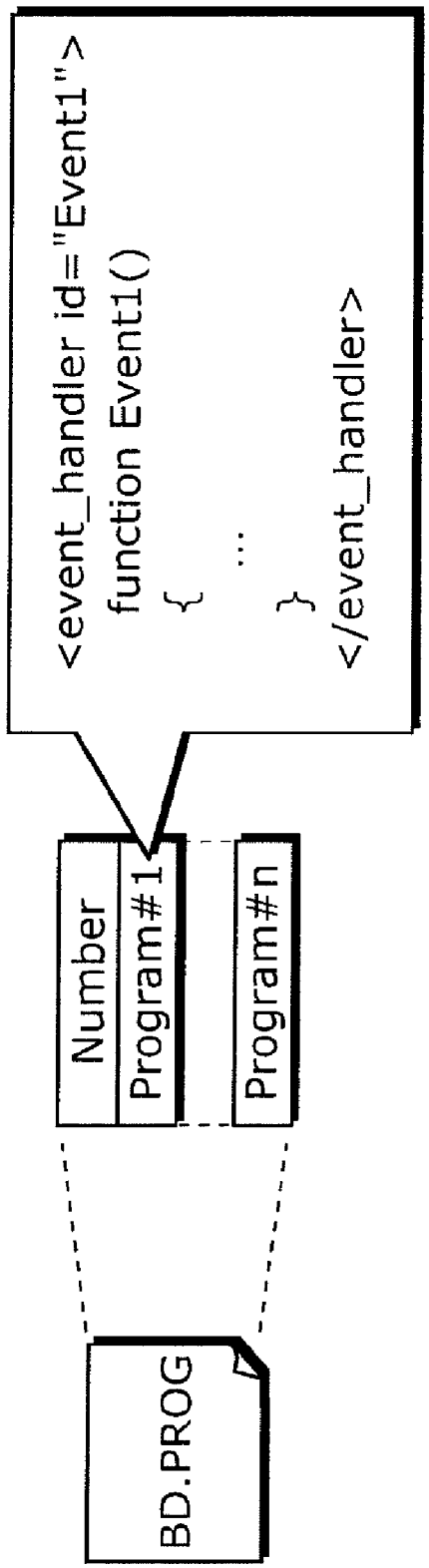
FIG. 32 shows a structure of a file storing a global event handler.

FIG. 32 shows a table ("BD.PROG") of programs which are global event handlers.

This table has the same structure as the event handler table shown in FIG. 30.

<Event Generation Mechanism>

Figure 33:
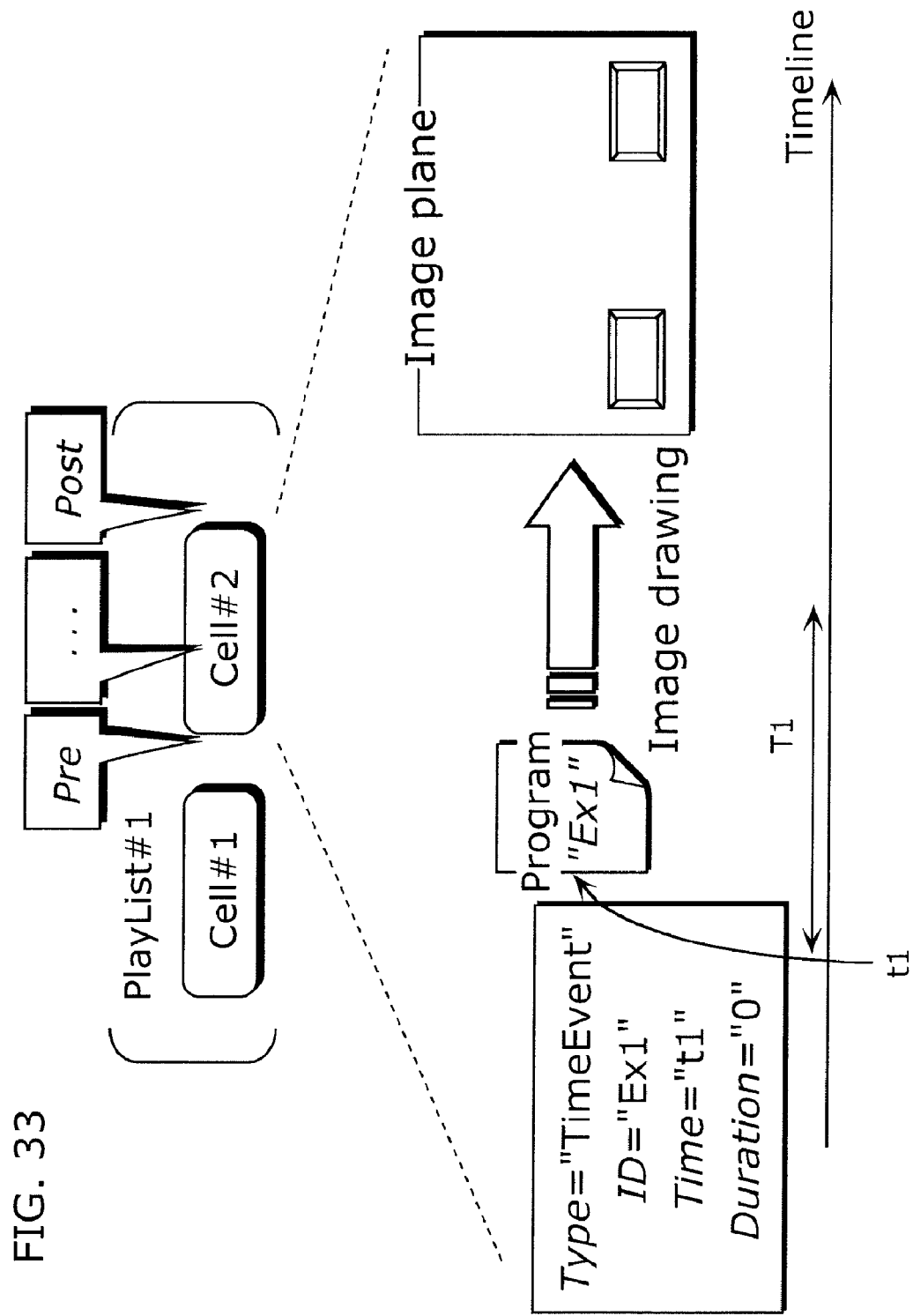
FIG. 33 shows an example of a time event.
Figure 34:
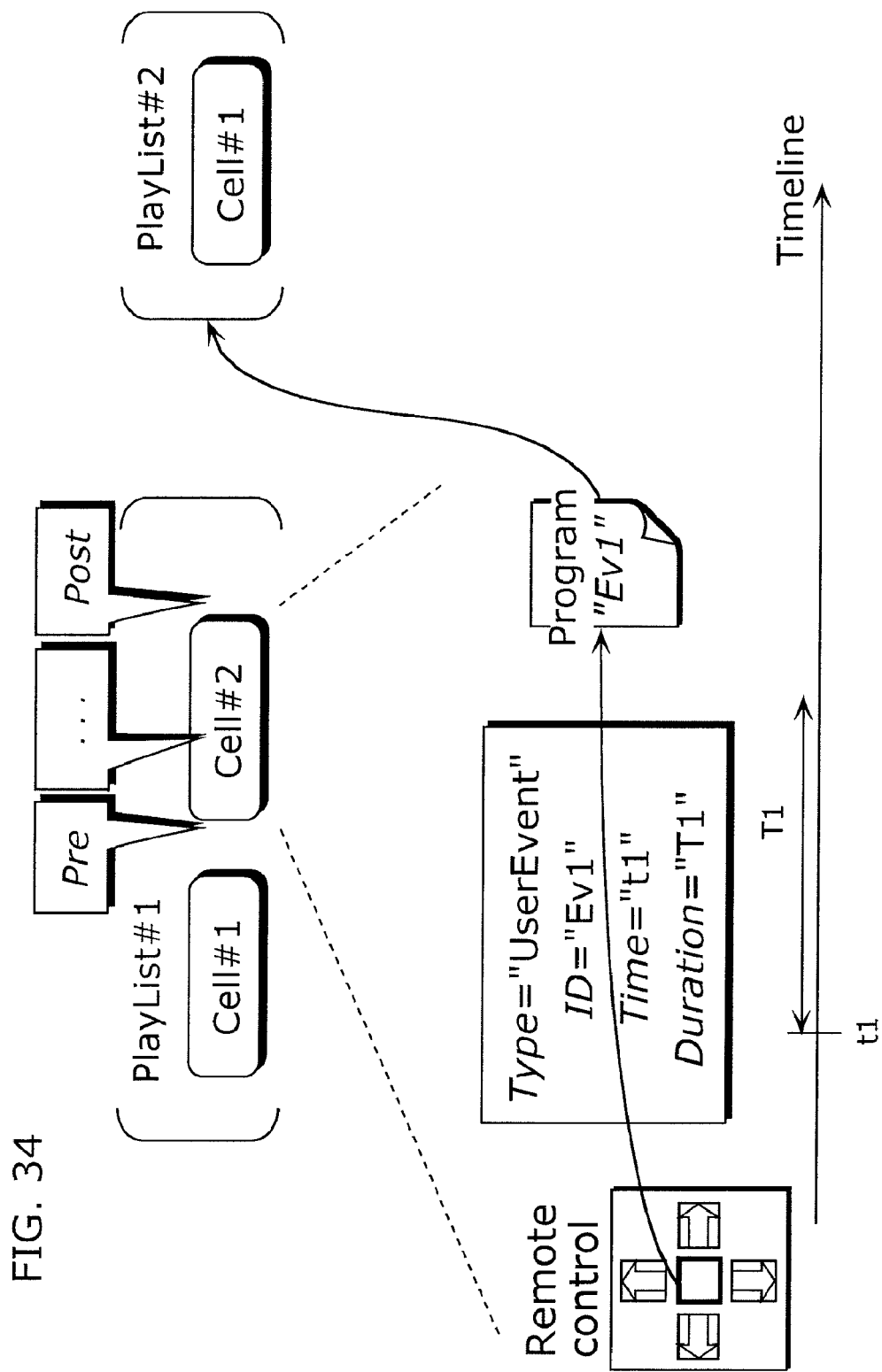
FIG. 34 shows an example of a user event.
Figure 35:
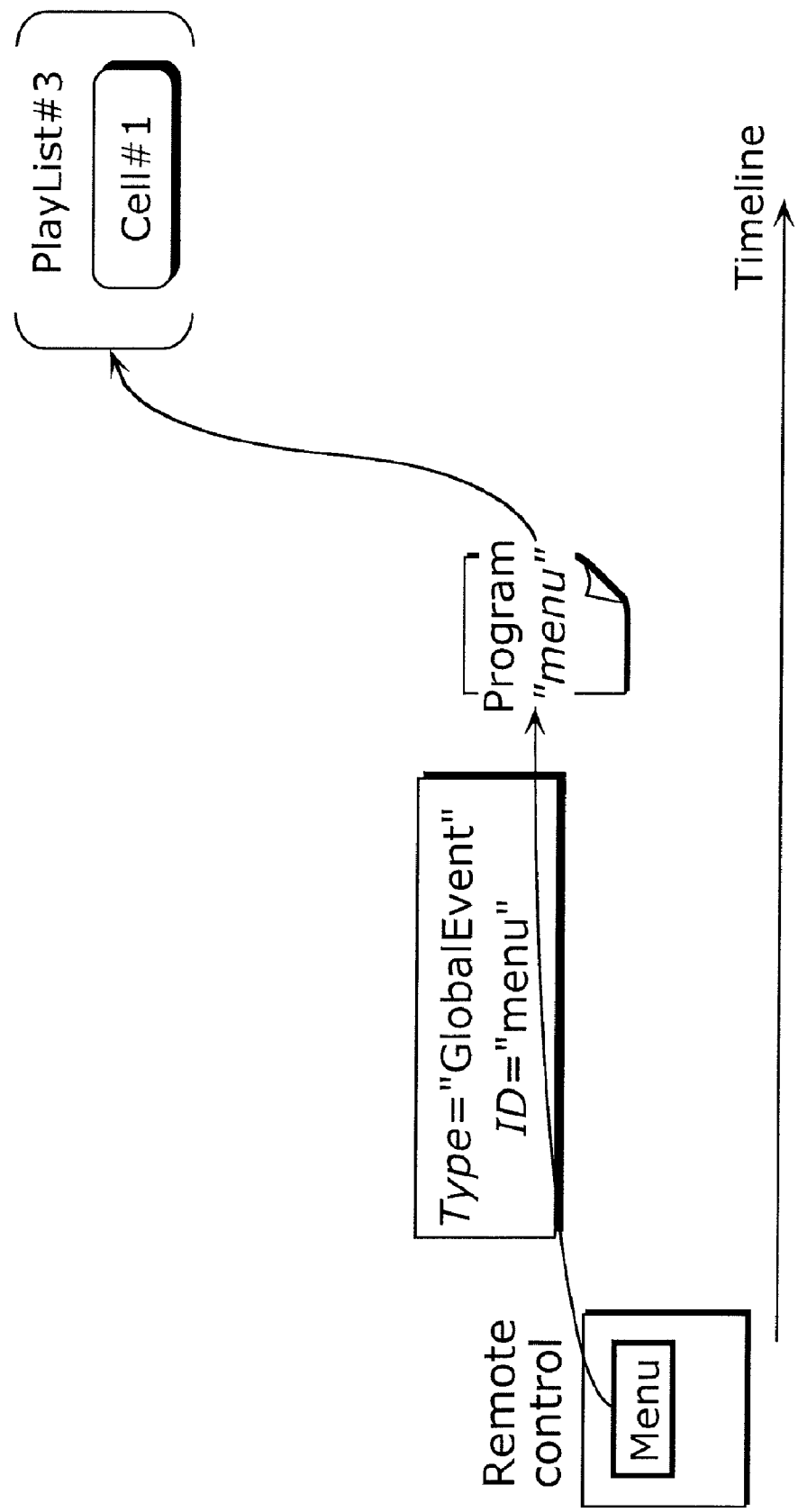
FIG. 35 shows an example of a global event handler.

The following describes a mechanism for generating an event, with reference to FIGS. 33 to 35.

FIG. 33 shows an example of a time event.

As described earlier, a time event is defined in the event list (EventList) in the playlist information ("XXX.PL"). In the case where an event is defined as a time event, i.e., the event type (Type) is "TimeEvent", a time event having an ID "Ex1" is sent from the scenario processor to the program processor when the current time is an event generation time (t1). The program processor searches for an event handler having the event ID "Ex1", and executes the event handler. In the example shown in FIG. 33, two button images are drawn.

FIG. 34 shows an example of a menu operation user event.

As described earlier, a menu operation user event is defined in the event list (EventList) in the playlist information ("XXX.PL"), too. In the case where an event is defined as a user event, i.e., the event type (Type) is "UserEvent", the user event is set in the ready state when the current time is an event generation time (t1). At this point, the event itself has not been generated yet. This event is in the ready state during a period shown by valid period information (Duration).

As shown in FIG. 34, when the user presses the Up/Down/Left/Right keys or the Enter key on the remote control, firstly the UOP manager generates a UOP event and outputs the generated UOP event to the program processor. The program processor passes the UOP event to the scenario processor. The scenario processor checks whether or not a valid user event exists at the time of reception of the UOP event. When the valid user event exists, the scenario processor generates the user event, and sends the generated user event to the program processor. The program processor searches for an event handler that has an event ID "Ev1", and executes the event handler. In the example shown in FIG. 34, playback of playlist#2 is started.

The generated user event does not include information about which remote control key was pressed by the user. This information about the pressed remote control key is sent to the program processor via the UOP event, and stored in a register SPRM(8) in a virtual player. The event handler program can reference the value of this register and execute a branch.

FIG. 35 shows an example of a global event.

As described above, a global event is defined in the event list (EventList) in the entire BD disc information ("BD.INFO"). In the case where an event is defined as a global event, i.e., the event type (Type) is "GlobalEvent", the event is generated only when the user performs a remote control key operation.

When the user presses the Menu key, firstly the UOP manager generates a UOP event and outputs the generated UOP event to the program processor. The program processor passes the UOP event to the scenario processor. The scenario processor generates a global event corresponding to the UOP event, and sends the generated global event to the program processor. The program processor searches for an event handler that has an event ID "menu", and executes the event handler. In the example shown in FIG. 35, playback of playlist#3 is started.

Though this embodiment simply refers to one Menu key, a plurality of menu keys may be provided as in the case of DVDs. This can be achieved by defining an ID corresponding to each menu key.

<Virtual Player Machine>

Figure 36:
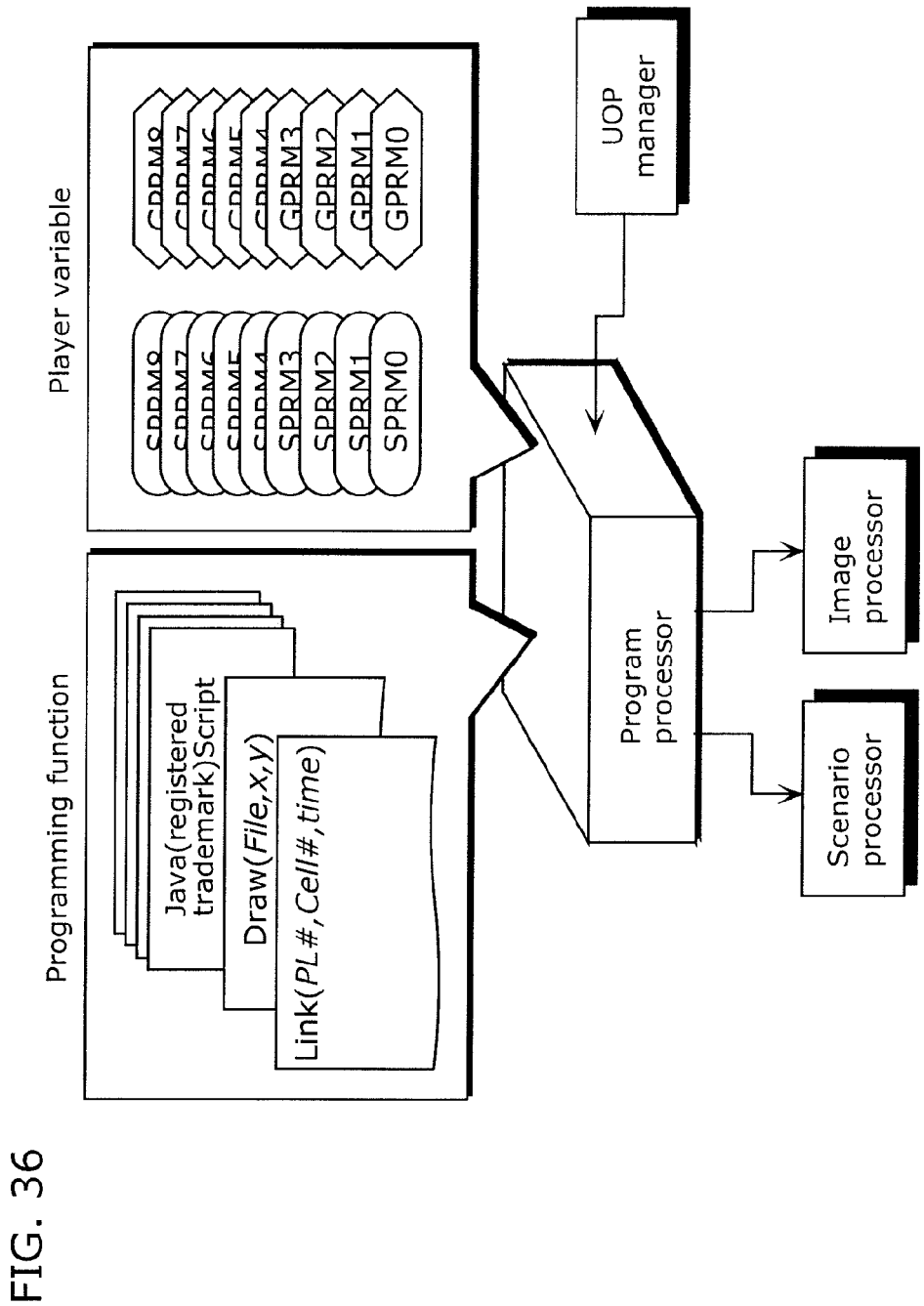
FIG. 36 shows a structure of a virtual machine.

The following describes a functional structure of the program processor with reference to FIG. 36.

The program processor is a processing module that has a virtual player machine inside. The virtual player machine is a functional model defined for BDs, and does not rely on implementation of each individual BD player. In other words, the virtual player machine ensures that same features can be realized in any BD player.

The virtual player machine has two main features, namely, programming functions and player variables (registers). The programming functions define the following features as BD unique functions, based on Java (registered trademark) Script.

Link function: stop the current playback and start playback at a designated playlist, cell, and time.
 Link (PL#, Cell#, time)
 PL#: playlist name
 Cell#: cell number
 time: playback start time in the cell
PNG draw function: draw designated PNG data on the image plane.
 Draw (File, X, Y)
 File: PNG file name
 X: X coordinate position
 Y: Y coordinate position
Image plane clear function: clear a designated area of the image plane.
 Clear (X, Y, W, H)
 X: X coordinate position
 Y: Y coordinate position
 W: width in the X direction
 H: width in the Y direction The player variables include system parameters (SPRMs) which show the status of the player and general parameters (GPRMs) which can be used for general purposes.

FIG. 37 shows a list of system parameters (SPRMs).
 SPRM(0): Language code
 SPRM(1): Audio stream number
 SPRM(2): Subtitle stream number
 SPRM(3): Angle number
 SPRM(4): Title number
 SPRM(5): Chapter number
 SPRM(6): Program number
 SPRM(7): Cell number
 SPRM(8): Selected key information
 SPRM(9): Navigation timer
 SPRM(10): Playback time information
 SPRM(11): Mixing mode for karaoke
 SPRM(12): Country code for parental management
 SPRM(13): Parental level
 SPRM(14): Player configuration (video)
 SPRM(15): Player configuration (audio)
 SPRM(16): Language code for audio stream
 SPRM(17): Language code for audio stream (extension)
 SPRM(18): Language code for subtitle stream
 SPRM(19): Language code for subtitle stream (extension)
 SPRM(20): Player region code
 SPRM(21): reserved
 SPRM(22): reserved
 SPRM(23): Playback status
 SPRM(24): reserved
 SPRM(25): reserved
 SPRM(26): reserved
 SPRM(27): reserved
 SPRM(28): reserved
 SPRM(29): reserved
 SPRM(30): reserved
 SPRM(31): reserved It is to be noted that this embodiment describes the case where the programming functions of the virtual player are based on Java (registered trademark) Script, but other programming functions, such as B-Shell or Perl Script used in UNIX (registered trademark) OS and the like, may also be used. In other words, the present invention is not limited to the use of Java (registered trademark) Script.

Program Examples

Figure 38:
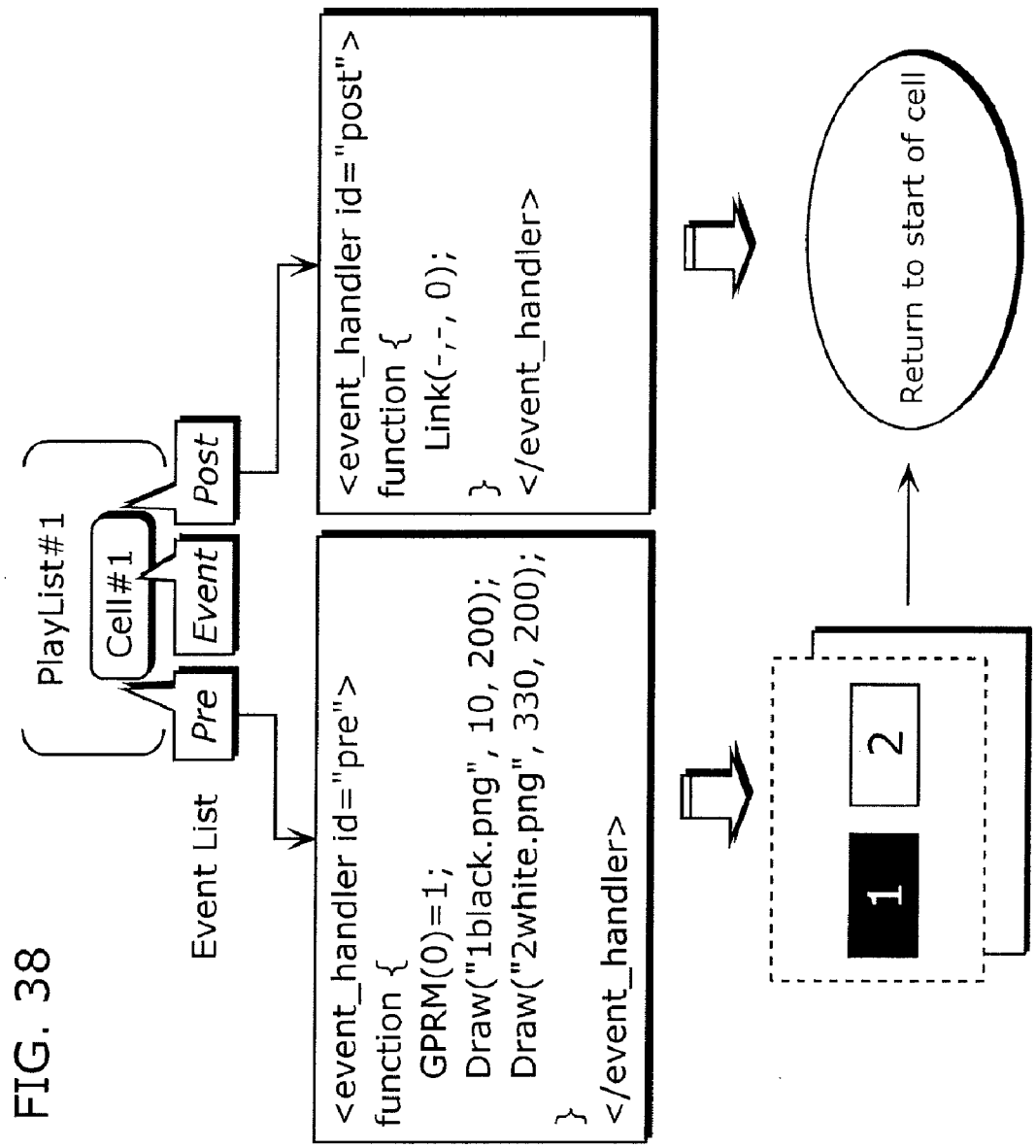
FIG. 38 shows an example of an event handler (for a time event).
Figure 39:
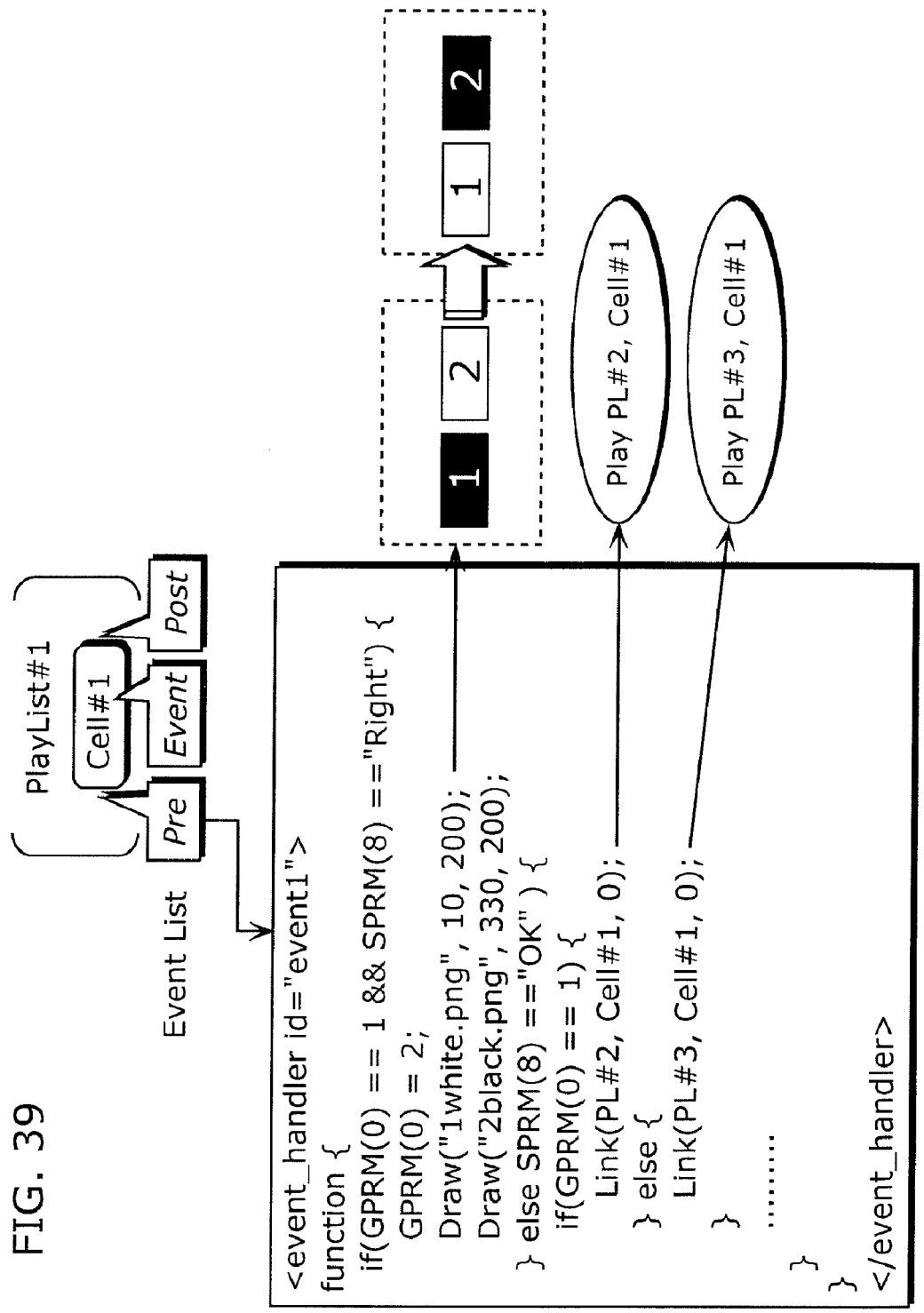
FIG. 39 shows an example of an event handler (for a user event).

FIGS. 38 and 39 show examples of event handler programs.

FIG. 38 shows an example of a menu having two selection buttons.

A program on the left of FIG. 38 is executed using a time event, at the beginning of a cell (Playlist#1, Cell#1). Here, the general parameter GPRM(0) is initially set to "1". GPRM(0) is used to identify a selected button in this program. In an initial state, GPRM(0) has an initial value indicating that button 1 on the left is selected.

Next, PNG drawing is performed for each of button 1 and button 2, using the Draw function. For button 1, a PNG image "1black.png" is drawn with coordinates (10, 200) as a starting point (upper left corner). For button 2, a PNG image "2white.png" is drawn with coordinates (330, 200) as a starting point (upper left corner).

Also, a program on the right of FIG. 38 is executed using a time event, at the end of the cell. Here, the Link function is used to instruct to play from the start of the cell again.

FIG. 39 shows an example of an event handler for a menu selection user event.

The event handler includes a program corresponding to each operation of pressing the Left key, the Right key, and the Enter key on the remote control. When the user presses any of the remote control keys, a user event is generated and the event handler of FIG. 39 is activated, as explained in FIG. 34. The event handler executes a branch, using the value of GPRM(0) identifying the selected button and the value of SPRM(8) identifying the pressed remote control key.

Condition 1): The Right key is pressed while button 1 is selected.

In this case, GPRM(0) is changed to "2", to set right button 2 in the selected state.

Also, the image of each of buttons 1 and 2 is redrawn.

Condition 2): The Enter (OK) key is pressed while button 1 is selected.

In this case, playback of playlist#2 is started.

Condition 3): The Enter (OK) key is pressed while button 2 is selected.

In this case, playback of playlist#3 is started.

In this way, the program execution is carried out.

<Player Processing Flows>

The following describes processing flows of the player, by referring to FIGS. 40 to 43.

Figure 40:
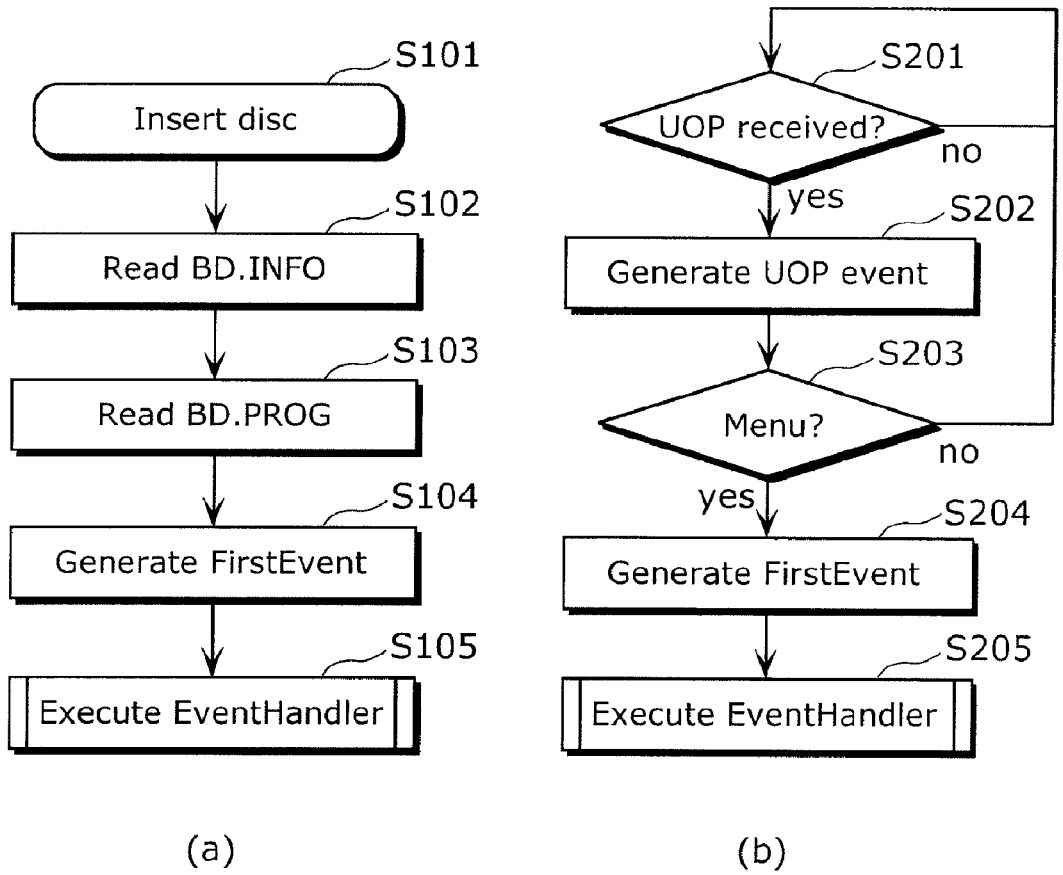
FIG. 40 is a flowchart showing basic player processing.

FIG. 40 is a flowchart showing basic processing up to AV playback.

As shown in FIG. 40(*a*), when the BD disc is inserted (Step S101), the BD player reads and analyzes the BD.INFO file (Step S102), and reads the BD.PROG file (Step S103). Here, both BD.INFO and BD.PROG are stored into the management information storage memory and then analyzed by the scenario processor.

Following this, the scenario processor generates the first event, according to the first event (FirstEvent) information in the BD.INFO file (Step S104). The program processor receives the first event, and executes an event handler corresponding to the first event (Step S105).

The event handler corresponding to the first event is expected to include information of a playlist to be played first. If playlist playback is not designated in the event handler, the BD player has nothing to play, and waits for receiving a user event (Step S201) as shown in FIG. 40(*b*). Upon receiving the user's remote control operation, the UOP manager sends a UOP event to the program processor (Step S202).

The program processor judges whether or not the UOP event corresponds to the Menu key (Step S203). When the UOP event corresponds to the Menu key, the program processor sends the UOP event to the scenario processor, and the scenario processor generates a user event (Step S204). The program processor executes an event handler corresponding to the generated user event (Step S205).

Figure 41:
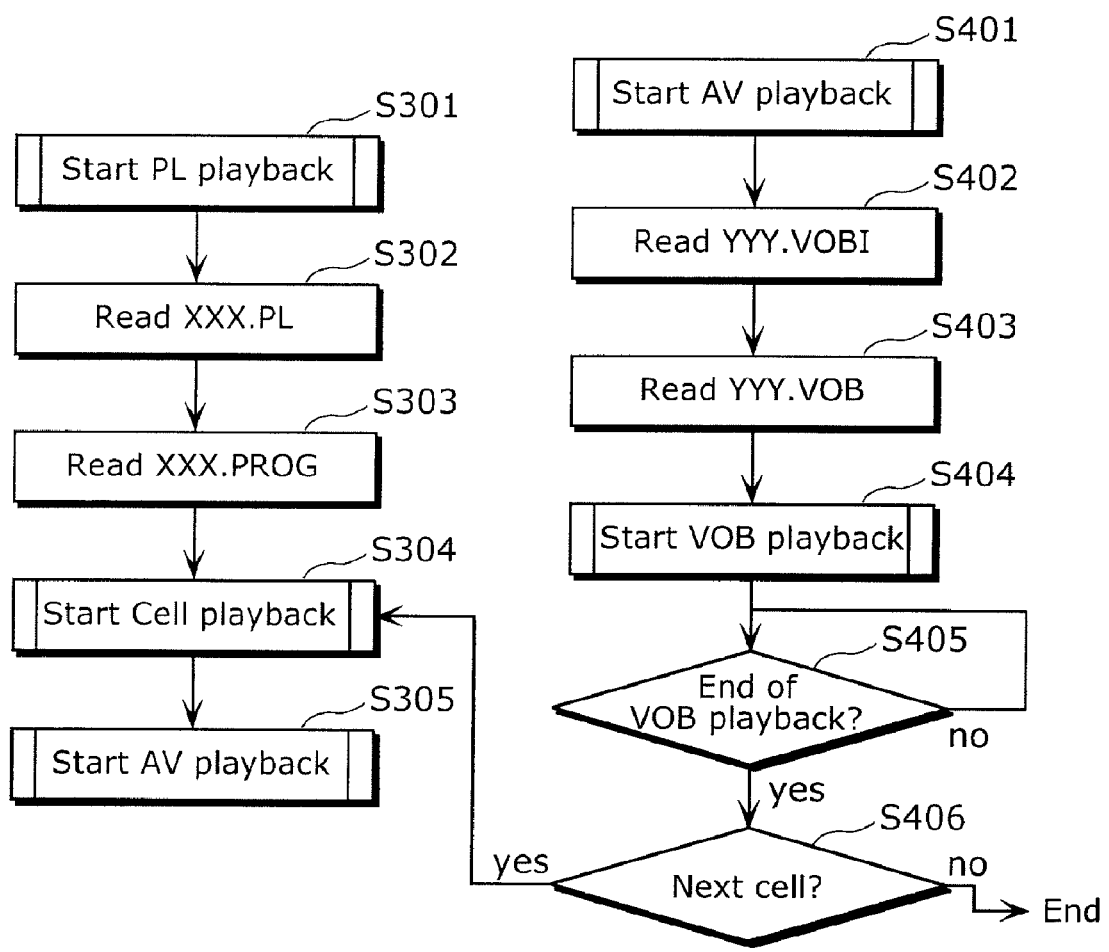
FIG. 41 is a flowchart showing playlist playback processing.

FIG. 41 is a flowchart showing processing from the start of PL playback to the start of VOB playback.

As noted above, playback of a playlist is initiated by the first event handler or the global event handler (Step S301). The scenario processor reads and analyzes the playlist information "XXX.PL" (Step S302) and reads the program information "XXX.PROG" corresponding to the playlist (Step S303), as information necessary to play the playlist. After this, the scenario processor instructs to start playback of a cell, based on cell information shown in the playlist (Step S304). This is done by the scenario processor issuing a request to the presentation controller, which responsively starts playing AV data (Step S305).

When the playback of the AV data starts (Step S401), the presentation controller reads and analyzes the VOB information file (YYY.VOBI) of a VOB corresponding to the cell (Step S402). The presentation controller specifies a VOBU to be played and its address, using a time map. The presentation controller indicates the read address to the drive controller. The drive controller reads target VOB data from the indicated address (Step S403), and sends the read VOB data to the decoder. Thus, the playback of the VOB data begins (Step S404).

The VOB playback continues until the end of the playback section in the VOB specified by the cell (Step S405). After the end of the playback section, the processing moves to Step S304 to play a next cell. When the next cell does not exist, the playback operation ends (Step S406).

FIG. 42 is a flowchart showing event processing after the start of AV playback.

The BD player is an event-driven player model. Once playback of a playlist has begun, event processes for a time event, a user event, and a subtitle display are activated, and the BD player executes such event processes in parallel.

Steps S501 to S505 (FIG. 42(*a*)) correspond to the time event processing.

After the playback of the playlist starts (Step S501), a judgment is performed as to whether or not the playlist playback is completed (Step S502). When the playlist playback is not completed, the scenario processor judges whether or not the current time is a time event generation time (Step S503). When the current time is the time event generation time, the scenario processor generates a time event (Step S504). The program processor receives the time event, and executes an event handler corresponding to the time event (Step S505).

When the current time is not the time event generation time in Step S503 or after the event handler is executed in Step S505, the time event processing returns to Step S502 to repeat the above steps. When the playlist playback is judged as completed in Step S502, the time event processing is forcefully terminated.

Steps S601 to S608 (FIG. 42(*b*)) correspond to the user event processing.

After the playback of the playlist starts (Step S601), a judgment is performed as to whether or not the playlist playback is completed (Step S602). When the playlist playback is not completed, a judgment is performed as to whether or not a UOP is received (Step S603). Upon receiving a UOP, the UOP manager generates a UOP event (Step S604). The program processor receives the UOP event, and judges whether or not the UOP event is a menu call (Step S605). When the UOP event is a menu call, the program processor instructs the scenario processor to generate a user event (Step S607). The program processor then executes an event handler corresponding to the user event (Step S608).

When the UOP event is judged as not a menu call in Step S605, it means the UOP event is an event by the cursor keys or the Enter key. In this case, the scenario processor judges whether or not the current time is within a user event valid period (Step S606). When the current time is within the user event valid period, the scenario processor generates a user event (Step S607), and the program processor executes an event handler corresponding to the user event (Step S608).

When a UOP is not received in Step S603, when the current time is not within the user event valid period in Step S606, or after the event handler is executed in Step S608, the user event processing returns to Step S602 to repeat the above steps. When the playlist playback is judged as completed in Step S602, the user event processing is forcefully terminated.

Figure 43:
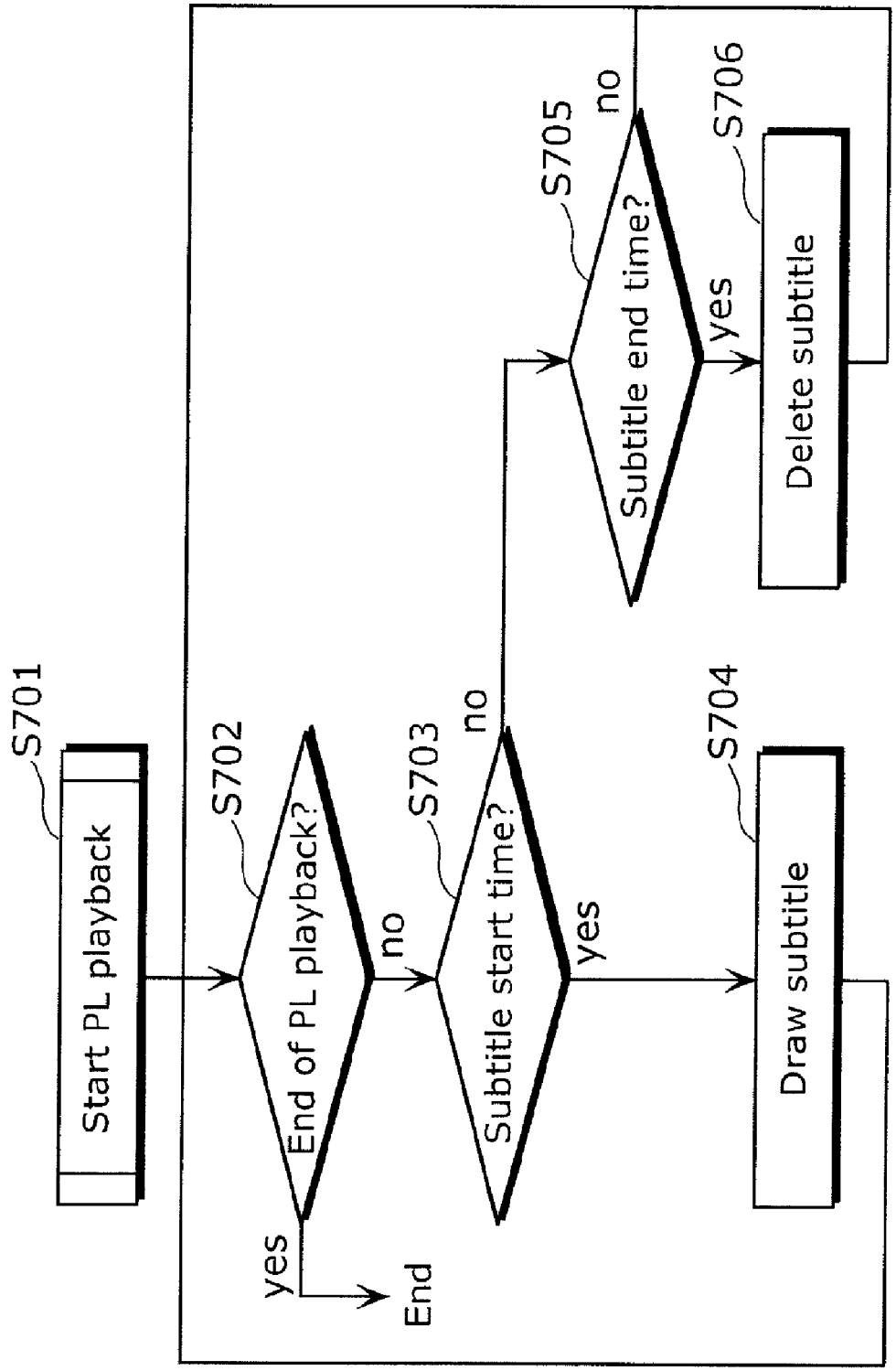
FIG. 43 is a flowchart showing subtitle processing.

FIG. 43 corresponds to the subtitle processing.

After the playback of the playlist starts (Step S701), a judgment is performed as to whether or not the playlist playback is completed (Step S702). When the playlist playback is not completed, a judgment is performed as to whether or not the current time is a start time for drawing a subtitle (Step S703). When the current time is the subtitle drawing start time, the scenario processor instructs the presentation controller to draw the subtitle. The presentation controller instructs the image processor to draw the subtitle (Step S704). When the current time is judged as not the subtitle drawing start time in Step S703, a judgment is performed as to whether or not the current time is a subtitle display end time (Step 705). When the current time is the subtitle display end time, the presentation controller instructs the image processor to delete the subtitle, and the image processor deletes the subtitle from the image plane (Step S706).

After the subtitle drawing Step S704 ends, after the subtitle deletion Step S706 ends, or when the current time is judged as not the subtitle display end time in Step S705, the subtitle processing returns to Step S702 to repeat the above steps. When the playlist playback is judged as completed in Step S702, the subtitle processing is forcefully terminated.

Second Embodiment

The second example of stream in which different coding methods (or a moving image with different attributes) can exist, that is, the example where a luminance level threshold (moving image attribute) which is used when performing a transparency process by a luminance key on a picture-in-picture can take different values, is described below as a second embodiment of the present invention.

This embodiment describes a recording medium, a multiplexing method, a multiplexing device, and a playback device that can eliminate, when playing a picture-in-picture on a package medium such as a BD-ROM, a delay in playback operation caused by switching the luminance level threshold which is used to determine whether or not to perform the transparency process.

In the recording medium of this embodiment, the following information is included in management information for a stream that is subject to the transparency process by the luminance key: information indicating that the luminance level threshold used for judging whether or not to perform the transparency process at the time of image display is constrained in a continuous playback unit, or information indicating that the transparency process is constrained.

The recording medium, the multiplexing method, the multiplexing device, and the playback device of this embodiment basically have a similar data structure to the recording medium of the first embodiment, and similar structural elements and operations to the multiplexing method, the multiplexing device, and the playback device of the first embodiment. Accordingly, the following description focuses only on characteristic features of the second embodiment.

Figure 44:
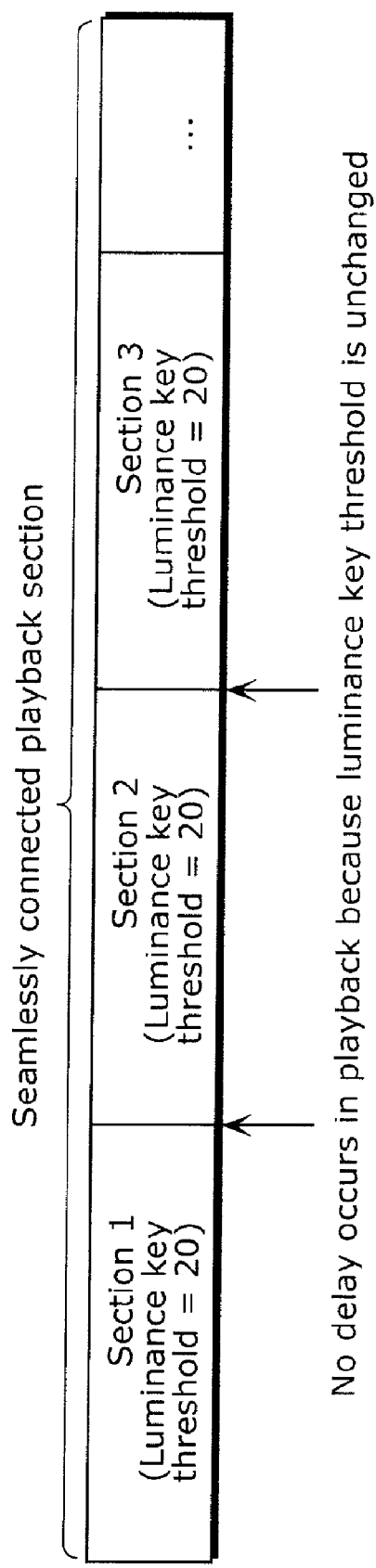
FIG. 44 shows an example where a luminance key threshold is fixed in a continuous playback section.

FIG. 44 shows an example of a luminance key threshold in a stream recorded on the recording medium of this embodiment. In the example of FIG. 44, the luminance key threshold is fixed to 20 in all sections that are seamlessly connected. As a result, a delay caused by switching the luminance key threshold is suppressed, with it being possible to realize seamless connection.

Figure 45:
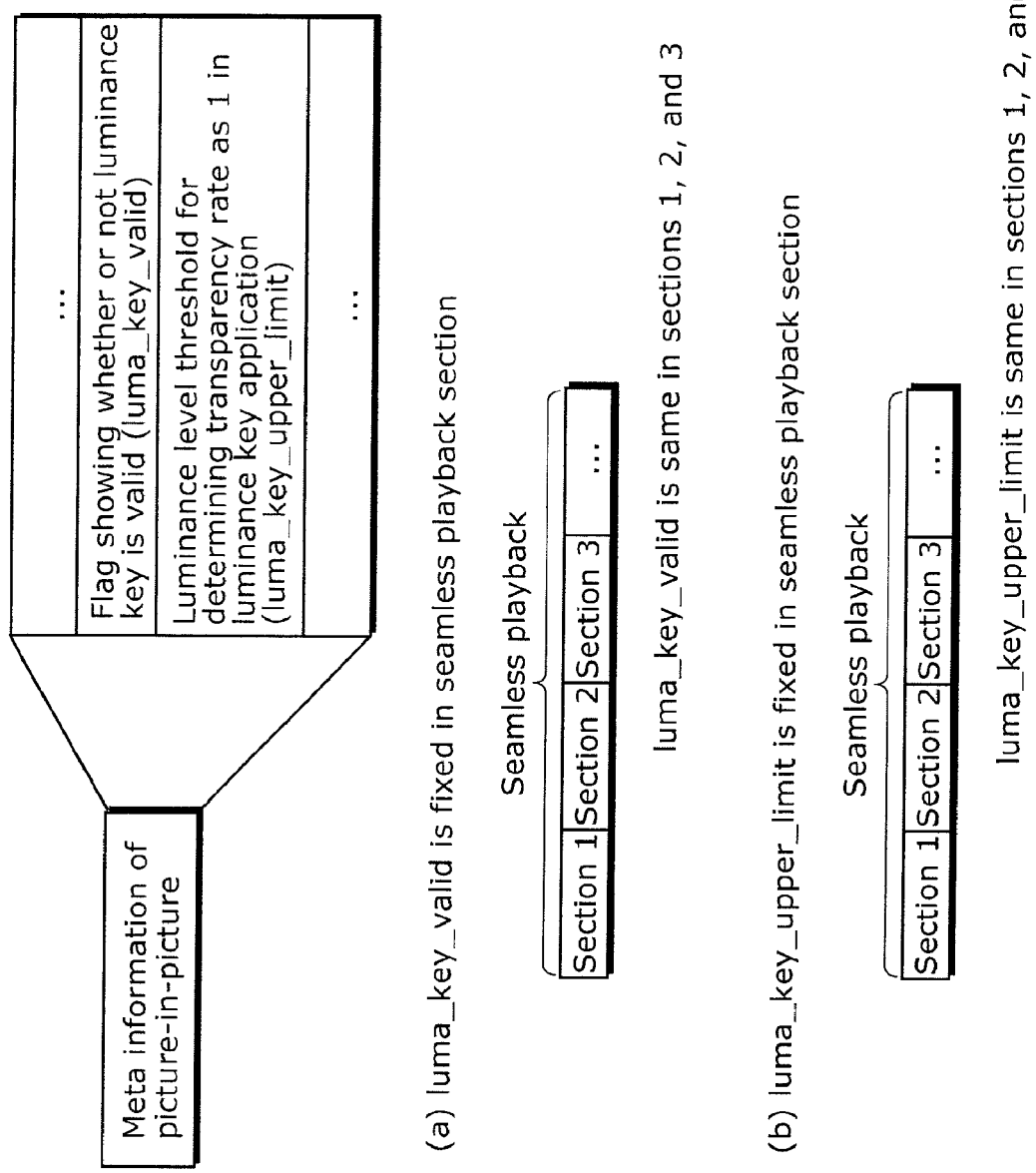
FIG. 45 is a diagram for explaining luminance key-related values that are fixed in a seamless playback section.

Also, information regarding the luminance key in the seamlessly connected playback section is included in management information on the recording medium of this embodiment. FIG. 45 shows an example of storing the information relating to the luminance key as part of meta information of a picture-in-picture. FIG. 45(a) shows flag information luma_key_valid that indicates whether or not the luminance key is valid. When the luminance key is valid (luma_key_valid=1), an image is transparency-processed and displayed based on a threshold of the luminance key. When the luminance key is not valid (luma_key_valid=0), the image is displayed without the transparency process. As shown in FIG. 45(a), the value of luma_key_valid is fixed in all playback sections that are seamlessly connected. That is, the state of whether or not the luminance key is valid is fixed in all playback sections that are seamlessly connected. FIG. 45(b) shows luminance level threshold luma_key_upper_limit which is used for determining whether or not to display a pixel transparent when applying the luminance key. For example, when luma_key_upper_limit is 20, a pixel whose luminance level is equal to or smaller than 20 is displayed transparent, whereas a pixel whose luminance level exceeds 20 is displayed nontransparent. As shown in FIG. 45(b), the value of luma_key_upper_limit is fixed in all playback sections that are seamlessly connected. Here, since luma_key_upper_limit is referenced in a case where the luminance key is valid, the information showing the luminance key threshold may be provided only in the case where the luminance key is valid.

When it is ensured that the luminance key threshold is fixed, a player for performing the transparency process by the luminance key does not need to change the threshold in luminance key threshold processing. Therefore, it is desirable to be able to judge beforehand whether or not the luminance key threshold is fixed. FIG. 46 is a diagram for explaining a flag used for ensuring that the luminance key threshold is fixed. In the example of FIG. 46, flag information luma_key_fixed_flag, which indicates whether or not the luminance key threshold is fixed, is stored as part of attribute information of each playback section. Luma_key_fixed_flag indicates whether or not the luminance key threshold in the playback section is the same as that in an immediately preceding playback section. FIG. 46(a) shows an example of indicating that the luminance key threshold is fixed (luma_key_fixed_flag=1). In this example, playback sections are seamlessly connected, and it is ensured that the luminance key threshold is fixed in these playback sections. FIG. 46(b) shows an example of not ensuring that the luminance key threshold is fixed (luma_key_fixed_flag=0). In this example, playback sections are not subject to seamless connection, and the luminance key threshold is variable in these playback sections. Note here that luma_key_fixed_flag may be set for an entire continuous playback section, or for each playback section that constitutes the continuous playback section. In the case of setting luma_key_fixed_flag for each playback section, given that each playback section is specified by a playitem, information indicating whether or not the luminance key threshold is fixed in a playback section may be included in playback information provided for each playitem. For example, information showing whether or not a playback section specified by a current playitem and a playback section specified by an immediately preceding playitem can be connected seamlessly may be used also as the information indicating whether or not the luminance key threshold is fixed. In this way, the two information can be shown by one flag. Also, the information indicating whether or not the luminance key is to be applied may be stored in the same way.

The second embodiment has the same types of seamless connection as in the first embodiment. For example, a seamless multi-angle in which streams of different angles can be seamlessly connected is one type of seamless connection. In a seamless multi-angle, each angle has a same state of whether or not the luminance key is valid or a same luminance key threshold. There are also multiple types of seamless connection, such as (1) a case where the value of reference clock such as the system time clock (STC) in the MPEG-2 system standard is not continuous before and after the connection (seamless connection of type 1), and (2) a case where the value of reference clock such as the system time clock (STC) in the MPEG-2 system standard is continuous before and after the connection (seamless connection of type 2). This being so, when seamless connection is indicated by any of information showing whether or not two playback sections correspond to the seamless connection of type 1 and information showing whether or not two playback sections correspond to the seamless connection of type 2, then such information can be used to show that the luminance key threshold is fixed in the two continuous playback sections.

Figure 47:
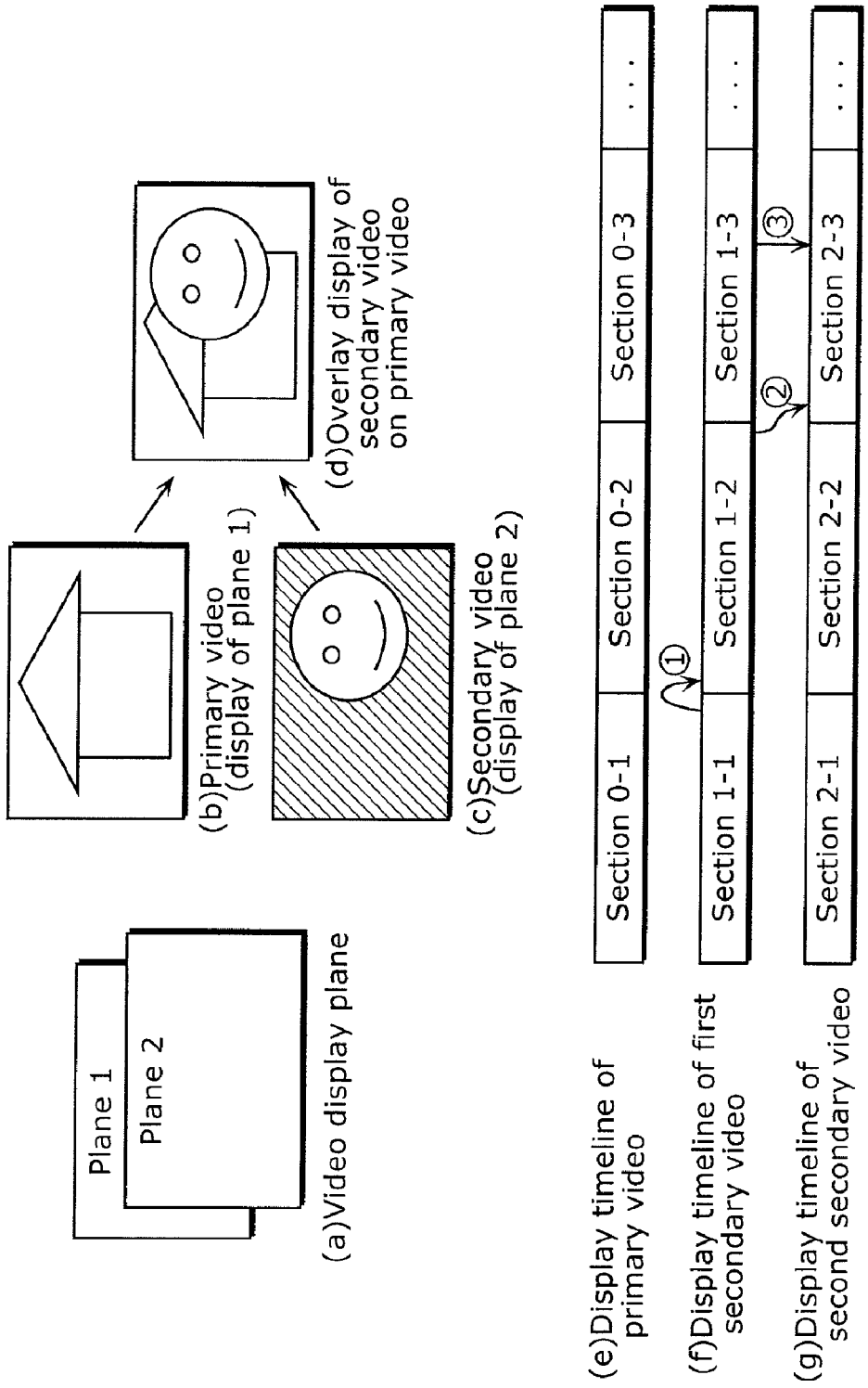
FIG. 47 shows a picture-in-picture operation on the recording medium in a second embodiment of the present invention.

FIG. 47 shows an example of applying the luminance key in a picture-in-picture. In the picture-in-picture, sub-video called secondary video is overlay-displayed on main video called primary video. Here, when the transparency process by the luminance key is valid for the secondary video, the transparency process is performed. When the transparency process by the luminance key is not valid for the secondary video, on the other hand, the transparency process is not performed. FIG. 47(a) shows video display planes. Plane 1 is a display plane for the primary video and plane 2 is a display plane for the secondary video, as shown in FIGS. 47(b) and 47(c). As shown in FIG. 47(d), the secondary video is overlay-displayed on the primary video. In this example, the diagonally shaded area in FIG. 47(c) is displayed transparent as a result of the transparency process by the luminance key. The secondary video can be switched between a plurality of streams. FIGS. 47(e), 47(f), and 47(g) show an example where two secondary video streams exist. In detail, FIG. 47(e) shows a display timeline of each playback section in a primary video stream. FIG. 47(f) shows a display timeline of each playback section in a first secondary video stream. FIG. 47(g) shows a display timeline of each playback section in a second secondary video stream. For example, suppose sections 1-1 and 1-2 in FIG. 47(f) are seamlessly connected (circled 1 in FIG. 47). When this is the case, sections 1-1 and 1-2 have a same state of whether or not the transparency process by the luminance key is valid and, if the transparency process is valid, a same luminance key threshold. Also, suppose section 1-2 in the first secondary video stream is seamlessly connected to section 2-3 in the second secondary video stream (circled 2 in FIG. 47). In such a case, sections 1-2 and 2-3 have same information relating to the luminance key. Furthermore, sections 1-3 and 2-3 may be given same luminance key-related information, in order to ensure continuity in connection other than the connected parts of the playback sections (circled 3 in FIG. 47).

The primary video and the secondary video are multiplexed in a transport stream or the like and recorded. FIG. 48 shows a method of multiplexing the primary video and the secondary video. FIG. 48(a) shows an example of multiplexing the primary video and the secondary video in a same transport stream. FIG. 48(b) shows an example of multiplexing the primary video and the secondary video in separate transport streams. Thus, the primary video and the secondary video may be multiplexed in a same transport stream or in separate transport streams.

Figure 49:
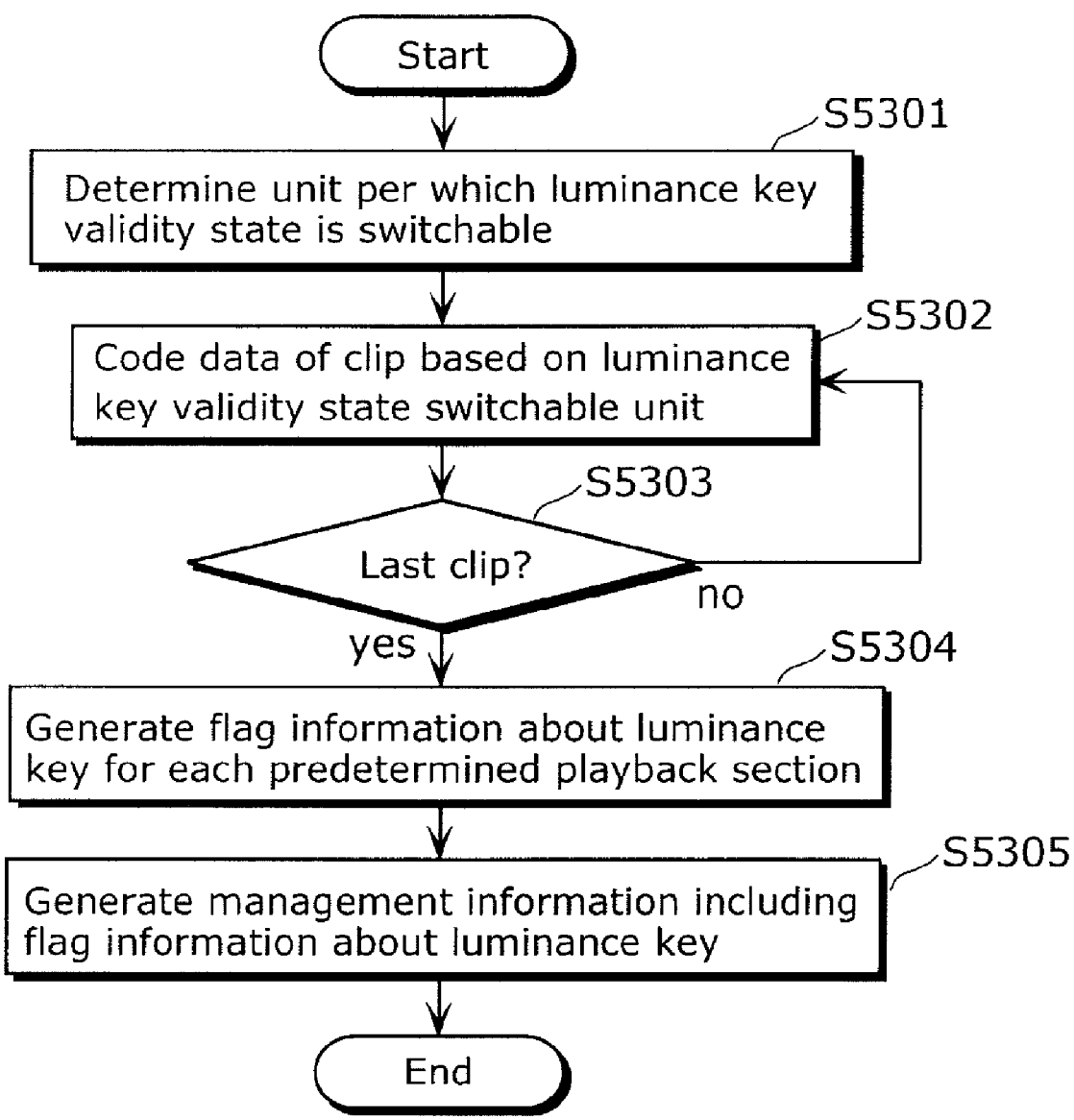
FIG. 49 is a flowchart showing an operation of a multiplexing method for realizing the picture-in-picture operation in the second embodiment of the present invention.

FIG. 49 is a flowchart showing an operation of the multiplexing method for generating multiplexed data recorded on the recording medium of this embodiment. The multiplexing method of this embodiment differs from the conventional multiplexing method in that it includes: a step of determining a unit per which the state of whether or not the luminance key is valid is switchable (Step S5301); a step of coding a moving image of a clip based on the determined unit (Step S5302); a step of generating flag information relating to the luminance key for each predetermined playback section (Step S5304); and a step of generating management information which includes the flag information relating to the luminance key generated in Step S5304 (Step S5305).

Which is to say, the multiplexing method of this embodiment is a moving image coding method for coding a video stream that includes a first moving image and a second moving image to be overlaid on the first moving image, and includes: a step of determining, in the video stream, a continuous playback section that is a group of partial sections and is subject to continuous playback, and coding the video stream in each playback section so that a luminance key attribute is fixed in the continuous playback section, the luminance key attribute being defined by at least one of a state of whether or not a luminance key is valid and a threshold used for a transparency process by the luminance key (Steps S5301 to S5303); a step of generating the luminance key attribute for each playback section or for each group of playback sections (Step S5304); and a step of generating management information including flag information indicating that the luminance key attribute is fixed in the continuous playback section (Step S5305). The following describes these steps in detail.

Firstly, in Step S5301, the unit per which the state of whether or not the luminance key is valid (luminance key validity state) is switchable is determined. That is, one of a continuous playback unit, a clip, and a random access unit is determined as the unit per which the luminance key validity state is switchable. Next, in Step S5302, data of a clip is coded based on the luminance key validity state switchable unit determined in Step S5301. Note here that a judgment as to whether or not the luminance key threshold is switchable may also be performed in Step S5301, so that the clip coding in Step S5302 is conducted based on a result of the judgment. In Step S5303, a judgment is performed as to whether or not coding of a last clip ends. When the coding of the last clip ends, the operation proceeds to Step S5304. When the coding of the last clip has not ended, the operation returns to Step S5302 to repeat clip coding. In Step S5304, attribute information relating to the luminance key is generated for each predetermined playback section, and the operation proceeds to Step S5305. The predetermined playback section mentioned here is a playback section designated by a playlist in this embodiment, though the predetermined playback section may instead be a clip or a random access unit. In Step S5305, management information including the attribute information generated in Step S5304 is generated, and the management information and the clip data are multiplexed and outputted. Here, information indicating whether or not two continuous playback sections can be seamlessly connected may be included in the management information. Since the luminance key validity state is fixed in playback sections that are seamlessly connected, in Step S5301 the luminance key validity state is determined as not switchable in the seamlessly connected playback sections. Also, in Step S5302, when the luminance key is valid in the seamlessly connected playback sections, the coding is performed so that the threshold used when performing the transparency process by the luminance key is the same in each of these seamlessly connected playback section. Note that a detailed operation of determining the unit per which the luminance key validity state is switchable in Step S5301 can be realized by the same operation as the multiplexing method of the first embodiment shown in FIG. 14.

Figure 50:
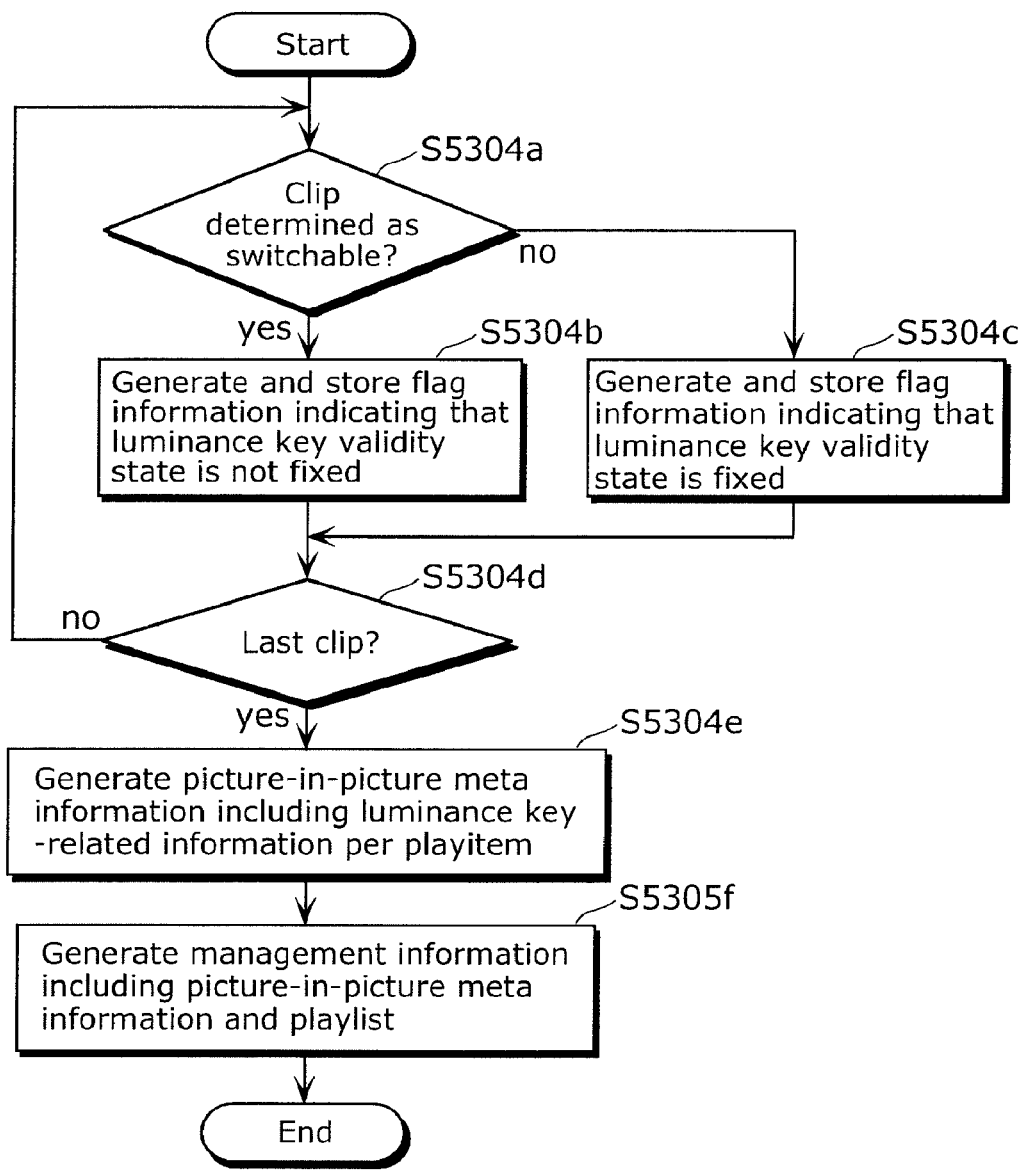
FIG. 50 is a flowchart showing an operation of generating management information in the multiplexing method for realizing the picture-in-picture operation in the second embodiment of the present invention.

FIG. 50 is a flowchart showing a specific example of the flag information generation step (Step S5304) and the management information generation step (Step S5305) shown in FIG. 49. In Step S5304a, a judgment is performed as to whether or not a coded clip is a clip whose luminance key validity state is switchable. When the coded clip is judged as switchable, flag information indicating that the luminance key validity state is not fixed is generated and stored in a work area of a memory in correspondence with the clip (Step S5304b). When the coded clip is judged as not switchable, flag information indicating that the luminance key validity state is fixed is generated and stored in the work area of the memory in correspondence with the clip (Step S5304c). Here, the flag information includes, for each predetermined playback section such as a playback section specified by a playitem, information showing whether or not the luminance key is valid and, when the luminance key is valid, the threshold of the luminance key. In Step S5304d, a judgment is performed as to whether or not the coded clip is a last clip. When the coded clip is not the last clip, Steps S5304a to S5304c are repeated. When the coded clip is the last clip, the operation proceeds to Step S5304e. In Step S5304e, picture-in-picture meta information, which includes the luminance key-related information for each playitem, is generated. In Step S5305f, management information that includes the picture-in-picture meta information, a playlist, information necessary for random access, and the like is generated. Information indicating whether or not two continuous playback sections can be seamlessly connected and information showing a seamless connection type are included in the playlist.

It is to be noted that, since index information identifying a transport stream or a coded stream of secondary video is included in management information, the luminance key-related information may be included in the management information only for such a transport stream or coded stream that is identified as secondary video by an index number.

This embodiment describes the transparency process by the luminance key for the secondary video in the picture-in-picture operation, but the present invention is not limited to this. The present invention is applicable to any case of displaying, when a plurality of display planes exist, an image on a plane that is placed in front of another plane. One example is to overlay-display a still image or a moving image on a still image, computer graphics, and the like. Also, the transparency process by the luminance key may be applied to a plurality of images that are displayed on different display planes.

Furthermore, a transparency rate other than 0 and 1, e.g. semitransparency, may be used according to the luminance key threshold and the like.

In a picture-in-picture, a constraint may be imposed on a playback operation other than the transparency process by the luminance key. For example, a state of whether or not to display secondary video may be fixed when performing special playback, such as high-speed playback or inverse playback, across seamlessly connected playback sections. In detail, in the case of special playback, the display state is fixed to one of always displaying the secondary video and not displaying the secondary video. When displaying the secondary video at the time of special playback, the special playback may be associated with the transparency process by the luminance key by, for example, fixing the luminance key threshold. When doing so, the constraint in the picture-in-picture at the time of special playback may be ensured by fixing a value of flag information indicating whether or not to display the secondary video in special playback, or by using flag information showing that the value of the above flag information, i.e. the flag information indicating whether or not to display the secondary video in special playback, is fixed.

Note that the primary video and the secondary video can be coded according to, for example, MPEG-4 AVC, MPEG-2 Video, or VC-1. To reduce combinations of coding methods required of the player, a combination of coding methods of the primary video and the secondary video may be restricted such that, when the coding method of the primary video is MPEG-4 AVC, the secondary video is coded by MPEG-4 AVC, too.

Figure 51:
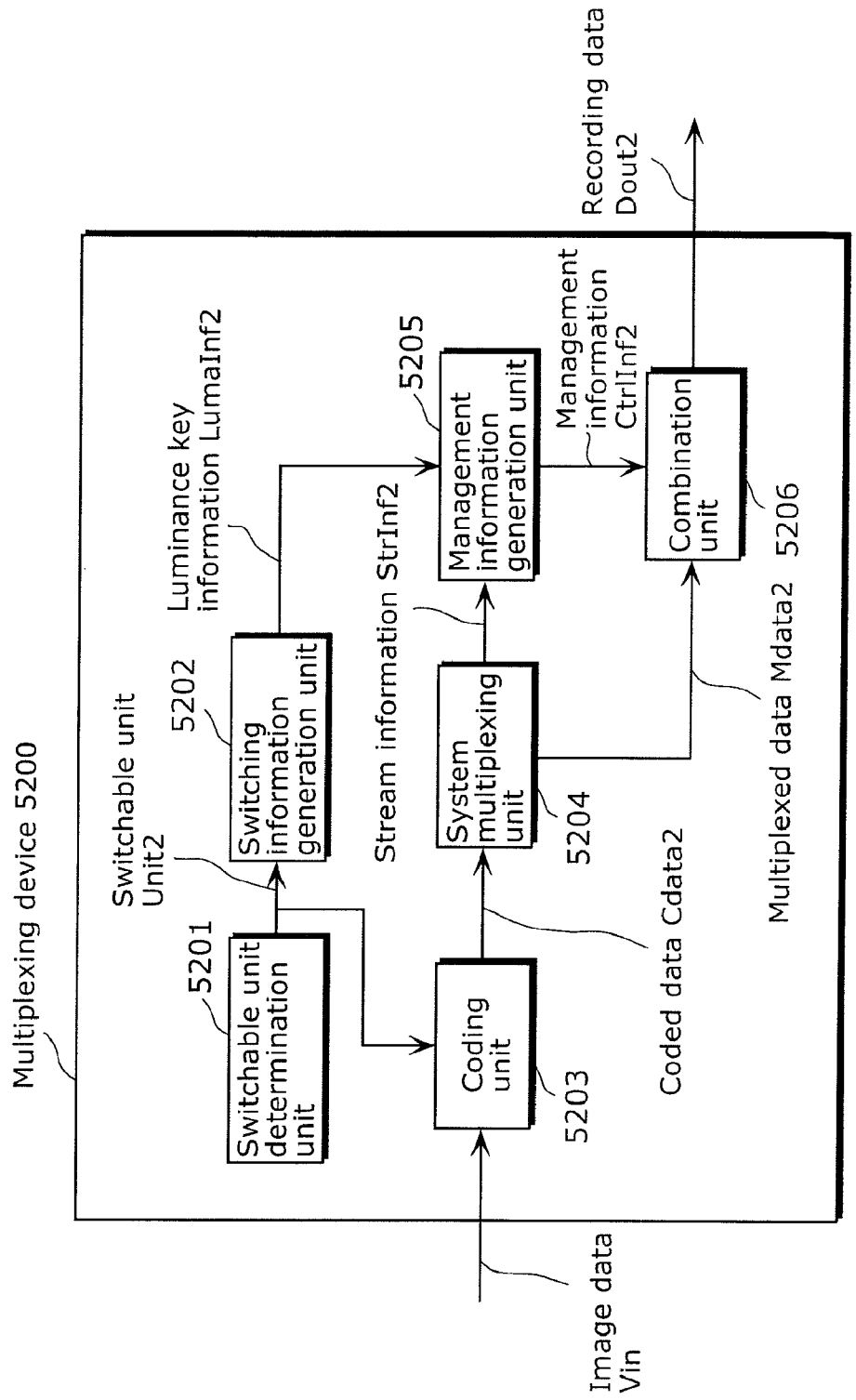
FIG. 51 is a block diagram showing a structure of a multiplexing device in the second embodiment of the present invention.

FIG. 51 is a block diagram showing a structure of a multiplexing device 5200 for realizing the multiplexing method of this embodiment. The multiplexing device 5200 is one example of moving image coding device for coding a video stream that includes a first moving image and a second moving image to be overlaid on the first moving image. The multiplexing device 5200 includes a switchable unit determination unit 5201, a switching information generation unit 5202, a coding unit 5203, a system multiplexing unit 5204, a management information generation unit 5205, and a combination unit 5206. Here, only an image area, in the second moving image, whose luminance level exceeds a predetermined threshold is overlaid on the first moving image. The following describes an operation of each of the structural units.

The switchable unit determination unit 5201 determines, in the video stream, a continuous playback section that is a group of partial sections and is subject to continuous playback. Here, the switchable unit determination unit 5201 determines a unit per which the luminance key threshold is switchable, and inputs the determined unit to the switching information generation unit 5202 and the coding unit 5203 as switchable unit Unit2. Though it is assumed here that the switchable unit has been set in advance, the switchable unit may instead be set from outside.

The switching information generation unit 5202 generates, based on switchable unit Unit2, luminance key information LumaInf2 showing attribute information of the luminance key for each playback unit specified by a playlist, and inputs luminance key information LumaInf2 to the management information generation unit 5205. For instance, the switching information generation unit 5202 generates flag information indicating that the luminance key threshold is fixed in a continuous playback section.

Figure 52:
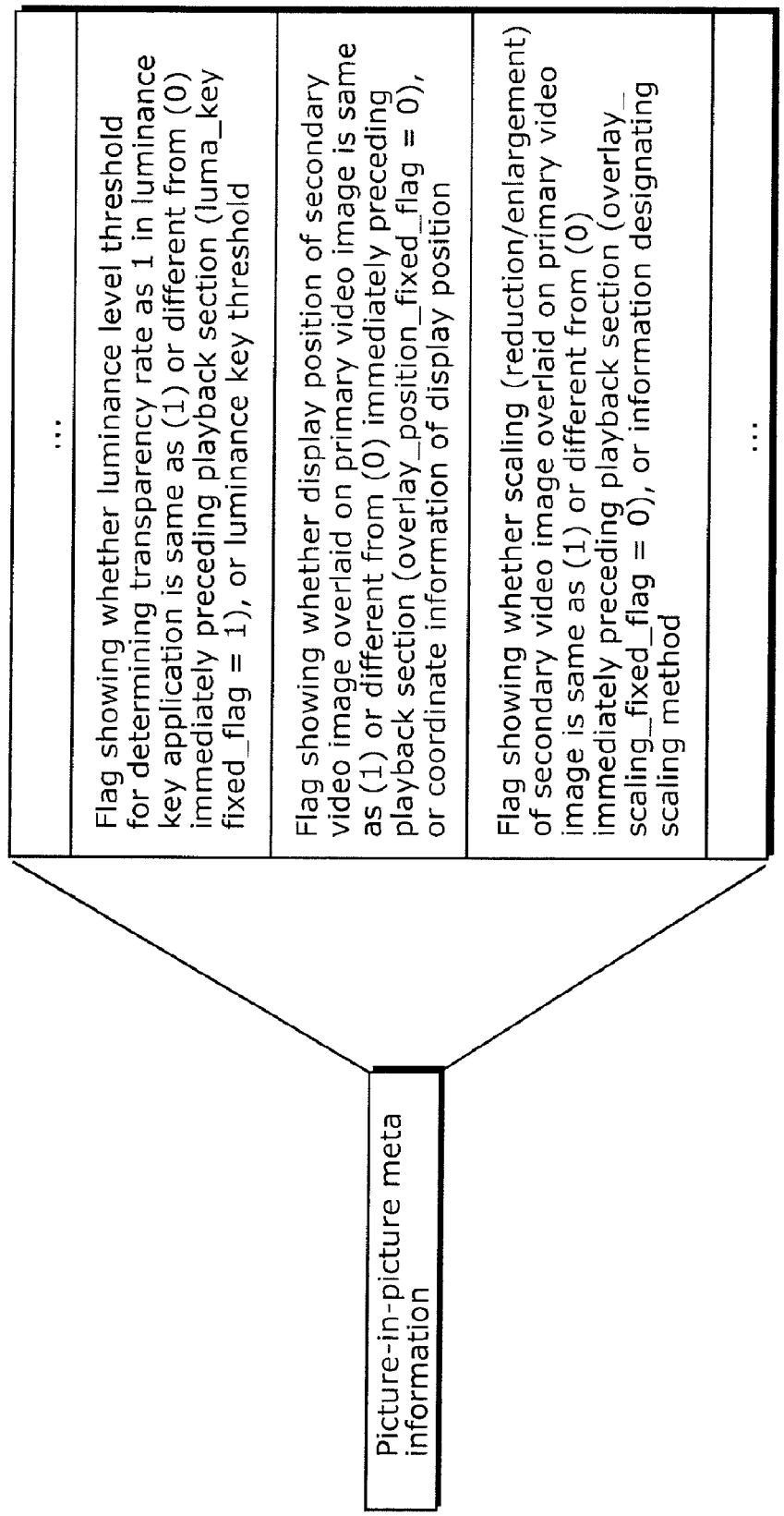
FIG. 52 shows an example of display attribute information stored in meta information of a picture-in-picture.

The switching information generation unit 5202 generates a plurality of sets of display attribute information for specifying various display processes in overlaying. This generation of the plurality of sets of display attribute information is performed so that a number of sets of display attribute information whose contents are switched in a plurality of partial sections constituting a continuous playback section is limited to no greater than a predetermined number. In detail, as shown in FIG. 52, the switching information generation unit 5202 generates a plurality of sets of display attribute information including the following (i), (ii), and (iii), as picture-in-picture meta information. (i) Flag information showing whether the above threshold, i.e., the luminance level threshold for determining the transparency rate as 1 when applying the luminance key, is same (1) or different (0) between a current playback section and an immediately preceding playback section, or information showing the luminance key threshold. (ii) Flag information showing whether a display position of a secondary video image to be overlaid on a primary video image is same (1) or different (0) between the current playback section and the immediately preceding playback section, or coordinate information of the display position. (iii) Flag information showing whether a scaling factor (a scale of enlargement) of the secondary video image to be overlaid on the primary video image is same (1) or different (0) between the current playback section and the immediately preceding playback section, or information designating a method of scaling. In the generation of these sets of display attribute information, the number of sets of display attribute information whose contents can be switched in the continuous playback section is limited to no greater than the predetermined number (e.g. 2). By imposing this constraint, it is ensured that the number of sets of display attribute information which change in value in the continuous playback section does not exceed the predetermined number. This alleviates a processing load for a switching process in the playback device.

The coding unit 5203 codes the first and second moving images in the plurality of partial sections constituting the continuous playback section determined by the switchable unit determination unit 5201, so as to meet the constraint that prevents the threshold from being changed in the continuous playback section. Here, the coding unit 5203 codes data of each clip so as to meet the constraint of switchable unit Unit2, and inputs coded data Cdata2 to the system multiplexing unit 5204. In more detail, in the continuous playback section, the coding unit 5203 adjusts (through a multiplication by a coefficient, an addition of an offset value, etc.) luminance levels of pixels constituting the second moving image so that a luminance level of each pixel of an image area to be overlaid exceeds the threshold and a luminance level of each pixel of an image area not to be overlaid (i.e. to be transparency-processed) does not exceed the threshold.

Note here that, not only for the continuous playback section determined by the switchable unit determination unit 5201 but also for a plurality of partial sections which are seamlessly connected according to a decoder model, the coding unit 5203 may code the first and second moving images in the plurality of partial sections so as to meet the constraint that prevents a change of the threshold. The aforementioned decoder model defines the case where two partial sections need be seamlessly connected. For such two partial sections, it is preferable to code the first and second moving images under the constraint that prevents a change of the threshold, in advance.

The system multiplexing unit 5204 system-multiplexes coded data Cdata2, and inputs stream information StrInf2 to the management information generation unit 5205 and multiplexed data Mdata2 to the combination unit 5206. In BD-ROMs, a system multiplexing method called a source packet in which a 4-byte header is added to an MPEG-2 transport stream is employed. Also, stream information StrInf2 includes information for generating management information for multiplexed data Mdata2, such as a time map. Here, the system multiplexing unit 5204 may perform multiplexing such that the plurality of partial sections constituting the continuous playback section are specified by a packet identifier in a transport stream. This enables clips in which the threshold is fixed, to be identified by a packet identifier.

The management information generation unit 5205 generates management information including the above display attribute information and flag information indicating that the threshold is fixed in the continuous playback section, in accordance with an instruction from the switching information generation unit 5202. Here, the management information generation unit 5205 generates management information CtrlInf2 that includes luminance key information LumaInf2, the time map generated based on stream information StrInf2, and the like, and inputs management information CtrlInf2 to the combination unit 5206.

The combination unit 5206 combines the first and second moving images coded by the coding unit 5203 with the management information generated by the management information generation unit 5205, and outputs the combination. Here, the combination unit 5206 combines management information CtrlInf2 with multiplexed data Mdata2 and outputs the combination as recording data Dout2.

The multiplexing device 5200 having the above structure performs the multiplexing operation according to the flowcharts shown in FIGS. 49 and 50, and as a result generates the management information and the coded stream as shown in FIGS. 44 to 48.

Figure 53:
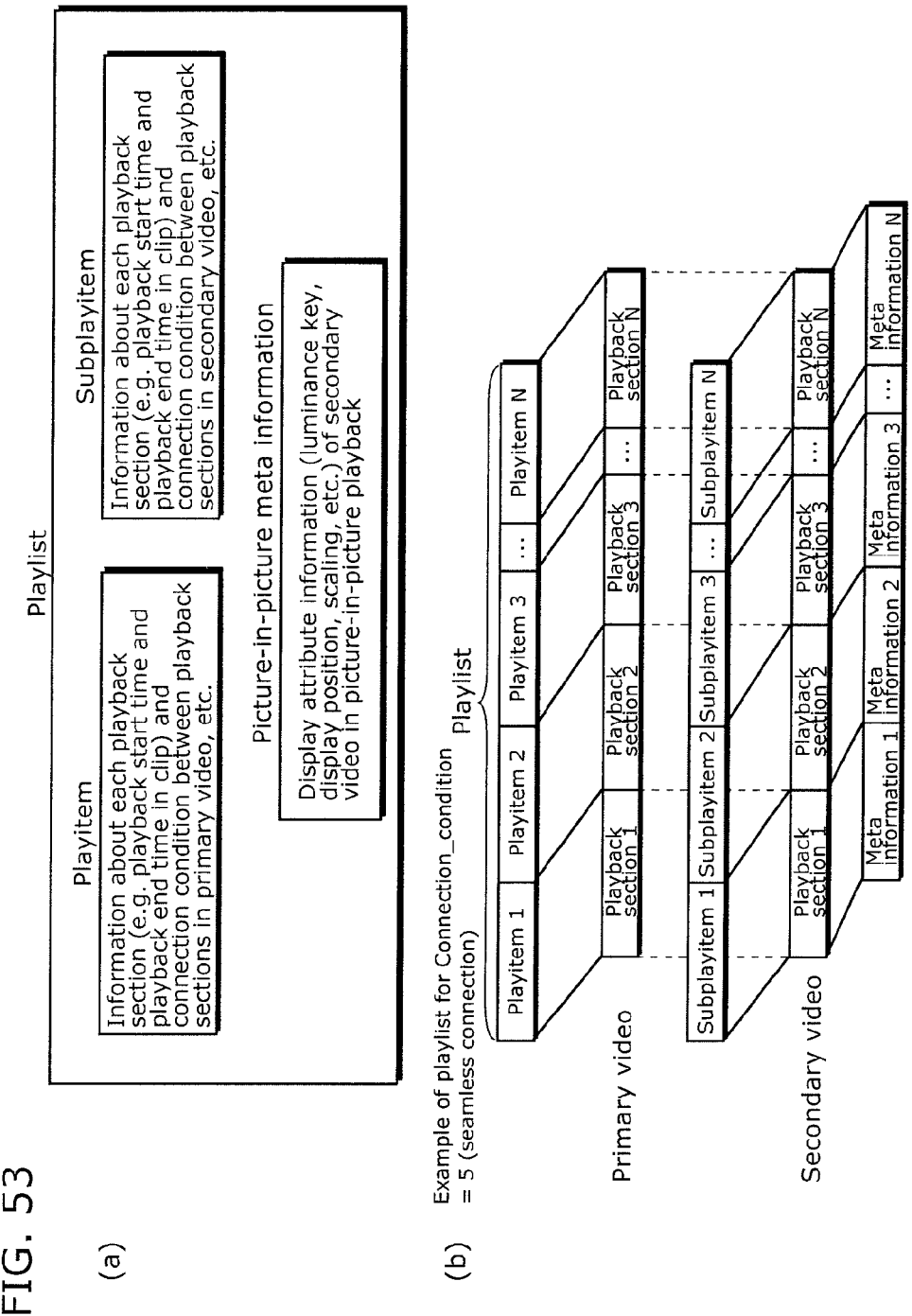
FIG. 53 shows a data structure of management information generated by the multiplexing device shown in FIG. 51, where FIG. 53(*a*) shows data elements of a playlist that is part of management information, and FIG. 53(*b*) shows an example of a playlist specifying playback sections that are seamlessly connected.

FIG. 53 shows a data structure of management information generated by this multiplexing device 5200. FIG. 53(*a*) shows data elements of a playlist that is part of management information. FIG. 53(*b*) shows an example of a playlist showing playback sections that are seamlessly connected (Connection_condition=5). As shown in FIG. 53(*a*), the multiplexing device 5200 generates, as a playlist, "playitem", "subplayitem", and "picture-in-picture meta information". As shown in FIG. 53(*b*), "playitem" shows information about each playback section in the primary video (such as a playback start time and a playback end time in a clip), a connection condition between playback sections in the primary video, and the like. "Subplayitem" shows information about each playback section in the secondary video (such as a playback start time and a playback end time in a clip), a connection condition between playback sections in the secondary video, and the like. "Picture-in-picture meta information" shows display attribute information (e.g. a luminance key, a display position, and a scaling factor) of the secondary video when playing the picture-in-picture. Note here that the clip of the primary video corresponding to the playitem and the subplayitem is identified by an index number of the playitem.

Thus, the multiplexing device 5200 generates flag information indicating that the threshold is fixed, as playback information ("meta information" in FIG. 53) corresponding to each of a plurality of partial sections ("playback section" in FIG. 53) which constitute a continuous playback section. In detail, the multiplexing device 5200 generates the flag information as playback information ("meta information" in FIG. 53) corresponding to each playitem included in the playlist.

When generating data by using an authoring tool or the like, there is a case where the generation of coded data and the system multiplexing or the generation of management information are conducted by separate devices. In such a case, the above multiplexing method can be achieved by these separate devices operating in the same way as the structural units in the multiplexing device 5200.

The multiplexing device 5200 can be used not only as a moving image coding device for generating a coded stream, but also as a moving image recording device for recording a coded stream onto a recording medium which includes an optical disc such as a BD, a flash memory such as a secure digital (SD) card, a hard disk, and the like. This can be achieved by providing the combination unit 5206, which is the output stage of the multiplexing device 5200, with a recording function of combining the first and second moving images coded by the coding unit 5203 with the management information generated by the management information generation unit 5205 and recording the combination onto the recording medium. The recording medium disclosed in this specification can be produced by such a moving image recording device (or moving image recording method).

Figure 54:
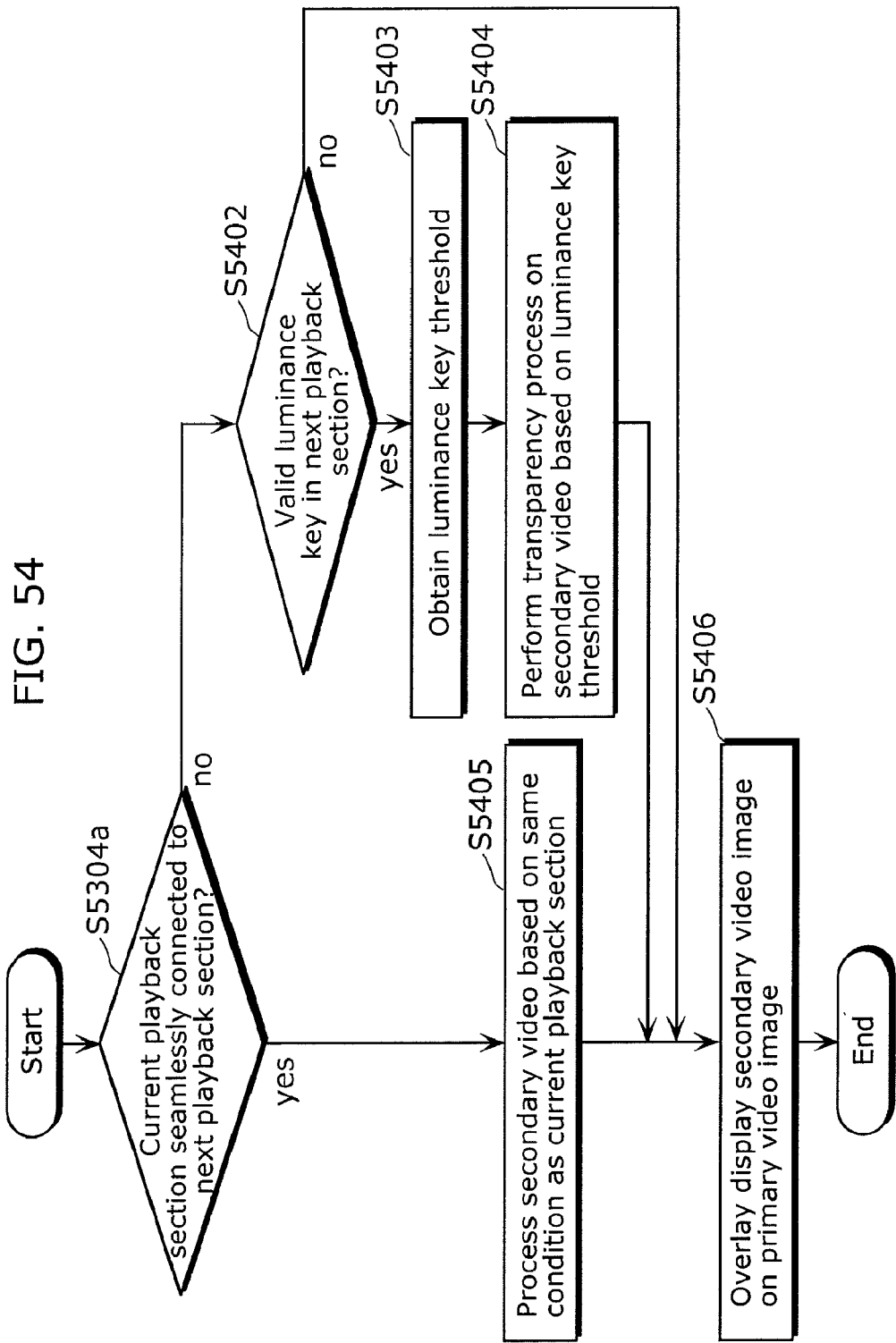
FIG. 54 is a flowchart showing an operation of a player for performing the picture-in-picture operation in the second embodiment of the present invention.

FIG. 54 is a flowchart showing an operation of performing the transparency process by the luminance key when one playback section ends and another begins, in a player (moving image playback device) for playing multiplexed data recorded on the recording medium of this embodiment.

Firstly, in Step S5401, the player judges whether or not a current playback section specified by a playitem is seamlessly connected to a next playback section. When the current playback section is judged as seamlessly connected, the player proceeds to Step S5405. When the current playback section is judged as not seamlessly connected, the player proceeds to Step S5402. As a specific example of this judgment, the player obtains management information corresponding to a video stream, and judges whether the flag information in the obtained management information indicates that the threshold is fixed or not (Step S5401). When the flag information in the management information indicates that the threshold is fixed, the player judges that the current playback section and the next playback section are seamlessly connected (Step S5401: yes). When the flag information in the management information indicates that the threshold is not fixed, the player judges that the current playback section and the next playback section are not seamlessly connected (Step S5401: no).

In Step S5402, the player judges whether or not the luminance key is valid in the next playback section. When the luminance key is judged as valid, the player proceeds to Step S5403. When the luminance key is judged as not valid, the player proceeds to Step S5406. In Step S5403, the player obtains the luminance key threshold. In Step S5404, the player performs the transparency process on the secondary video in the next playback section, based on the luminance key threshold obtained in Step S5403.

In Step S5405, the player performs the transparency process on the secondary video in the next playback section, under a same condition as the current playback section (i.e. based on a same luminance key threshold as the current playback section). In detail, the player performs a process of making, in the secondary video, a pixel whose luminance level is equal to or smaller than the luminance key threshold, completely transparent. Here, when the luminance key is not valid in the current playback section, the player does not perform the transparency process on the secondary video in the next playback section.

In Step S5406, the player overlay-displays, on the primary video, an output result of Step S5404 or Step S5405, or a decoding result of the secondary video on which the transparency process was not performed in the case where the luminance key is judged as not valid in Step S5402.

It should be noted that the operation shown in FIG. 54 can be realized by the player for playing the BD disc as shown in FIGS. 20 and 21 in the first embodiment. For example, the transparency process by the luminance key is performed by the presentation processing unit 208 shown in FIG. 20.

Moreover, the player may determine a playback order of playitems in accordance with a predetermined playback procedure. As one example, in continuous playback of a plurality of playitems, the player prioritizes playitems that have a same luminance key threshold. In a case when the user requests to play a specific playitem by a remote control operation or the like, the player may continuously play playitems that have different luminance key thresholds. Also, in the multiplexing method and multiplexing device of this embodiment, the luminance key threshold may be fixed in playitems that are continuously played in accordance with a predetermined playback procedure. Here, one playitem corresponds to one playback unit.

Third Embodiment

By recording a program for realizing the recording medium, the playback method, and the recording method described in each of the above embodiments onto a recording medium such as a flexible disk, the processing shown in each of the above embodiments can be easily implemented on an independent computer system.

Figure 55A:
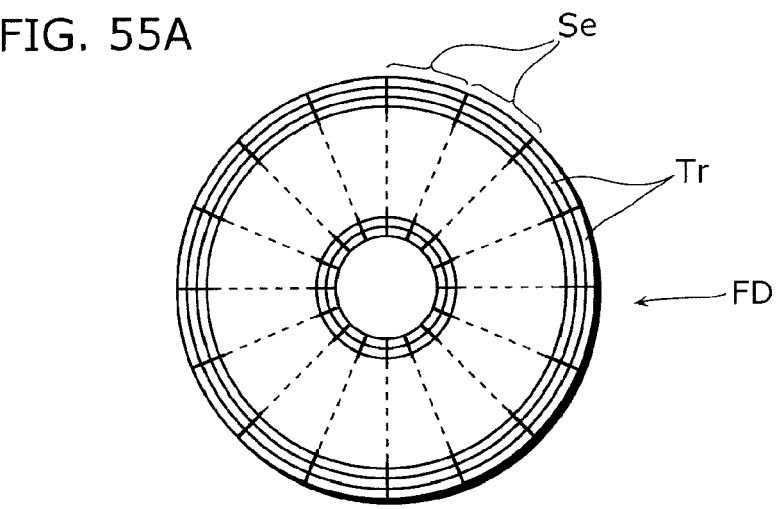
FIG. 55A shows an example physical format of a flexible disk that is a recording medium body in a third embodiment of the present invention.
Figure 55B:
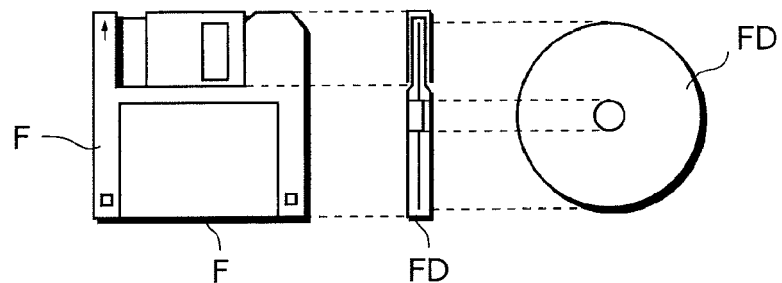
FIG. 55B shows an appearance of the flexible disk as seen from the front, a cross section of the flexible disk, and the flexible disk itself.
Figure 55C:
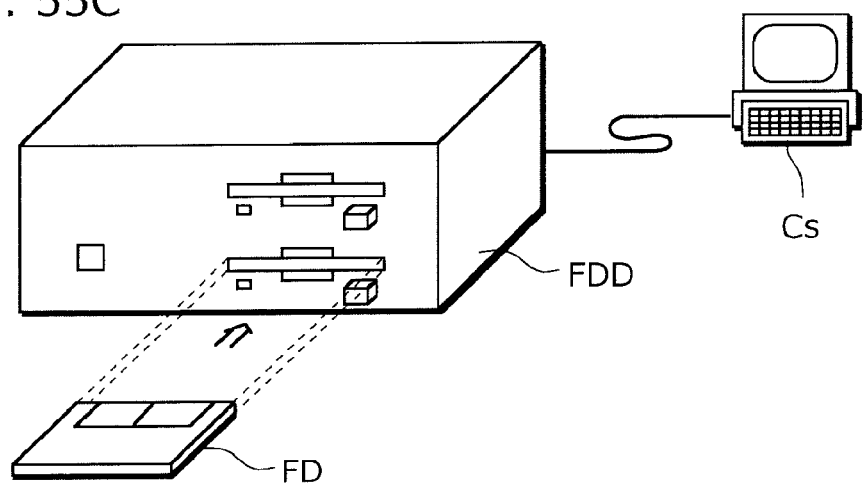
FIG. 55C shows a structure for recording/playing a program on the flexible disk.

FIGS. 55A to 55C show a situation where the playback method and the recording method in each of the above embodiments are realized on a computer system by using a program recorded on a recording medium such as a flexible disk.

FIG. 55B shows an appearance of the flexible disk as seen from the front, a cross section of the flexible disk, and the flexible disk itself. FIG. 55A shows an example physical format of the flexible disk which is a recording medium body. A flexible disk FD is housed in a case F. A plurality of tracks Tr are formed on a surface of the flexible disk FD concentrically in a direction from its outer radius to inner radius. Each track is divided into 16 sectors Se in an angular direction. In the flexible disk storing the program, the program is located in an area allocated on the flexible disk FD.

FIG. 55C shows a structure for recording/playing the program on the flexible disk FD. To record the program for realizing the playback method and the recording method on the flexible disk FD, the program is written from a computer system Cs onto the flexible disk FD via a flexible disk drive FDD. To implement the recording method and the playback method on the computer system Cs through the use of the program stored on the flexible disk FD, the program is read from the flexible disk FD via the flexible disk drive FDD and transferred to the computer system Cs.

Though the flexible disk is described as an example recording medium here, an optical disc is equally applicable. Also, other recording media capable of recording a program, such as an IC card or a ROM cassette, are equally applicable.

The functional blocks shown in each of the block diagrams such as FIGS. 12, 20, 21, 25, and 51 can be typically realized as an LSI that is an integrated circuit device. Such an LSI can be achieved by integrating the functional blocks onto one chip or a plurality of chips (for example, the functional blocks other than the memory may be implemented on one chip). Though the LSI is mentioned here, the circuit may be called an IC, a system LSI, a super LSI, or an ultra LSI, depending on the degree of integration.

Also, the integration is not limited to the LSI, and may be performed using a dedicated circuit or a general processor. A field programmable gate array (FPGA) that can be programmed or a reconfigurable processor capable of reconfiguring connections and settings of circuit cells in an LSI may be used after producing the LSI.

Furthermore, if an integrated circuit technique that replaces a LSI emerges from advancement of semiconductor technology or other derivative technology, such a technique can be used for the integration of the functional blocks. For instance, biotechnology may be adapted in this way.

Also, of the functional blocks, only the unit for storing data may be implemented as a separate structure instead of being incorporated in one chip, as in the case of the recording medium in the above embodiments.

Although the moving image coding method and the like according to the present invention have been described by way of the above embodiments, the present invention is not limited to these embodiments. The present invention include other forms that can be realized by applying modifications conceivable by one skilled in the art to the above embodiments, other forms that can be realized by any combination of the structural elements in the above embodiments, and the like.

The block diagrams such as FIGS. 12, 20, 21, 25, and 51 and in the flowcharts such as FIGS. 11, 13-17, 40-43, 49, 50, and 54, main parts may also be implemented by a processor or a program.

Thus, the moving image coding method or moving image decoding method in the above embodiments can be used in any device or system described above. In so doing, the effects described in the above embodiments can be attained.

INDUSTRIAL APPLICABILITY

The moving image coding method according to the present invention fixes, in coded data of a moving image constituting a continuous playback unit shown by management information, a luminance level threshold used when determining whether or not to display a pixel transparent. As a result, seamless playback can be achieved by suppressing a delay in decoding caused by switching the luminance level threshold. Therefore, the moving image coding method according to the present invention is suitable for use in package media, distribution applications, and the like for overlay-displaying a moving image on a moving image, graphics, a still image, or the like. Example uses include a moving image encoder LSI, a movie camera, a moving image recorder, a television with a moving image recording function, and a computer program.

The invention claimed is:

1. A non-transitory recording medium on which computer-readable data is recorded, the computer-readable data including:
   a video stream including a first moving image and a second moving image to be overlaid on the first moving image, the overlaying being performed by overlaying only an image area whose luminance level exceeds a predetermined threshold in the second moving image, on the first moving image; and
   management information used for managing the video stream,
   wherein under a constraint that prevents the threshold from being changed in a continuous playback section that is a group of partial sections and is subject to continuous playback in the video stream, the first moving image and the second moving image in the partial sections which constitute the continuous playback section have been coded,
   wherein the management information includes flag information which indicates that the threshold is fixed in the continuous playback section and information showing the threshold.

2. A moving image playback method for decoding a coded video stream including a first moving image and a second moving image and overlay-displaying the second moving image on the first moving image, said moving image playback method comprising:
   obtaining management information corresponding to the video stream and analyzing the obtained management information;
   decoding the first moving image and the second moving image in accordance with the analysis in said analyzing; and
   overlay-displaying only an image area whose luminance level exceeds a predetermined threshold in the decoded second moving image, on the decoded first moving image,
   wherein said analyzing includes judging whether or not the management information includes flag information indicating that the threshold is fixed,
   wherein said overlay-displaying includes overlay-displaying the image area in a current partial section by using a same threshold as an immediately preceding partial section, when the judgment in said analyzing is that the management information includes the flag information, and
   wherein said overlay-displaying includes setting the predetermined threshold by using the threshold which the information shows.

3. A moving image playback device for decoding a coded video stream including a first moving image and a second moving image and overlay-displaying the second moving image on the first moving image, said moving image playback device comprising:
   a management information processing unit configured to obtain management information corresponding to the video stream and analyze the obtained management information;
   a decoding unit configured to decode the first moving image and the second moving image in accordance with the analysis by said management information processing unit; and
   a display unit configured to overlay-display only an image area whose luminance level exceeds a predetermined threshold in the decoded second moving image, on the decoded first moving image,
   wherein said management information processing unit is configured to judge whether or not the management information includes flag information indicating that the threshold is fixed,
   wherein said display unit is configured to overlay-display the image area in a current partial section by using a same threshold as an immediately preceding partial section, when said management information processing unit judges that the management information includes the flag information, and
   wherein said display unit is configured to set the predetermined threshold by using the threshold which the information shows.

* * * * *